(12) United States Patent
Esman

(10) Patent No.: US 11,816,670 B1
(45) Date of Patent: ＊Nov. 14, 2023

(54) RISK ANALYSIS USING RISK DEFINITION RELATIONSHIPS

(71) Applicant: Splunk Inc., San Francisco, CA (US)

(72) Inventor: Gleb Esman, San Francisco, CA (US)

(73) Assignee: SPLUNK INC., San Francisco, CA (US)

( ＊ ) Notice: Subject to any disclaimer, the term of this patent is extended or adjusted under 35 U.S.C. 154(b) by 0 days.

This patent is subject to a terminal disclaimer.

(21) Appl. No.: 17/828,665

(22) Filed: May 31, 2022

Related U.S. Application Data

(63) Continuation of application No. 16/836,358, filed on Mar. 31, 2020, now Pat. No. 11,348,112, which is a continuation of application No. 15/582,564, filed on Apr. 28, 2017, now Pat. No. 10,643,214.

(51) Int. Cl.
*G06F 21/00* (2013.01)
*G06Q 20/40* (2012.01)
*H04L 9/40* (2022.01)

(52) U.S. Cl.
CPC ....... *G06Q 20/4016* (2013.01); *G06Q 20/405* (2013.01); *H04L 63/1433* (2013.01)

(58) Field of Classification Search
CPC .............. G06Q 20/4016; G06Q 20/405; H04L 63/1433
See application file for complete search history.

(56) References Cited

U.S. PATENT DOCUMENTS

| | | | |
|---|---|---|---|
| 7,937,344 B2 | 5/2011 | Baum et al. |
| 8,112,425 B2 | 2/2012 | Baum et al. |
| 8,412,696 B2 | 4/2013 | Zhang et al. |
| 8,589,375 B2 | 11/2013 | Zhang et al. |
| 8,589,403 B2 | 11/2013 | Marquardt et al. |
| 8,589,432 B2 | 11/2013 | Zhang et al. |

(Continued)

OTHER PUBLICATIONS

D. Subramanian, D. Bhattachrajya, R. R. Torrado, J. Kephart, V. Chenthamarakshan and J. Rios, "A cognitive assistant for risk identification and modeling," 2017 IEEE International Conference on Big Data (Big Data), Boston, MA, USA, 2017, pp. 1570-1579, doi: 10.1109/BigData.2017.8258091. (Year: 2017).＊

(Continued)

*Primary Examiner* — Ka Shan Choy
(74) *Attorney, Agent, or Firm* — Artegis Law Group, LLP

(57) ABSTRACT

Various embodiments of the present invention set forth techniques for monitoring risk in a computing system. The technique includes creating one or more risk objects, where each risk object of the one or more risk objects has a corresponding stored risk definition, the stored risk definition associating the risk object with raw machine data pertaining to the risk object, the raw machine data reflecting activity in an information technology (IT) environment. The technique further includes receiving a selection of a first risk object included in the one or more risk objects and receiving a first risk definition that corresponds to the first risk object. The technique further includes performing a search of the raw machine data according to the first risk definition, wherein a risk is identified based on the search of the raw machine data and performing an action based on identifying the risk.

20 Claims, 29 Drawing Sheets

(56) References Cited

U.S. PATENT DOCUMENTS

| | | |
|---|---|---|
| 8,682,925 B1 | 3/2014 | Marquardt et al. |
| 8,738,587 B1 | 5/2014 | Bitincka et al. |
| 8,738,629 B1 | 5/2014 | Bitincka et al. |
| 8,751,529 B2 | 6/2014 | Zhang et al. |
| 8,788,525 B2 | 7/2014 | Neels et al. |
| 8,788,526 B2 | 7/2014 | Neels et al. |
| 8,826,434 B2 | 9/2014 | Merza |
| 8,983,994 B2 | 3/2015 | Neels et al. |
| 9,069,930 B1* | 6/2015 | Hart .............. H04L 63/1408 |
| 9,124,612 B2 | 9/2015 | Vasan et al. |
| 9,128,980 B2 | 9/2015 | Neels et al. |
| 9,128,985 B2 | 9/2015 | Marquardt et al. |
| 9,130,971 B2 | 9/2015 | Vasan et al. |
| 9,173,801 B2 | 11/2015 | Merza |
| 9,185,007 B2 | 11/2015 | Fletcher et al. |
| 9,215,240 B2 | 12/2015 | Merza et al. |
| 9,223,971 B1 | 12/2015 | Bartolomie et al. |
| 9,248,068 B2 | 2/2016 | Merza |
| 9,286,413 B1 | 3/2016 | Coates et al. |
| 9,426,045 B2 | 8/2016 | Fletcher et al. |
| 9,426,172 B2 | 8/2016 | Merza |
| 9,432,396 B2 | 8/2016 | Merza |
| 9,514,189 B2 | 12/2016 | Bitincka et al. |
| 9,589,012 B2 | 3/2017 | Neels et al. |
| 9,838,292 B2 | 12/2017 | Polychronis |
| 10,127,258 B2 | 11/2018 | Lamas et al. |
| 10,356,119 B1* | 7/2019 | Chang .............. H04L 63/1433 |
| 10,902,114 B1* | 1/2021 | Trost .................. G06F 16/26 |
| 2006/0010496 A1* | 1/2006 | Parapadakis ........... G06Q 10/06 726/25 |
| 2008/0021801 A1 | 1/2008 | Song et al. |
| 2013/0318236 A1 | 11/2013 | Coates et al. |
| 2014/0143873 A1 | 5/2014 | Stirtzinger et al. |
| 2014/0324862 A1 | 10/2014 | Bingham et al. |
| 2014/0330815 A1 | 11/2014 | Bitincka et al. |
| 2014/0359777 A1 | 12/2014 | Lam et al. |
| 2015/0019537 A1 | 1/2015 | Neels et al. |
| 2015/0035823 A1 | 2/2015 | Arsan et al. |
| 2015/0067858 A1 | 3/2015 | Loriot et al. |
| 2016/0004750 A1 | 1/2016 | Marquardt et al. |
| 2016/0078236 A1* | 3/2016 | Chesla .............. H04L 63/1408 726/1 |
| 2017/0046419 A1* | 2/2017 | Chapman .............. G06F 16/283 |
| 2017/0237752 A1* | 8/2017 | Ganguly .............. H04L 63/1416 726/25 |
| 2019/0098106 A1 | 3/2019 | Mungel et al. |
| 2019/0158528 A1* | 5/2019 | Xia .................. G06Q 20/3223 |

OTHER PUBLICATIONS

Pivot Manual, Splunk Enterprise 6.1.3, Aug. 4, 2014, 30 pages.

Knowledge Manager Manual, Build a Data Model, Splunk Enterprise 6.1.3, Aug. 25, 2014, pp. 150-204.

Non Final Office Action received for U.S. Appl. No. 15/582,564 dated Dec. 13, 2018, 22 pages.

Final Office Action received for U.S. Appl. No. 15/582,564 dated Apr. 30, 2019, 16 pages.

Advisory Action received for U.S. Appl. No. 15/582,564 dated Jul. 17, 2019, 2 pages.

Notice of Allowance received for U.S. Appl. No. 15/582,564 dated Dec. 18, 2019, 8 pages.

Non Final Office Action received for U.S. Appl. No. 16/836,358 dated Aug. 11, 2021, 24 pages.

Notice of Allowance received for U.S. Appl. No. 16/836,358 dated Jan. 27, 2022, 9 pages.

Splunk Enterprise 8.0.0 Overview, available online, retrieved on May 20, 2020 from docs.splunk.com, 17 pages.

Splunk Cloud 8.0.2004 User Manual, available online, retrieved on May 20, 2020 from docs.splunk.com, 66 pages.

Splunk Quick Reference Guide, updated 2019, available online at https://www.splunk.com/pdfs/solution-guides/splunk-quick-reference-guide.pdf, retrieved on May 20, 2020, 6 pages.

Carraso, David, "Exploring Splunk," published by CITO Research, New York, NY, Apr. 2012, 156 pages.

Bitincka et al., "Optimizing Data Analysis with a Semi-structured Time Series Database," self-published, first presented at "Workshop on Managing Systems via Log Analysis and Machine Learning Techniques (SLAML)", Vancouver, British Columbia, Oct. 3, 2010, 9 pages.

* cited by examiner

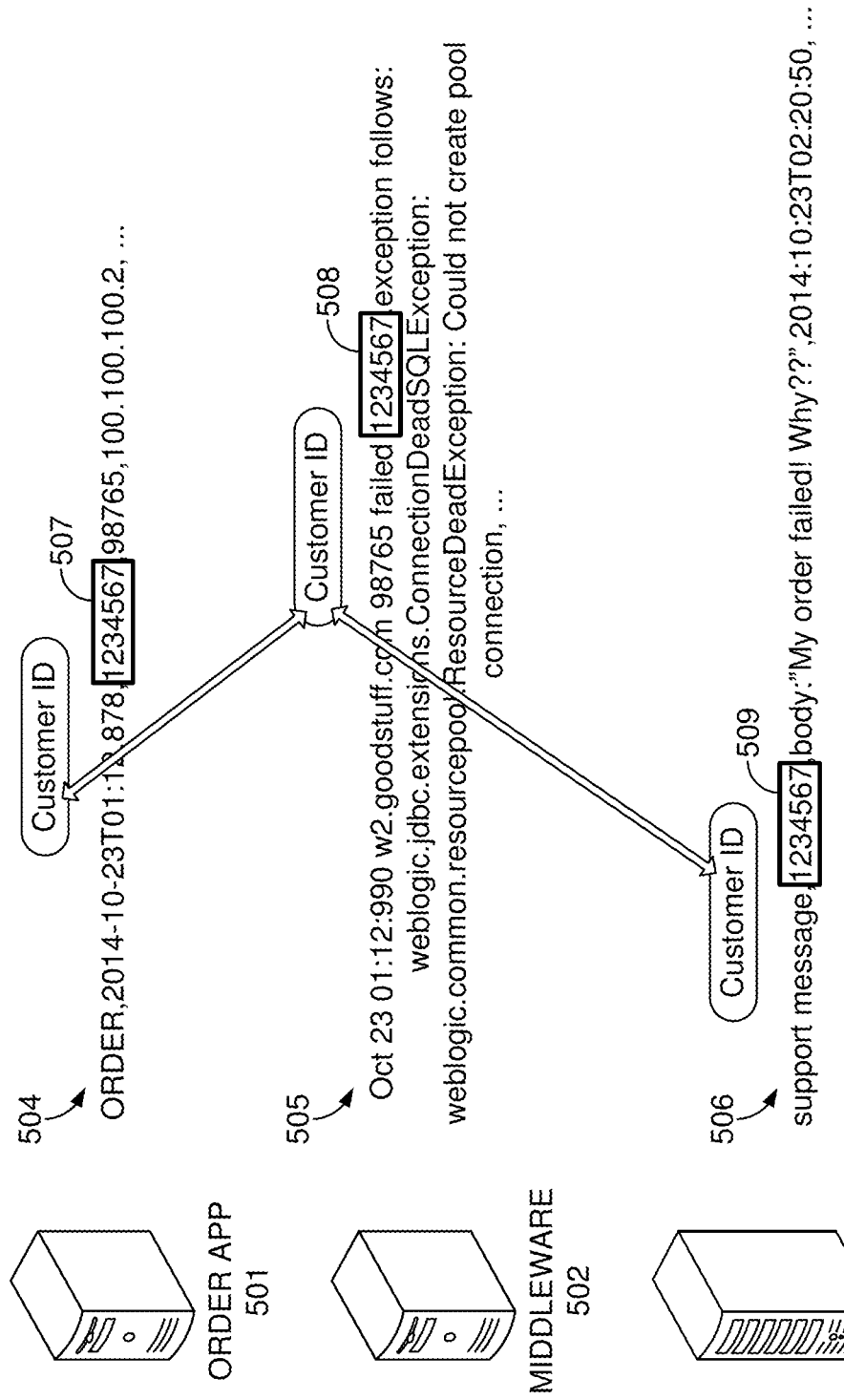

Data Summary

| Hosts (5) | Sources (8) | Sourcetypes (3) | | ✕ |

( filter )

| Host ◇ | | Count ◇ | Last Update ◇ |
|---|---|---|---|
| mailsv | ⏵ | 9,829 | 4/29/14 1:32:47.000 PM |
| vendor_sales | ⏵ | 30,244 | 4/29/14 1:32:46.000 PM |
| www1 | ⏵ | 24,221 | 4/29/14 1:32:44.000 PM |
| www2 | ⏵ | 22,595 | 4/29/14 1:32:47.000 PM |
| www3 | ⏵ | 22,975 | 4/29/14 1:32:45.000 PM |

FIG. 6B

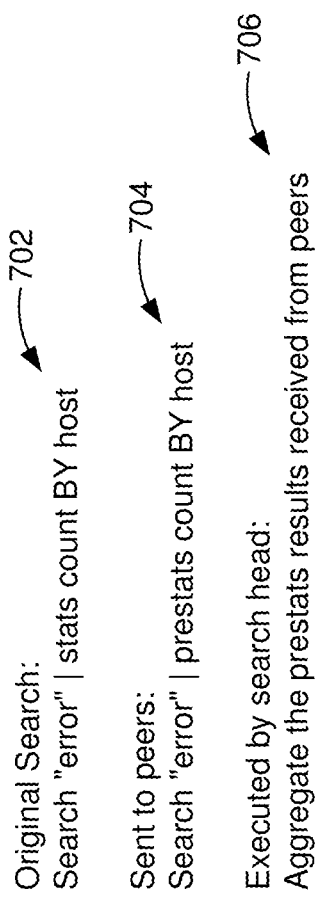

INCIDENT REVIEW DASHBOARD 810

Incident Review | Actions ▼

Status: [   ]   Urgency: [high]   Owner: [   ]   Title: [   ]

Security domain: [   ]   Governance: [pci]   Search: [   ]

INCIDENT ATTRIBUTE FIELDS 811

TIME RANGE FIELD 812 → [24 hour window ▼]

- Last 15 minutes
- Last 60 minutes
- Last 4 hours
- Last 24 hours
- Last 7 days
- Last 30 days
- Last year
- Real-time
- Other
- All time
- Custom time...

✓ 225 matching events

◨ Hide  ⊕ Zoom out  ⊕ Zoom to selection  [ ] Deselect

[ ⓘ ] [ ⊞ ] [ 🖫 Save ▼ ] [ 📊 Create ▼ ]  Linear scale ▼  1 bar = 1 hour

TIMELINE 813

120  
60

4:00 AM  6:00 AM  8:00 AM
Sun Aug 26
2012

225 events in a 24 hour window (real-time) (from 11:29:20 AM August 25 to 11:29:20 AM August 26, 2012)

« prev  1  2  3  4  5  6  7  8  9  10  next »   | Edit selected events | Edit all 225 matching Select all | Unselect all

EVENTS LIST 814

| Select | Options | Time | Security Domain | Title | Urgency | Status | Owner | |
|---|---|---|---|---|---|---|---|---|
| ☐ | ▶ | 8/26/12 11:11:03.000 AM | Access ▼ | Insecure Or Cleartext Authentication Detected ▼ | ⓘ High ▼ | New ▼ | unassigned ▼ | View details |
| ☐ | ▶ | 8/26/12 11:10:07.000 AM | Access ▼ | Insecure Or Cleartext Authentication Detected ▼ | ⓘ High ▼ | New ▼ | unassigned ▼ | View details |
| ☐ | ▶ | 8/26/12 11:00:39.000 AM | Access ▼ | Account (blinebry) Deleted On (PROD-POS-001) ▼ | ⓘ High ▼ | New ▼ | unassigned ▼ | View details |
| ☐ | ▶ | 8/26/12 11:00:39.000 AM | Access ▼ | Account (beu) Deleted On (COREDEV-006) ▼ | ⓘ High ▼ | New ▼ | unassigned ▼ | View details |
| ☐ | ▶ | 8/26/12 11:00:39.000 AM | Access ▼ | Account (combs) Deleted On (HOST-005) ▼ | ⓘ High ▼ | New ▼ | unassigned ▼ | View details |
| ☐ | ▶ | 8/26/12 | Access ▼ | Account (wisner) Deleted On (BUSDEV-005) ▼ | ⓘ High ▼ | New ▼ | unassigned ▼ | View details |

FIG. 8B splunk>

Possible Account Takeover

SETTINGS

Severity: [Critical v] +

Status: [Draft] [Enabled] [Disabled]

◄── 1510

Risk Objects

[Search]

Risk Objects (54) Risk Object Groups (5)

- Anomalous IP for the current user
- Anomalous browser for the current user
- Profile edit; email address change
- Profile edit; notification settings chan...
- Profile edit; password reset
- Profile edit; password update
- Money movement; unknown destination
- Money movement; excessive amount
- ML: Money movement; anomalous am...
- ML: Anomalous session behavior for the
- ML: Anomalous session behavior for user

[Cancel] [Save]

— 1500

— 1520

Group Name ── 1560

○ Anomalous IP for the current user ──── Risk Score: 38  X  ◄── 1551

○ ~~Anomalous browser for the current user~~ ──── Risk Score: 35  X  ◄── 1552

1550

Preview  Actions

RISK ANALYSIS USING RISK DEFINITION RELATIONSHIPS

CROSS-REFERENCE TO RELATED APPLICATIONS

This application is a continuation of the co-pending U.S. patent application titled, "RISK MONITORING SYSTEM," filed Mar. 31, 2020 and having Ser. No. 16/836,358 which is a continuation of U.S. patent application titled, "RISK MONITORING SYSTEM," filed on Apr. 28, 2017 and having Ser. No. 15/582,564 issued as U.S. Pat. No. 10,643,214. The subject matter of these related applications is hereby incorporated herein by reference.

BACKGROUND OF THE INVENTION

Field of the Invention

Embodiments of the present invention relate generally to computer networks and, more specifically, to a risk monitoring system.

Description of the Related Art

In the field of computing systems, the amount of computer data generated by various applications and devices continues to increase, while the cost of storing such data continues to decrease. Accordingly, storing large amounts of data inexpensively has become more practical. However, searching and/or operating on stored data, such as information related to the operation or security of a computing system, has presented various challenges.

In particular, many large enterprises that generate and store large amounts of data may allow users to access the data to perform various tasks, such as by enabling a user to perform searches within data using search query commands and/or machine-learning algorithms. For example, a user may enter search query commands that comply with a particular computer language syntax, such as a search processing language (SPL) or other computer programming language.

One drawback to these types of conventional approaches is that searching and/or analyzing data effectively often requires a high degree of proficiency in one or more computer languages. In addition, in order to effectively search for and analyze data, the user must understand the purpose of the search, such as the relevance of the data to a particular business objective. For example, a user that is analyzing machine data in order to detect fraud in a financial services platform must be proficient in one or more relevant computer languages and must also understand various aspects of the financial services industry in order to determine which portions of the data are relevant to a fraud inquiry.

However, while some users may possess either proficiency in a computer language or knowledge of a particular industry (e.g., the financial services industry), few users have sufficient knowledge in both. For example, in many large enterprises, an analyst or executive seeking to analyze a particular set of data may understand which portions of the data are relevant to a particular task. However, the analyst or executive may not understand the relevant computer languages that are needed to structure a search query to access that data. By contrast, a computer programmer may possess the requisite technical knowledge to structure a search query, but the programmer may not understand the relevance of the underlying data to a particular business objective. As a result, conventional approaches for searching for different types of data often require multiple users having different skill sets to collaborate in an inefficient manner each time data is searched and/or analyzed.

As the foregoing illustrates, improved techniques for searching and/or analyzing computer data would be useful.

SUMMARY OF THE INVENTION

Various embodiments of the present invention set forth a computer-implemented method for monitoring risk in a computing system. The method includes creating one or more risk objects, where each risk object of the one or more risk objects has a corresponding stored risk definition, the stored risk definition associating the risk object with raw machine data pertaining to the risk object, the raw machine data reflecting activity in an information technology (IT) environment. The method further includes receiving a selection of a first risk object included in the one or more risk objects and receiving a first risk definition that corresponds to the first risk object. The method further includes performing a search of the raw machine data according to the first risk definition, wherein a risk is identified based on the search of the raw machine data and performing an action based on identifying the risk.

Other embodiments of the present invention include, without limitation, a computer-readable medium including instructions for performing one or more aspects of the disclosed techniques, as well as a computing device for performing one or more aspects of the disclosed techniques.

At least one advantage of the disclosed techniques is that, by storing the risk definitions and searching and analyzing the computer data based on the stored risk definitions, the risk monitoring system enables computer data to be searched without requiring a user to re-enter complicated search query commands and/or machine-learning algorithms each time a search is performed. A further advantage of the disclosed techniques is that, by representing the risk objects and logical operators graphically, a user without specific proficiency or technical knowledge related to a computer language syntax is able to perform and manipulate searches efficiently.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 5 illustrates a scenario where a common customer ID is found among log data received from three disparate sources in accordance with the disclosed embodiments;

FIG. 6B illustrates a data summary dialog that enables a user to select various data sources in accordance with the disclosed embodiments;

FIG. 7 illustrates an example search query received from a client and executed by search peers in accordance with the disclosed embodiments;

FIG. 8B illustrates an incident review dashboard in accordance with the disclosed embodiments;

FIGS. 15A-15E illustrate an example user interface for selecting risk objects and applying logical operators to selected risk objects in accordance with the disclosed embodiments;

FIG. 17 illustrates an example dashboard screen for displaying status of monitoring computer data related to risk objects in accordance with the disclosed embodiments;

DETAILED DESCRIPTION

Figure 1:
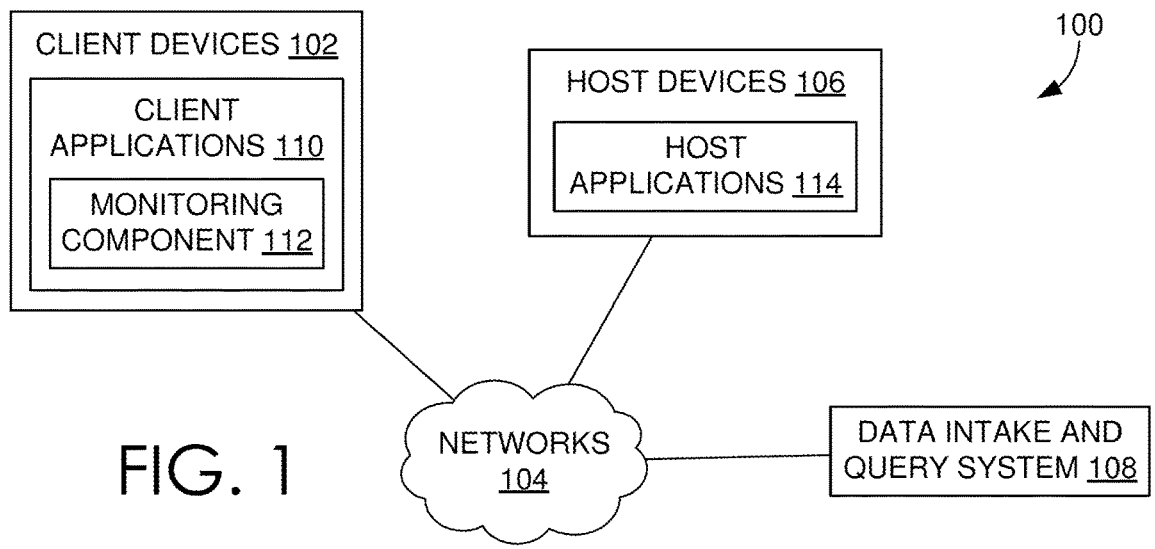
FIG. 1 illustrates a networked computer environment in which an embodiment may be implemented.

In the following description, numerous specific details are set forth to provide a more thorough understanding of the present invention. However, it will be apparent to one of skill in the art that embodiments of the present invention may be practiced without one or more of these specific details.

SYSTEM OVERVIEW

Embodiments are described herein according to the following outline:
1.0. General Overview
2.0. Operating Environment
   2.1. Host Devices
   2.2. Client Devices
   2.3. Client Device Applications
   2.4. Data Server System
   2.5. Data Ingestion
      2.5.1. Input
      2.5.2. Parsing
      2.5.3. Indexing
   2.6. Query Processing
   2.7 Field Extraction
   2.8. Example Search Screen
   2.9. Data Models
   2.10. Acceleration Techniques
      2.10.1. Aggregation Technique
      2.10.2. Keyword Index
      2.10.3. High Performance Analytics Store
      2.10.4. Accelerating Report Generation
   2.11. Security Features
   2.12. Cloud-Based System Overview
   2.13. Searching Externally Archived Data
      2.13.1. ERP Process Features
   2.14. IT Service Monitoring
3.0. Graphical Risk Monitoring System 1.0. GENERAL OVERVIEW Modern data centers and other computing environments can comprise anywhere from a few host computer systems to thousands of systems configured to process data, service requests from remote clients, and perform numerous other computational tasks. During operation, various components within these computing environments often generate significant volumes of machine-generated data. For example, machine data is generated by various components in the information technology (IT) environments, such as servers, sensors, routers, mobile devices, Internet of Things (IoT) devices, etc. Machine-generated data can include system logs, network packet data, sensor data, application program data, error logs, stack traces, system performance data, etc. In general, machine-generated data can also include performance data, diagnostic information, and many other types of data that can be analyzed to diagnose performance problems, monitor user interactions, and to derive other insights.

A number of tools are available to analyze machine data, that is, machine-generated data. In order to reduce the size of the potentially vast amount of machine data that may be generated, many of these tools typically pre-process the data based on anticipated data-analysis needs. For example, pre-specified data items may be extracted from the machine data and stored in a database to facilitate efficient retrieval and analysis of those data items at search time. However, the rest of the machine data typically is not saved and discarded during pre-processing. As storage capacity becomes progressively cheaper and more plentiful, there are fewer incentives to discard these portions of machine data and many reasons to retain more of the data.

This plentiful storage capacity is presently making it feasible to store massive quantities of minimally processed machine data for later retrieval and analysis. In general, storing minimally processed machine data and performing analysis operations at search time can provide greater flexibility because it enables an analyst to search all of the machine data, instead of searching only a pre-specified set of data items. This may enable an analyst to investigate different aspects of the machine data that previously were unavailable for analysis.

However, analyzing and searching massive quantities of machine data presents a number of challenges. For example, a data center, servers, or network appliances may generate many different types and formats of machine data (e.g., system logs, network packet data (e.g., wire data, etc.), sensor data, application program data, error logs, stack traces, system performance data, operating system data, virtualization data, etc.) from thousands of different components, which can collectively be very time-consuming to analyze. In another example, mobile devices may generate large amounts of information relating to data accesses, application performance, operating system performance, network performance, etc. There can be millions of mobile devices that report these types of information.

These challenges can be addressed by using an event-based data intake and query system, such as the SPLUNK® ENTERPRISE system developed by Splunk Inc. of San Francisco, Calif. The SPLUNK® ENTERPRISE system is the leading platform for providing real-time operational intelligence that enables organizations to collect, index, and search machine-generated data from various websites, applications, servers, networks, and mobile devices that power their businesses. The SPLUNK® ENTERPRISE system is particularly useful for analyzing data which is commonly found in system log files, network data, and other data input sources. Although many of the techniques described herein are explained with reference to a data intake and query system similar to the SPLUNK® ENTERPRISE system, these techniques are also applicable to other types of data systems.

In the SPLUNK® ENTERPRISE system, machine-generated data are collected and stored as "events." An event comprises a portion of the machine-generated data and is associated with a specific point in time. For example, events may be derived from "time series data," where the time series data comprises a sequence of data points (e.g., performance measurements from a computer system, etc.) that are associated with successive points in time. In general, each event can be associated with a timestamp that is derived from the raw data in the event, determined through interpolation between temporally proximate events having known timestamps, or determined based on other configurable rules for associating timestamps with events, etc.

In some instances, machine data can have a predefined format, where data items with specific data formats are stored at predefined locations in the data. For example, the machine data may include data stored as fields in a database table. In other instances, machine data may not have a predefined format, that is, the data is not at fixed, predefined locations, but the data does have repeatable patterns and is not random. This means that some machine data can comprise various data items of different data types and that may be stored at different locations within the data. For example, when the data source is an operating system log, an event can include one or more lines from the operating system log containing raw data that includes different types of performance and diagnostic information associated with a specific point in time.

Examples of components which may generate machine data from which events can be derived include, but are not limited to, web servers, application servers, databases, firewalls, routers, operating systems, and software applications that execute on computer systems, mobile devices, sensors, Internet of Things (IoT) devices, etc. The data generated by such data sources can include, for example and without limitation, server log files, activity log files, configuration files, messages, network packet data, performance measurements, sensor measurements, etc.

The SPLUNK® ENTERPRISE system uses flexible schema to specify how to extract information from the event data. A flexible schema may be developed and redefined as needed. Note that a flexible schema may be applied to event data "on the fly," when it is needed (e.g., at search time, index time, ingestion time, etc.). When the schema is not applied to event data until search time it may be referred to as a "late-binding schema."

During operation, the SPLUNK® ENTERPRISE system starts with raw input data (e.g., one or more system logs, streams of network packet data, sensor data, application program data, error logs, stack traces, system performance data, etc.). The system divides this raw data into blocks (e.g., buckets of data, each associated with a specific time frame, etc.), and parses the raw data to produce timestamped events. The system stores the timestamped events in a data store. The system enables users to run queries against the stored data to, for example, retrieve events that meet criteria specified in a query, such as containing certain keywords or having specific values in defined fields. As used herein throughout, data that is part of an event is referred to as "event data." In this context, the term "field" refers to a location in the event data containing one or more values for a specific data item. As will be described in more detail herein, the fields are defined by extraction rules (e.g., regular expressions) that derive one or more values from the portion of raw machine data in each event that has a particular field specified by an extraction rule. The set of values so produced are semantically-related (such as IP address), even though the raw machine data in each event may be in different formats (e.g., semantically-related values may be in different positions in the events derived from different sources).

As noted above, the SPLUNK® ENTERPRISE system utilizes a late-binding schema to event data while performing queries on events. One aspect of a late-binding schema is applying "extraction rules" to event data to extract values for specific fields during search time. More specifically, the extraction rules for a field can include one or more instructions that specify how to extract a value for the field from the event data. An extraction rule can generally include any type of instruction for extracting values from data in events. In some cases, an extraction rule comprises a regular expression where a sequence of characters form a search pattern, in which case the rule is referred to as a "regex rule." The system applies the regex rule to the event data to extract values for associated fields in the event data by searching the event data for the sequence of characters defined in the regex rule.

In the SPLUNK® ENTERPRISE system, a field extractor may be configured to automatically generate extraction rules for certain field values in the events when the events are being created, indexed, or stored, or possibly at a later time. Alternatively, a user may manually define extraction rules for fields using a variety of techniques. In contrast to a conventional schema for a database system, a late-binding schema is not defined at data ingestion time. Instead, the late-binding schema can be developed on an ongoing basis until the time a query is actually executed. This means that extraction rules for the fields in a query may be provided in the query itself, or may be located during execution of the query. Hence, as a user learns more about the data in the events, the user can continue to refine the late-binding schema by adding new fields, deleting fields, or modifying the field extraction rules for use the next time the schema is used by the system. Because the SPLUNK® ENTERPRISE system maintains the underlying raw data and uses late-binding schema for searching the raw data, it enables a user to continue investigating and learn valuable insights about the raw data.

In some embodiments, a common field name may be used to reference two or more fields containing equivalent data items, even though the fields may be associated with different types of events that possibly have different data formats and different extraction rules. By enabling a common field name to be used to identify equivalent fields from different types of events generated by disparate data sources, the system facilitates use of a "common information model" (CIM) across the disparate data sources (further discussed with respect to FIG. 5).

2.0. OPERATING ENVIRONMENT

FIG. 1 illustrates a networked computer system 100 in which an embodiment may be implemented. Those skilled in the art will understand that FIG. 1 represents one example of a networked computer system and other embodiments may use different arrangements.

The networked computer system 100 comprises one or more computing devices. These one or more computing devices comprise any combination of hardware and software configured to implement the various logical components described herein. For example, the one or more computing devices may include one or more memories that store instructions for implementing the various components described herein, one or more hardware processors configured to execute the instructions stored in the one or more memories, and various data repositories in the one or more memories for storing data structures utilized and manipulated by the various components.

In an embodiment, one or more client devices 102 are coupled to one or more host devices 106 and a data intake and query system 108 via one or more networks 104. Networks 104 broadly represent one or more LANs, WANs, cellular networks (e.g., LTE, HSPA, 3G, and other cellular technologies), and/or networks using any of wired, wireless, terrestrial microwave, or satellite links, and may include the public Internet.

2.1. Host Devices

In the illustrated embodiment, a system 100 includes one or more host devices 106. Host devices 106 may broadly include any number of computers, virtual machine instances, and/or data centers that are configured to host or execute one or more instances of host applications 114. In general, a host device 106 may be involved, directly or indirectly, in processing requests received from client devices 102. Each host device 106 may comprise, for example, one or more of a network device, a web server, an application server, a database server, etc. A collection of host devices 106 may be configured to implement a network-based service. For example, a provider of a network-based service may configure one or more host devices 106 and host applications 114 (e.g., one or more web servers, application servers, database servers, etc.) to collectively implement the network-based application.

In general, client devices 102 communicate with one or more host applications 114 to exchange information. The communication between a client device 102 and a host application 114 may, for example, be based on the Hypertext Transfer Protocol (HTTP) or any other network protocol. Content delivered from the host application 114 to a client device 102 may include, for example, HTML documents, media content, etc. The communication between a client device 102 and host application 114 may include sending various requests and receiving data packets. For example, in general, a client device 102 or application running on a client device may initiate communication with a host application 114 by making a request for a specific resource (e.g., based on an HTTP request), and the application server may respond with the requested content stored in one or more response packets.

In the illustrated embodiment, one or more of host applications 114 may generate various types of performance data during operation, including event logs, network data, sensor data, and other types of machine-generated data. For example, a host application 114 comprising a web server may generate one or more web server logs in which details of interactions between the web server and any number of client devices 102 is recorded. As another example, a host device 106 comprising a router may generate one or more router logs that record information related to network traffic managed by the router. As yet another example, a host application 114 comprising a database server may generate one or more logs that record information related to requests sent from other host applications 114 (e.g., web servers or application servers) for data managed by the database server.

2.2. Client Devices

Client devices 102 of FIG. 1 represent any computing device capable of interacting with one or more host devices 106 via a network 104. Examples of client devices 102 may include, without limitation, smart phones, tablet computers, handheld computers, wearable devices, laptop computers, desktop computers, servers, portable media players, gaming devices, and so forth. In general, a client device 102 can provide access to different content, for instance, content provided by one or more host devices 106, etc. Each client device 102 may comprise one or more client applications 110, described in more detail in a separate section hereinafter.

2.3. Client Device Applications

In an embodiment, each client device 102 may host or execute one or more client applications 110 that are capable of interacting with one or more host devices 106 via one or more networks 104. For instance, a client application 110 may be or comprise a web browser that a user may use to navigate to one or more websites or other resources provided by one or more host devices 106. As another example, a client application 110 may comprise a mobile application or "app." For example, an operator of a network-based service hosted by one or more host devices 106 may make available one or more mobile apps that enable users of client devices 102 to access various resources of the network-based service. As yet another example, client applications 110 may include background processes that perform various operations without direct interaction from a user. A client application 110 may include a "plug-in" or "extension" to another application, such as a web browser plug-in or extension.

In an embodiment, a client application 110 may include a monitoring component 112. At a high level, the monitoring component 112 comprises a software component or other logic that facilitates generating performance data related to a client device's operating state, including monitoring network traffic sent and received from the client device and collecting other device and/or application-specific information. Monitoring component 112 may be an integrated component of a client application 110, a plug-in, an extension, or any other type of add-on component. Monitoring component 112 may also be a stand-alone process.

In one embodiment, a monitoring component 112 may be created when a client application 110 is developed, for example, by an application developer using a software development kit (SDK). The SDK may include custom monitoring code that can be incorporated into the code implementing a client application 110. When the code is converted to an executable application, the custom code implementing the monitoring functionality can become part of the application itself.

In some cases, an SDK or other code for implementing the monitoring functionality may be offered by a provider of a data intake and query system, such as a system 108. In such cases, the provider of the system 108 can implement the custom code so that performance data generated by the monitoring functionality is sent to the system 108 to facilitate analysis of the performance data by a developer of the client application or other users.

In an embodiment, the custom monitoring code may be incorporated into the code of a client application 110 in a number of different ways, such as the insertion of one or more lines in the client application code that call or otherwise invoke the monitoring component 112. As such, a developer of a client application 110 can add one or more lines of code into the client application 110 to trigger the monitoring component 112 at desired points during execution of the application. Code that triggers the monitoring component may be referred to as a monitor trigger. For instance, a monitor trigger may be included at or near the beginning of the executable code of the client application 110 such that the monitoring component 112 is initiated or triggered as the application is launched, or included at other points in the code that correspond to various actions of the client application, such as sending a network request or displaying a particular interface.

In an embodiment, the monitoring component 112 may monitor one or more aspects of network traffic sent and/or received by a client application 110. For example, the monitoring component 112 may be configured to monitor data packets transmitted to and/or from one or more host applications 114. Incoming and/or outgoing data packets can be read or examined to identify network data contained within the packets, for example, and other aspects of data packets can be analyzed to determine a number of network performance statistics. Monitoring network traffic may enable information to be gathered particular to the network performance associated with a client application 110 or set of applications.

In an embodiment, network performance data refers to any type of data that indicates information about the network and/or network performance. Network performance data may include, for instance, a URL requested, a connection type (e.g., HTTP, HTTPS, etc.), a connection start time, a connection end time, an HTTP status code, request length, response length, request headers, response headers, connection status (e.g., completion, response time(s), failure, etc.), and the like. Upon obtaining network performance data indicating performance of the network, the network performance data can be transmitted to a data intake and query system 108 for analysis.

Upon developing a client application 110 that incorporates a monitoring component 112, the client application 110 can be distributed to client devices 102. Applications generally can be distributed to client devices 102 in any manner, or they can be pre-loaded. In some cases, the application may be distributed to a client device 102 via an application marketplace or other application distribution system. For instance, an application marketplace or other application distribution system might distribute the application to a client device based on a request from the client device to download the application.

Examples of functionality that enables monitoring performance of a client device are described in U.S. patent application Ser. No. 14/524,748, entitled "UTILIZING PACKET HEADERS TO MONITOR NETWORK TRAFFIC IN ASSOCIATION WITH A CLIENT DEVICE", filed on 27 Oct. 2014, and which is hereby incorporated by reference in its entirety for all purposes.

In an embodiment, the monitoring component 112 may also monitor and collect performance data related to one or more aspects of the operational state of a client application 110 and/or client device 102. For example, a monitoring component 112 may be configured to collect device performance information by monitoring one or more client device operations, or by making calls to an operating system and/or one or more other applications executing on a client device 102 for performance information. Device performance information may include, for instance, a current wireless signal strength of the device, a current connection type and network carrier, current memory performance information, a geographic location of the device, a device orientation, and any other information related to the operational state of the client device.

In an embodiment, the monitoring component 112 may also monitor and collect other device profile information including, for example, a type of client device, a manufacturer and model of the device, versions of various software applications installed on the device, and so forth.

In general, a monitoring component 112 may be configured to generate performance data in response to a monitor trigger in the code of a client application 110 or other triggering application event, as described above, and to store the performance data in one or more data records. Each data record, for example, may include a collection of field-value pairs, each field-value pair storing a particular item of performance data in association with a field for the item. For example, a data record generated by a monitoring component 112 may include a "networkLatency" field (not shown in the Figure) in which a value is stored. This field indicates a network latency measurement associated with one or more network requests. The data record may include a "state" field to store a value indicating a state of a network connection, and so forth for any number of aspects of collected performance data.

2.4. Data Server System

Figure 2:
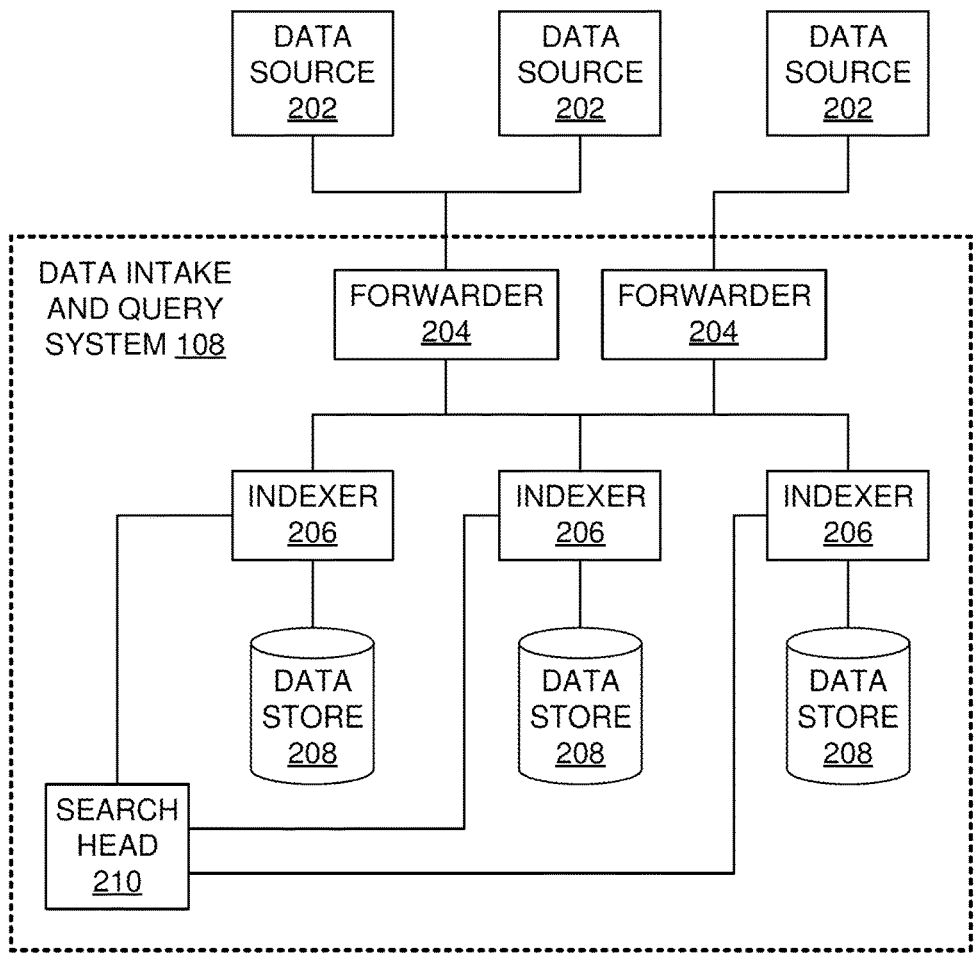
FIG. 2 illustrates a block diagram of an example data intake and query system in which an embodiment may be implemented.

FIG. 2 depicts a block diagram of an exemplary data intake and query system 108, similar to the SPLUNK® ENTERPRISE system. System 108 includes one or more forwarders 204 that receive data from a variety of input data sources 202, and one or more indexers 206 that process and store the data in one or more data stores 208. These forwarders and indexers can comprise separate computer systems, or may alternatively comprise separate processes executing on one or more computer systems.

Each data source 202 broadly represents a distinct source of data that can be consumed by a system 108. Examples of a data source 202 include, without limitation, data files, directories of files, data sent over a network, event logs, registries, etc.

During operation, the forwarders 204 identify which indexers 206 receive data collected from a data source 202 and forward the data to the appropriate indexers. Forwarders 204 can also perform operations on the data before forwarding, including removing extraneous data, detecting timestamps in the data, parsing data, indexing data, routing data based on criteria relating to the data being routed, and/or performing other data transformations.

In an embodiment, a forwarder 204 may comprise a service accessible to client devices 102 and host devices 106 via a network 104. For example, one type of forwarder 204 may be capable of consuming vast amounts of real-time data from a potentially large number of client devices 102 and/or host devices 106. The forwarder 204 may, for example, comprise a computing device which implements multiple data pipelines or "queues" to handle forwarding of network data to indexers 206. A forwarder 204 may also perform many of the functions that are performed by an indexer. For example, a forwarder 204 may perform keyword extractions on raw data or parse raw data to create events. A forwarder 204 may generate time stamps for events. Additionally or alternatively, a forwarder 204 may perform routing of events to indexers. Data store 208 may contain events derived from machine data from a variety of sources all pertaining to the same component in an IT environment, and this data may be produced by the machine in question or by other components in the IT environment.

2.5. Data Ingestion

Figure 3:
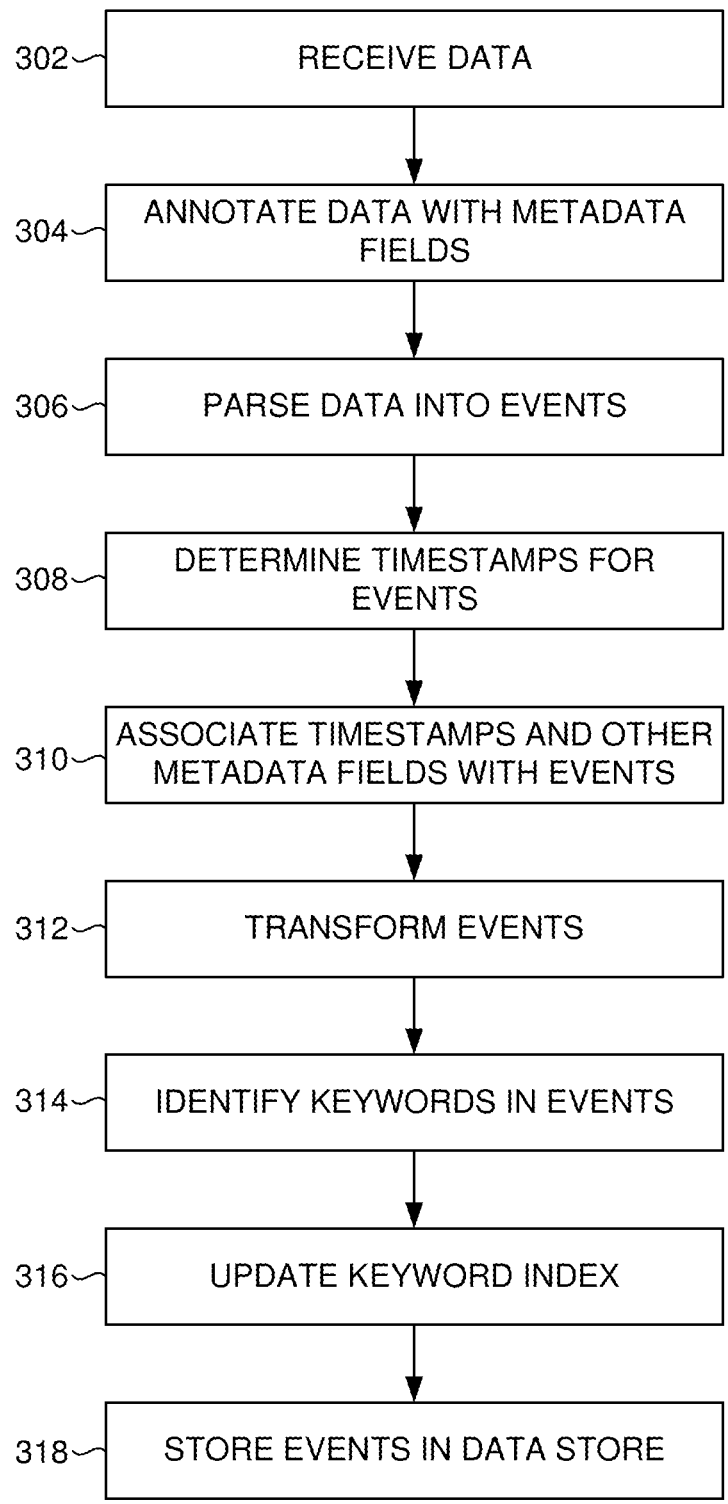
FIG. 3 is a flow diagram that illustrates how indexers process, index, and store data received from forwarders in accordance with the disclosed embodiments.

FIG. 3 depicts a flow chart illustrating an example data flow performed by Data Intake and Query system 108, in accordance with the disclosed embodiments. The data flow illustrated in FIG. 3 is provided for illustrative purposes only; those skilled in the art will understand that one or more of the steps of the processes illustrated in FIG. 3 may be removed or the ordering of the steps may be changed. Furthermore, for the purposes of illustrating a clear example, one or more particular system components are described in the context of performing various operations during each of the data flow stages. For example, a forwarder is described as receiving and processing data during an input phase; an indexer is described as parsing and indexing data during parsing and indexing phases; and a search head is described as performing a search query during a search phase. However, other system arrangements and distributions of the processing steps across system components may be used.

2.5.1. Input

At block 302, a forwarder receives data from an input source, such as a data source 202 shown in FIG. 2. A forwarder initially may receive the data as a raw data stream generated by the input source. For example, a forwarder may receive a data stream from a log file generated by an application server, from a stream of network data from a network device, or from any other source of data. In one embodiment, a forwarder receives the raw data and may segment the data stream into "blocks" or "buckets," possibly of a uniform data size, to facilitate subsequent processing steps.

At block 304, a forwarder or other system component annotates each block generated from the raw data with one or more metadata fields. These metadata fields may, for example, provide information related to the data block as a whole and may apply to each event that is subsequently derived from the data in the data block. For example, the metadata fields may include separate fields specifying each of a host, a source, and a source type related to the data block. A host field may contain a value identifying a host name or IP address of a device that generated the data. A source field may contain a value identifying a source of the data, such as a pathname of a file or a protocol and port related to received network data. A source type field may contain a value specifying a particular source type label for the data. Additional metadata fields may also be included during the input phase, such as a character encoding of the data, if known, and possibly other values that provide information relevant to later processing steps. In an embodiment, a forwarder forwards the annotated data blocks to another system component (typically an indexer) for further processing.

The SPLUNK® ENTERPRISE system allows forwarding of data from one SPLUNK® ENTERPRISE instance to another, or even to a third-party system. SPLUNK® ENTERPRISE system can employ different types of forwarders in a configuration.

In an embodiment, a forwarder may contain the essential components needed to forward data. It can gather data from a variety of inputs and forward the data to a SPLUNK® ENTERPRISE server for indexing and searching. It also can tag metadata (e.g., source, source type, host, etc.).

Additionally or optionally, in an embodiment, a forwarder has the capabilities of the aforementioned forwarder as well as additional capabilities. The forwarder can parse data before forwarding the data (e.g., associate a time stamp with a portion of data and create an event, etc.) and can route data based on criteria such as source or type of event. It can also index data locally while forwarding the data to another indexer.

2.5.2. Parsing

At block 306, an indexer receives data blocks from a forwarder and parses the data to organize the data into events. In an embodiment, to organize the data into events, an indexer may determine a source type associated with each data block (e.g., by extracting a source type label from the metadata fields associated with the data block, etc.) and refer to a source type configuration corresponding to the identified source type. The source type definition may include one or more properties that indicate to the indexer to automatically determine the boundaries of events within the data. In general, these properties may include regular expression-based rules or delimiter rules where, for example, event boundaries may be indicated by predefined characters or character strings. These predefined characters may include punctuation marks or other special characters including, for example, carriage returns, tabs, spaces, line breaks, etc. If a source type for the data is unknown to the indexer, an indexer may infer a source type for the data by examining the structure of the data. Then, it can apply an inferred source type definition to the data to create the events.

At block 308, the indexer determines a timestamp for each event. Similar to the process for creating events, an indexer may again refer to a source type definition associated with the data to locate one or more properties that indicate instructions for determining a timestamp for each event. The properties may, for example, instruct an indexer to extract a time value from a portion of data in the event, to interpolate time values based on timestamps associated with temporally proximate events, to create a timestamp based on a time the event data was received or generated, to use the timestamp of a previous event, or use any other rules for determining timestamps.

At block 310, the indexer associates with each event one or more metadata fields including a field containing the timestamp (in some embodiments, a timestamp may be included in the metadata fields) determined for the event. These metadata fields may include a number of "default fields" that are associated with all events, and may also include one more custom fields as defined by a user. Similar to the metadata fields associated with the data blocks at block 304, the default metadata fields associated with each event may include a host, source, and source type field including or in addition to a field storing the timestamp.

At block 312, an indexer may optionally apply one or more transformations to data included in the events created at block 306. For example, such transformations can include removing a portion of an event (e.g., a portion used to define event boundaries, extraneous characters from the event, other extraneous text, etc.), masking a portion of an event (e.g., masking a credit card number), removing redundant portions of an event, etc. The transformations applied to event data may, for example, be specified in one or more configuration files and referenced by one or more source type definitions.

2.5.3. Indexing

At blocks 314 and 316, an indexer can optionally generate a keyword index to facilitate fast keyword searching for event data. To build a keyword index, at block 314, the indexer identifies a set of keywords in each event. At block 316, the indexer includes the identified keywords in an index, which associates each stored keyword with reference pointers to events containing that keyword (or to locations within events where that keyword is located, other location identifiers, etc.). When an indexer subsequently receives a keyword-based query, the indexer can access the keyword index to quickly identify events containing the keyword.

In some embodiments, the keyword index may include entries for name-value pairs found in events, where a name-value pair can include a pair of keywords connected by a symbol, such as an equals sign or colon. This way, events containing these name-value pairs can be quickly located. In some embodiments, fields can automatically be generated for some or all of the name-value pairs at the time of indexing. For example, if the string "dest=10.0.1.2" is found in an event, a field named "dest" may be created for the event, and assigned a value of "10.0.1.2".

At block 318, the indexer stores the events with an associated timestamp in a data store 208. Timestamps enable a user to search for events based on a time range. In one embodiment, the stored events are organized into "buckets," where each bucket stores events associated with a specific time range based on the timestamps associated with each event. This may not only improve time-based searching, but also allows for events with recent timestamps, which may have a higher likelihood of being accessed, to be stored in a faster memory to facilitate faster retrieval. For example, buckets containing the most recent events can be stored in flash memory rather than on a hard disk.

Each indexer 206 may be responsible for storing and searching a subset of the events contained in a corresponding data store 208. By distributing events among the indexers and data stores, the indexers can analyze events for a query in parallel. For example, using map-reduce techniques, each indexer returns partial responses for a subset of events to a search head that combines the results to produce an answer for the query. By storing events in buckets for specific time ranges, an indexer may further optimize data retrieval process by searching buckets corresponding to time ranges that are relevant to a query.

Moreover, events and buckets can also be replicated across different indexers and data stores to facilitate high availability and disaster recovery as described in U.S. patent application Ser. No. 14/266,812, entitled "SITE-BASED SEARCH Affinity", filed on 30 Apr. 2014, and in U.S. patent application Ser. No. 14/266,817, entitled "MULTI-SITE CLUSTERING", also filed on 30 Apr. 2014, each of which is hereby incorporated by reference in its entirety for all purposes.

2.6. Query Processing

Figure 4:
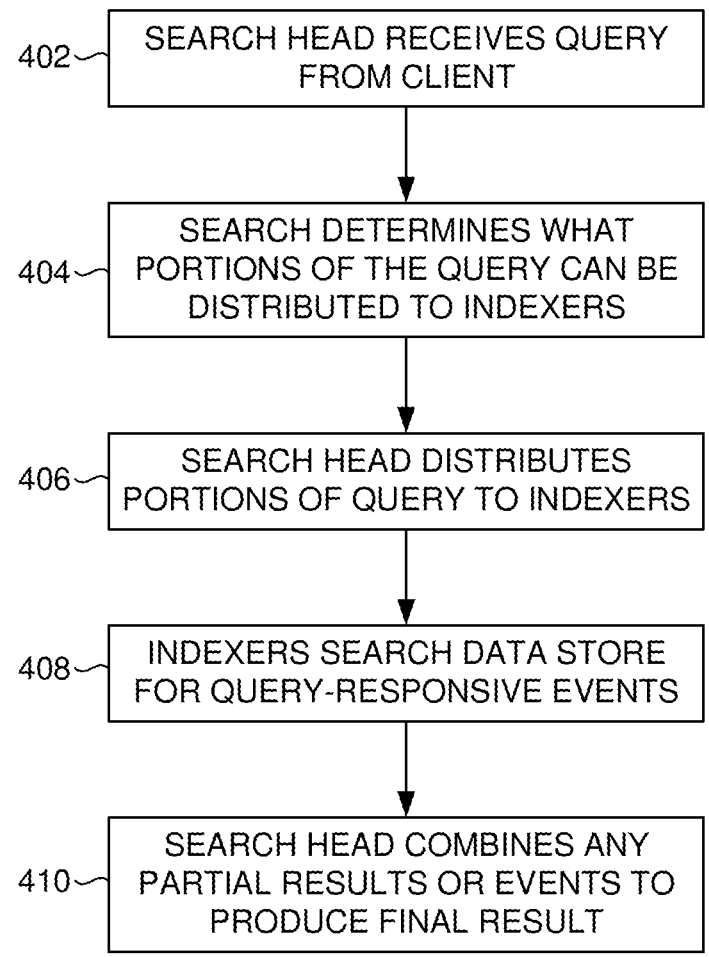
FIG. 4 is a flow diagram that illustrates how a search head and indexers perform a search query in accordance with the disclosed embodiments.

FIG. 4 is a flow diagram that illustrates an exemplary process that a search head and one or more indexers may perform during a search query. At block 402, a search head receives a search query from a client. At block 404, the search head analyzes the search query to determine what portion(s) of the query can be delegated to indexers and what portions of the query can be executed locally by the search head. At block 406, the search head distributes the determined portions of the query to the appropriate indexers. In an embodiment, a search head cluster may take the place of an independent search head where each search head in the search head cluster coordinates with peer search heads in the search head cluster to schedule jobs, replicate search results, update configurations, fulfill search requests, etc. In an embodiment, the search head (or each search head) communicates with a master node (also known as a cluster master, not shown in FIG.) that provides the search head with a list of indexers to which the search head can distribute the determined portions of the query. The master node maintains a list of active indexers and can also designate which indexers may have responsibility for responding to queries over certain sets of events. A search head may communicate with the master node before the search head distributes queries to indexers to discover the addresses of active indexers.

At block 408, the indexers to which the query was distributed, search data stores associated with them for events that are responsive to the query. To determine which events are responsive to the query, the indexer searches for events that match the criteria specified in the query. These criteria can include matching keywords or specific values for certain fields. The searching operations at block 408 may use the late-binding schema to extract values for specified fields from events at the time the query is processed. In an embodiment, one or more rules for extracting field values may be specified as part of a source type definition. The indexers may then either send the relevant events back to the search head, or use the events to determine a partial result, and send the partial result back to the search head.

At block 410, the search head combines the partial results and/or events received from the indexers to produce a final result for the query. This final result may comprise different types of data depending on what the query requested. For example, the results can include a listing of matching events returned by the query, or some type of visualization of the data from the returned events. In another example, the final result can include one or more calculated values derived from the matching events.

The results generated by the system 108 can be returned to a client using different techniques. For example, one technique streams results or relevant events back to a client in real-time as they are identified. Another technique waits to report the results to the client until a complete set of results (which may include a set of relevant events or a result based on relevant events) is ready to return to the client. Yet another technique streams interim results or relevant events back to the client in real-time until a complete set of results is ready, and then returns the complete set of results to the client. In another technique, certain results are stored as "search jobs" and the client may retrieve the results by referring the search jobs.

The search head can also perform various operations to make the search more efficient. For example, before the search head begins execution of a query, the search head can determine a time range for the query and a set of common keywords that all matching events include. The search head may then use these parameters to query the indexers to obtain a superset of the eventual results. Then, during a filtering stage, the search head can perform field-extraction operations on the superset to produce a reduced set of search results. This speeds up queries that are performed on a periodic basis.

2.7. Field Extraction

The search head 210 allows users to search and visualize event data extracted from raw machine data received from homogenous data sources. It also allows users to search and visualize event data extracted from raw machine data received from heterogeneous data sources. The search head 210 includes various mechanisms, which may additionally reside in an indexer 206, for processing a query. Splunk Processing Language (SPL), used in conjunction with the SPLUNK® ENTERPRISE system, can be utilized to make a query. SPL is a pipelined search language in which a set of inputs is operated on by a first command in a command line, and then a subsequent command following the pipe symbol "I" operates on the results produced by the first command, and so on for additional commands. Other query languages, such as the Structured Query Language ("SQL"), can be used to create a query.

In response to receiving the search query, search head 210 uses extraction rules to extract values for the fields associated with a field or fields in the event data being searched. The search head 210 obtains extraction rules that specify how to extract a value for certain fields from an event. Extraction rules can comprise regex rules that specify how to extract values for the relevant fields. In addition to specifying how to extract field values, the extraction rules may also include instructions for deriving a field value by performing a function on a character string or value retrieved by the extraction rule. For example, a transformation rule may truncate a character string, or convert the character string into a different data format. In some cases, the query itself can specify one or more extraction rules.

The search head 210 can apply the extraction rules to event data that it receives from indexers 206. Indexers 206 may apply the extraction rules to events in an associated data store 208. Extraction rules can be applied to all the events in a data store, or to a subset of the events that have been filtered based on some criteria (e.g., event time stamp values, etc.). Extraction rules can be used to extract one or more values for a field from events by parsing the event data and examining the event data for one or more patterns of characters, numbers, delimiters, etc., that indicate where the field begins and, optionally, ends.

FIG. 5 illustrates an example of raw machine data received from disparate data sources. In this example, a user submits an order for merchandise using a vendor's shopping application program 501 running on the user's system. In this example, the order was not delivered to the vendor's server due to a resource exception at the destination server that is detected by the middleware code 502. The user then sends a message to the customer support 503 to complain about the order failing to complete. The three systems 501, 502, and 503 are disparate systems that do not have a common logging format. The order application 501 sends log data 504 to the SPLUNK® ENTERPRISE system in one format, the middleware code 502 sends error log data 505 in a second format, and the support server 503 sends log data 506 in a third format.

Using the log data received at one or more indexers 206 from the three systems the vendor can uniquely obtain an insight into user activity, user experience, and system behavior. The search head 210 allows the vendor's administrator to search the log data from the three systems that one or more indexers 206 are responsible for searching, thereby obtaining correlated information, such as the order number and corresponding customer ID number of the person placing the order. The system also allows the administrator to see a visualization of related events via a user interface. The administrator can query the search head 210 for customer ID field value matches across the log data from the three systems that are stored at the one or more indexers 206. The customer ID field value exists in the data gathered from the three systems, but the customer ID field value may be located in different areas of the data given differences in the architecture of the systems—there is a semantic relationship between the customer ID field values generated by the three systems. The search head 210 requests event data from the one or more indexers 206 to gather relevant event data from the three systems. It then applies extraction rules to the event data in order to extract field values that it can correlate. The search head may apply a different extraction rule to each set of events from each system when the event data format differs among systems. In this example, the user interface can display to the administrator the event data corresponding to the common customer ID field values 507, 508, and 509, thereby providing the administrator with insight into a customer's experience.

Note that query results can be returned to a client, a search head, or any other system component for further processing. In general, query results may include a set of one or more events, a set of one or more values obtained from the events, a subset of the values, statistics calculated based on the values, a report containing the values, or a visualization, such as a graph or chart, generated from the values.

2.8. Example Search Screen

Figure 6A:
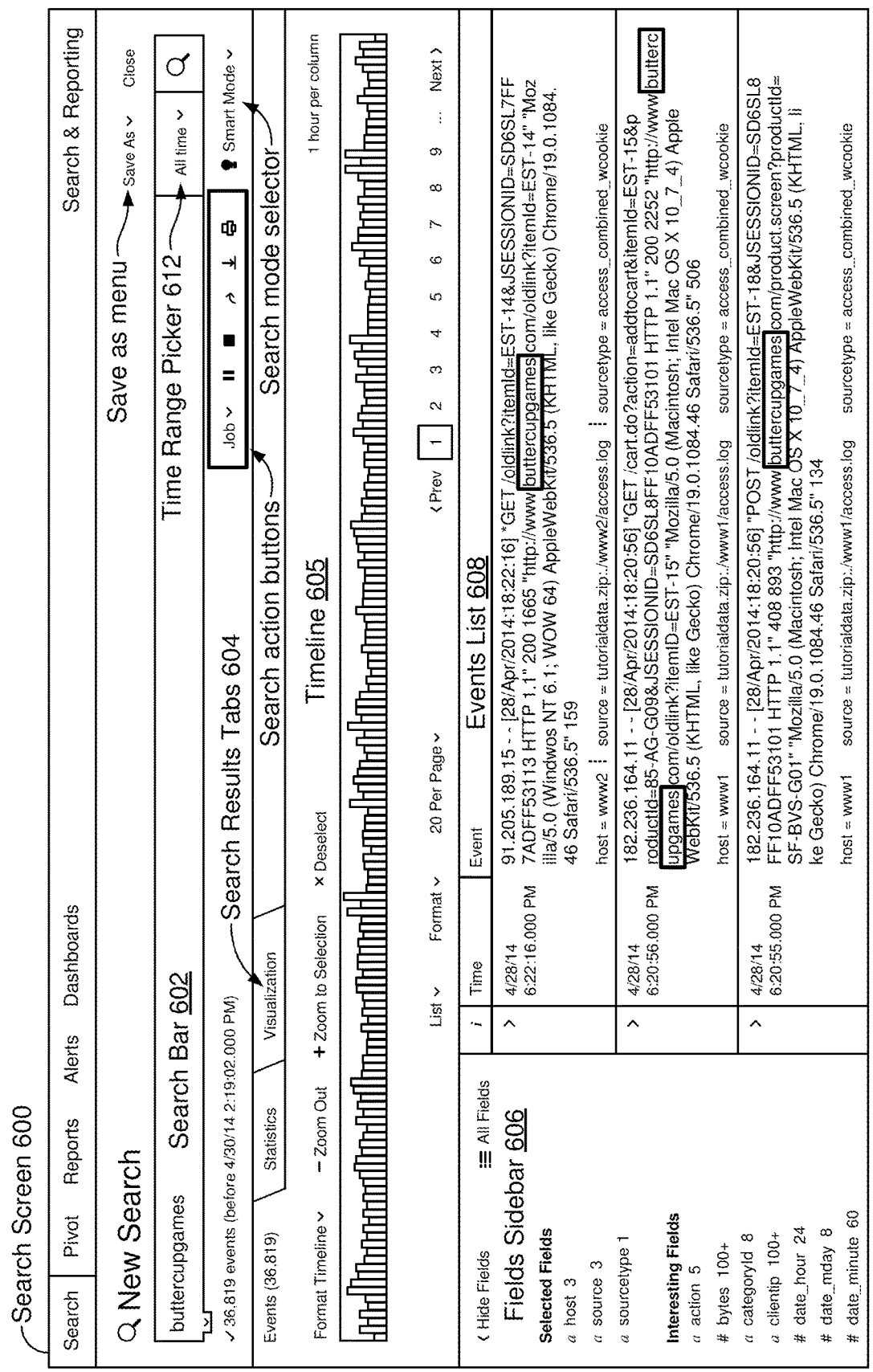
FIG. 6A illustrates a search screen in accordance with the disclosed embodiments.

FIG. 6A illustrates an example search screen 600 in accordance with the disclosed embodiments. Search screen 600 includes a search bar 602 that accepts user input in the form of a search string. It also includes a time range picker 612 that enables the user to specify a time range for the search. For "historical searches" the user can select a specific time range, or alternatively a relative time range, such as "today," "yesterday" or "last week." For "real-time searches," the user can select the size of a preceding time window to search for real-time events. Search screen 600 also initially displays a "data summary" dialog as is illustrated in FIG. 6B that enables the user to select different sources for the event data, such as by selecting specific hosts and log files.

After the search is executed, the search screen 600 in FIG. 6A can display the results through search results tabs 604, wherein search results tabs 604 includes: an "events tab" that displays various information about events returned by the search; a "statistics tab" that displays statistics about the search results; and a "visualization tab" that displays various visualizations of the search results. The events tab illustrated in FIG. 6A displays a timeline graph 605 that graphically illustrates the number of events that occurred in one-hour intervals over the selected time range. It also displays an events list 608 that enables a user to view the raw data in each of the returned events. It additionally displays a fields sidebar 606 that includes statistics about occurrences of specific fields in the returned events, including "selected fields" that are pre-selected by the user, and "interesting fields" that are automatically selected by the system based on pre-specified criteria.

2.9. Data Models

A data model is a hierarchically structured search-time mapping of semantic knowledge about one or more datasets. It encodes the domain knowledge necessary to build a variety of specialized searches of those datasets. Those searches, in turn, can be used to generate reports.

A data model is composed of one or more "objects" (or "data model objects") that define or otherwise correspond to a specific set of data.

Objects in data models can be arranged hierarchically in parent/child relationships. Each child object represents a subset of the dataset covered by its parent object. The top-level objects in data models are collectively referred to as "root objects."

Child objects have inheritance. Data model objects are defined by characteristics that mostly break down into constraints and attributes. Child objects inherit constraints and attributes from their parent objects and have additional constraints and attributes of their own. Child objects provide a way of filtering events from parent objects. Because a child object always provides an additional constraint in addition to the constraints it has inherited from its parent object, the dataset it represents is always a subset of the dataset that its parent represents.

For example, a first data model object may define a broad set of data pertaining to e-mail activity generally, and another data model object may define specific datasets within the broad dataset, such as a subset of the e-mail data pertaining specifically to e-mails sent. Examples of data models can include electronic mail, authentication, databases, intrusion detection, malware, application state, alerts, compute inventory, network sessions, network traffic, performance, audits, updates, vulnerabilities, etc. Data models and their objects can be designed by knowledge managers in an organization, and they can enable downstream users to quickly focus on a specific set of data. For example, a user can simply select an "e-mail activity" data model object to access a dataset relating to e-mails generally (e.g., sent or received), or select an "e-mails sent" data model object (or data sub-model object) to access a dataset relating to e-mails sent.

A data model object may be defined by (1) a set of search constraints, and (2) a set of fields. Thus, a data model object can be used to quickly search data to identify a set of events and to identify a set of fields to be associated with the set of events. For example, an "e-mails sent" data model object may specify a search for events relating to e-mails that have been sent, and specify a set of fields that are associated with the events. Thus, a user can retrieve and use the "e-mails sent" data model object to quickly search source data for events relating to sent e-mails, and may be provided with a listing of the set of fields relevant to the events in a user interface screen.

A child of the parent data model may be defined by a search (typically a narrower search) that produces a subset of the events that would be produced by the parent data model's search. The child's set of fields can include a subset of the set of fields of the parent data model and/or additional fields. Data model objects that reference the subsets can be arranged in a hierarchical manner, so that child subsets of events are proper subsets of their parents. A user iteratively applies a model development tool (not shown in FIG.) to prepare a query that defines a subset of events and assigns an object name to that subset. A child subset is created by further limiting a query that generated a parent subset. A late-binding schema of field extraction rules is associated with each object or subset in the data model.

Data definitions in associated schemas can be taken from the common information model (CIM) or can be devised for a particular schema and optionally added to the CIM. Child objects inherit fields from parents and can include fields not present in parents. A model developer can select fewer extraction rules than are available for the sources returned by the query that defines events belonging to a model. Selecting a limited set of extraction rules can be a tool for simplifying and focusing the data model, while allowing a user flexibility to explore the data subset. Development of a data model is further explained in U.S. Pat. Nos. 8,788,525 and 8,788,526, both entitled "DATA MODEL FOR MACHINE DATA FOR SEMANTIC SEARCH", both issued on 22 Jul. 2014, U.S. Pat. No. 8,983,994, entitled "GENERATION OF A DATA MODEL FOR SEARCHING MACHINE DATA", issued on 17 March, 2015, U.S. patent application Ser. No. 14/611,232, entitled "GENERATION OF A DATA MODEL APPLIED TO QUERIES", filed on 31 Jan. 2015, and U.S. patent application Ser. No. 14/815,884, entitled "GENERATION OF A DATA MODEL APPLIED TO OBJECT QUERIES", filed on 31 Jul. 2015, each of which is hereby incorporated by reference in its entirety for all purposes. See, also, Knowledge Manager Manual, Build a Data Model, Splunk Enterprise 6.1.3 pp. 150-204 (Aug. 25, 2014).

A data model can also include reports. One or more report formats can be associated with a particular data model and be made available to run against the data model. A user can use child objects to design reports with object datasets that already have extraneous data pre-filtered out. In an embodiment, the data intake and query system 108 provides the user with the ability to produce reports (e.g., a table, chart, visualization, etc.) without having to enter SPL, SQL, or other query language terms into a search screen. Data models are used as the basis for the search feature.

Data models may be selected in a report generation interface. The report generator supports drag-and-drop organization of fields to be summarized in a report. When a model is selected, the fields with available extraction rules are made available for use in the report. The user may refine and/or filter search results to produce more precise reports. The user may select some fields for organizing the report and select other fields for providing detail according to the report organization. For example, "region" and "salesperson" are fields used for organizing the report and sales data can be summarized (subtotaled and totaled) within this organization. The report generator allows the user to specify one or more fields within events and apply statistical analysis on values extracted from the specified one or more fields. The report generator may aggregate search results across sets of events and generate statistics based on aggregated search results. Building reports using the report generation interface is further explained in U.S. patent application Ser. No. 14/503,335, entitled "GENERATING REPORTS FROM UNSTRUCTURED DATA", filed on 30 Sep. 2014, and which is hereby incorporated by reference in its entirety for all purposes, and in Pivot Manual, Splunk Enterprise 6.1.3 (Aug. 4, 2014). Data visualizations also can be generated in a variety of formats, by reference to the data model. Reports, data visualizations, and data model objects can be saved and associated with the data model for future use. The data model object may be used to perform searches of other data.

2.10. Acceleration Technique

The above-described system provides significant flexibility by enabling a user to analyze massive quantities of minimally processed data "on the fly" at search time instead of storing pre-specified portions of the data in a database at ingestion time. This flexibility enables a user to see valuable insights, correlate data, and perform subsequent queries to examine interesting aspects of the data that may not have been apparent at ingestion time.

However, performing extraction and analysis operations at search time can involve a large amount of data and require a large number of computational operations, which can cause delays in processing the queries. Advantageously, SPLUNK® ENTERPRISE system employs a number of unique acceleration techniques that have been developed to speed up analysis operations performed at search time. These techniques include: (1) performing search operations in parallel across multiple indexers; (2) using a keyword index; (3) using a high performance analytics store; and (4) accelerating the process of generating reports. These novel techniques are described in more detail below.

2.10.1. Aggregation Technique

To facilitate faster query processing, a query can be structured such that multiple indexers perform the query in parallel, while aggregation of search results from the multiple indexers is performed locally at the search head. For example, FIG. 7 illustrates how a search query 702 received from a client at a search head 210 can split into two phases, including: (1) subtasks 704 (e.g., data retrieval or simple filtering) that may be performed in parallel by indexers 206 for execution, and (2) a search results aggregation operation 706 to be executed by the search head when the results are ultimately collected from the indexers.

During operation, upon receiving search query 702, a search head 210 determines that a portion of the operations involved with the search query may be performed locally by the search head. The search head modifies search query 702 by substituting "stats" (create aggregate statistics over results sets received from the indexers at the search head) with "prestats" (create statistics by the indexer from local results set) to produce search query 704, and then distributes search query 704 to distributed indexers, which are also referred to as "search peers." Note that search queries may generally specify search criteria or operations to be performed on events that meet the search criteria. Search queries may also specify field names, as well as search criteria for the values in the fields or operations to be performed on the values in the fields. Moreover, the search head may distribute the full search query to the search peers as illustrated in FIG. 4, or may alternatively distribute a modified version (e.g., a more restricted version) of the search query to the search peers. In this example, the indexers are responsible for producing the results and sending them to the search head. After the indexers return the results to the search head, the search head aggregates the received results 706 to form a single search result set. By executing the query in this manner, the system effectively distributes the computational operations across the indexers while minimizing data transfers.

2.10.2. Keyword Index

As described above with reference to the flow charts in FIG. 3 and FIG. 4, data intake and query system 108 can construct and maintain one or more keyword indices to quickly identify events containing specific keywords. This technique can greatly speed up the processing of queries involving specific keywords. As mentioned above, to build a keyword index, an indexer first identifies a set of keywords. Then, the indexer includes the identified keywords in an index, which associates each stored keyword with references to events containing that keyword, or to locations within events where that keyword is located. When an indexer subsequently receives a keyword-based query, the indexer can access the keyword index to quickly identify events containing the keyword.

2.10.3. High Performance Analytics Store

To speed up certain types of queries, some embodiments of system 108 create a high performance analytics store, which is referred to as a "summarization table," that contains entries for specific field-value pairs. Each of these entries keeps track of instances of a specific value in a specific field in the event data and includes references to events containing the specific value in the specific field. For example, an example entry in a summarization table can keep track of occurrences of the value "94107" in a "ZIP code" field of a set of events and the entry includes references to all of the events that contain the value "94107" in the ZIP code field. This optimization technique enables the system to quickly process queries that seek to determine how many events have a particular value for a particular field. To this end, the system can examine the entry in the summarization table to count instances of the specific value in the field without having to go through the individual events or perform data extractions at search time. Also, if the system needs to process all events that have a specific field-value combination, the system can use the references in the summarization table entry to directly access the events to extract further information without having to search all of the events to find the specific field-value combination at search time.

In some embodiments, the system maintains a separate summarization table for each of the above-described time-specific buckets that stores events for a specific time range. A bucket-specific summarization table includes entries for specific field-value combinations that occur in events in the specific bucket. Alternatively, the system can maintain a separate summarization table for each indexer. The indexer-specific summarization table includes entries for the events in a data store that are managed by the specific indexer. Indexer-specific summarization tables may also be bucket-specific.

The summarization table can be populated by running a periodic query that scans a set of events to find instances of a specific field-value combination, or alternatively instances of all field-value combinations for a specific field. A periodic query can be initiated by a user, or can be scheduled to occur automatically at specific time intervals. A periodic query can also be automatically launched in response to a query that asks for a specific field-value combination.

In some cases, when the summarization tables may not cover all of the events that are relevant to a query, the system can use the summarization tables to obtain partial results for the events that are covered by summarization tables, but may also have to search through other events that are not covered by the summarization tables to produce additional results. These additional results can then be combined with the partial results to produce a final set of results for the query. The summarization table and associated techniques are described in more detail in U.S. Pat. No. 8,682,925, entitled "Distributed High Performance Analytics Store", issued on 25 Mar. 2014, U.S. patent application Ser. No. 14/170,159, entitled "SUPPLEMENTING A HIGH PERFORMANCE ANALYTICS STORE WITH EVALUATION OF INDIVIDUAL EVENTS TO RESPOND TO AN EVENT QUERY", filed on 31 Jan. 2014, and U.S. patent application Ser. No. 14/815,973, entitled "STORAGE MEDIUM AND CONTROL DEVICE", filed on 21 Feb. 2014, each of which is hereby incorporated by reference in its entirety.

2.10.4. Accelerating Report Generation

In some embodiments, a data server system such as the SPLUNK® ENTERPRISE system can accelerate the process of periodically generating updated reports based on query results. To accelerate this process, a summarization engine automatically examines the query to determine whether generation of updated reports can be accelerated by creating intermediate summaries. If reports can be accelerated, the summarization engine periodically generates a summary covering data obtained during a latest non-overlapping time period. For example, where the query seeks events meeting a specified criteria, a summary for the time period includes only events within the time period that meet the specified criteria. Similarly, if the query seeks statistics calculated from the events, such as the number of events that match the specified criteria, then the summary for the time period includes the number of events in the period that match the specified criteria.

In addition to the creation of the summaries, the summarization engine schedules the periodic updating of the report associated with the query. During each scheduled report update, the query engine determines whether intermediate summaries have been generated covering portions of the time period covered by the report update. If so, then the report is generated based on the information contained in the summaries. Also, if additional event data has been received and has not yet been summarized, and is required to generate the complete report, the query can be run on this additional event data. Then, the results returned by this query on the additional event data, along with the partial results obtained from the intermediate summaries, can be combined to generate the updated report. This process is repeated each time the report is updated. Alternatively, if the system stores events in buckets covering specific time ranges, then the summaries can be generated on a bucket-by-bucket basis. Note that producing intermediate summaries can save the work involved in re-running the query for previous time periods, so advantageously only the newer event data needs to be processed while generating an updated report. These report acceleration techniques are described in more detail in U.S. Pat. No. 8,589,403, entitled "Compressed Journaling In Event Tracking Files For Metadata Recovery And Replication", issued on 19 Nov. 2013, U.S. Pat. No. 8,412,696, entitled "Real Time Searching And Reporting", issued on 2 Apr. 2011, and U.S. Pat. Nos. 8,589,375 and 8,589,432, both also entitled "REAL TIME SEARCHING AND REPORTING", both issued on 19 Nov. 2013, each of which is hereby incorporated by reference in its entirety.

2.11. Security Features

The SPLUNK® ENTERPRISE platform provides various schemas, dashboards and visualizations that simplify developers' task to create applications with additional capabilities. One such application is the SPLUNK® APP FOR ENTERPRISE SECURITY, which performs monitoring and alerting operations and includes analytics to facilitate identifying both known and unknown security threats based on large volumes of data stored by the SPLUNK® ENTERPRISE system. SPLUNK® APP FOR ENTERPRISE SECURITY provides the security practitioner with visibility into security-relevant threats found in the enterprise infrastructure by capturing, monitoring, and reporting on data from enterprise security devices, systems, and applications. Through the use of SPLUNK® ENTERPRISE searching and reporting capabilities, SPLUNK® APP FOR ENTERPRISE SECURITY provides a top-down and bottom-up view of an organization's security posture.

The SPLUNK® APP FOR ENTERPRISE SECURITY leverages SPLUNK® ENTERPRISE search-time normalization techniques, saved searches, and correlation searches to provide visibility into security-relevant threats and activity and generate notable events for tracking. The App enables the security practitioner to investigate and explore the data to find new or unknown threats that do not follow signature-based patterns.

Conventional Security Information and Event Management (SIEM) systems that lack the infrastructure to effectively store and analyze large volumes of security-related data. Traditional SIEM systems typically use fixed schemas to extract data from pre-defined security-related fields at data ingestion time and storing the extracted data in a relational database. This traditional data extraction process (and associated reduction in data size) that occurs at data ingestion time inevitably hampers future incident investigations that may need original data to determine the root cause of a security issue, or to detect the onset of an impending security threat.

In contrast, the SPLUNK® APP FOR ENTERPRISE SECURITY system stores large volumes of minimally processed security-related data at ingestion time for later retrieval and analysis at search time when a live security threat is being investigated. To facilitate this data retrieval process, the SPLUNK® APP FOR ENTERPRISE SECURITY provides pre-specified schemas for extracting relevant values from the different types of security-related event data and enables a user to define such schemas.

The SPLUNK® APP FOR ENTERPRISE SECURITY can process many types of security-related information. In general, this security-related information can include any information that can be used to identify security threats. For example, the security-related information can include network-related information, such as IP addresses, domain names, asset identifiers, network traffic volume, uniform resource locator strings, and source addresses. The process of detecting security threats for network-related information is further described in U.S. Pat. No. 8,826,434, entitled "SECURITY THREAT DETECTION BASED ON INDICATIONS IN BIG DATA OF ACCESS TO NEWLY REGISTERED DOMAINS", issued on 2 Sep. 2014, U.S. patent application Ser. No. 13/956,252, entitled "INVESTIGATIVE AND DYNAMIC DETECTION OF POTENTIAL SECURITY-THREAT INDICATORS FROM EVENTS IN BIG DATA", filed on 31 Jul. 2013, U.S. patent application Ser. No. 14/445,018, entitled "GRAPHIC DISPLAY OF SECURITY THREATS BASED ON INDICATIONS OF ACCESS TO NEWLY REGISTERED DOMAINS", filed on 28 Jul. 2014, U.S. patent application Ser. No. 14/445,023, entitled "SECURITY THREAT DETECTION OF NEWLY REGISTERED DOMAINS", filed on 28 Jul. 2014, U.S. patent application Ser. No. 14/815,971, entitled "SECURITY THREAT DETECTION USING DOMAIN NAME ACCESSES", filed on 1 Aug. 2015, and U.S. patent application Ser. No. 14/815,972, entitled "SECURITY THREAT DETECTION USING DOMAIN NAME REGISTRATIONS", filed on 1 Aug. 2015, each of which is hereby incorporated by reference in its entirety for all purposes. Security-related information can also include malware infection data and system configuration information, as well as access control information, such as login/logout information and access failure notifications. The security-related information can originate from various sources within a data center, such as hosts, virtual machines, storage devices and sensors. The security-related information can also originate from various sources in a network, such as routers, switches, email servers, proxy servers, gateways, firewalls and intrusion-detection systems.

During operation, the SPLUNK® APP FOR ENTERPRISE SECURITY facilitates detecting "notable events" that are likely to indicate a security threat. These notable events can be detected in a number of ways: (1) a user can notice a correlation in the data and can manually identify a corresponding group of one or more events as "notable;" or (2) a user can define a "correlation search" specifying criteria for a notable event, and every time one or more events satisfy the criteria, the application can indicate that the one or more events are notable. A user can alternatively select a pre-defined correlation search provided by the application. Note that correlation searches can be run continuously or at regular intervals (e.g., every hour) to search for notable events. Upon detection, notable events can be stored in a dedicated "notable events index," which can be subsequently accessed to generate various visualizations containing security-related information. Also, alerts can be generated to notify system operators when important notable events are discovered.

Figure 8A:
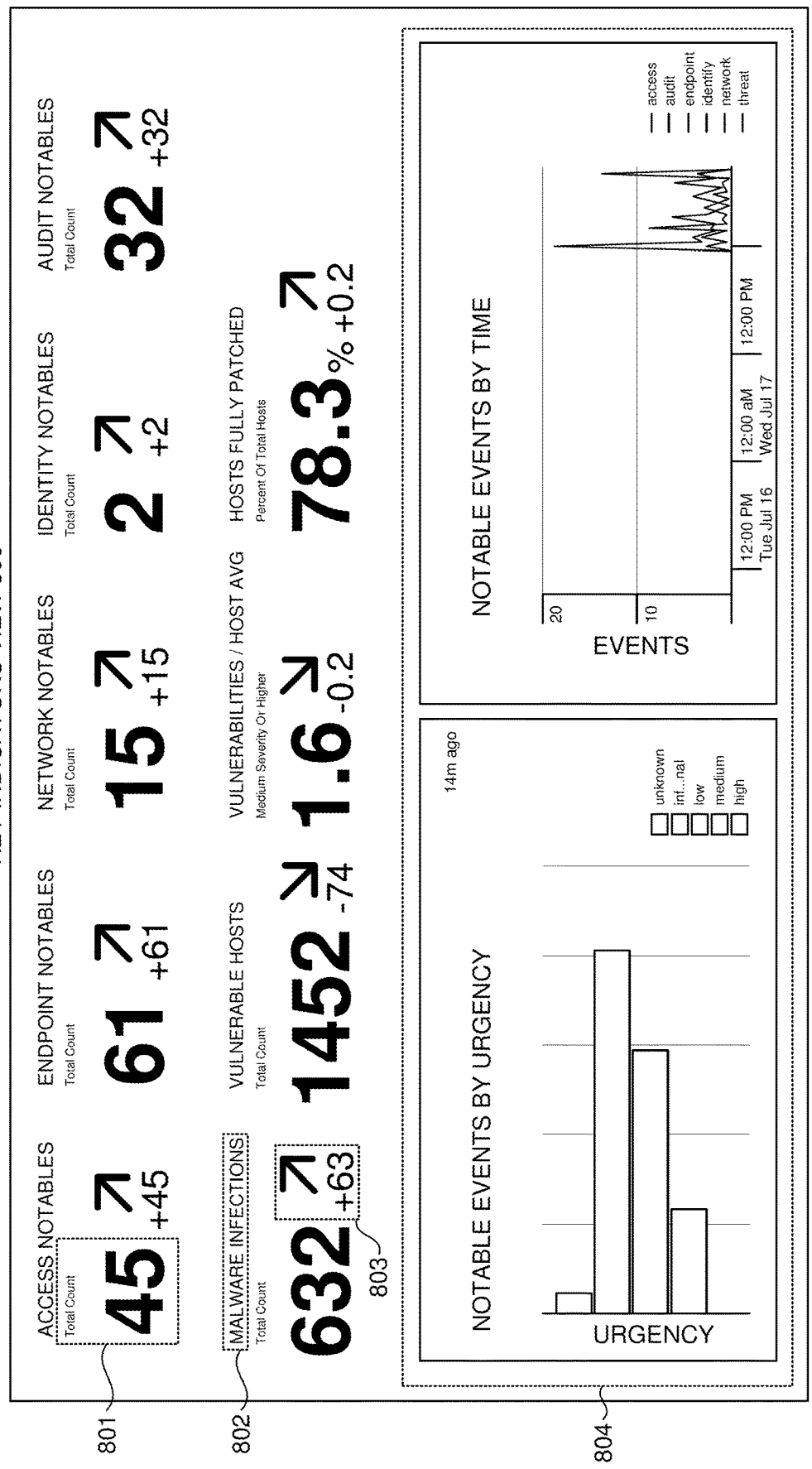
FIG. 8A illustrates a key indicators view in accordance with the disclosed embodiments.

The SPLUNK® APP FOR ENTERPRISE SECURITY provides various visualizations to aid in discovering security threats, such as a "key indicators view" that enables a user to view security metrics, such as counts of different types of notable events. For example, FIG. 8A illustrates an example key indicators view 800 that comprises a dashboard, which can display a value 801, for various security-related metrics, such as malware infections 802. It can also display a change in a metric value 803, which indicates that the number of malware infections increased by 63 during the preceding interval. Key indicators view 800 additionally displays a histogram panel 804 that displays a histogram of notable events organized by urgency values, and a histogram of notable events organized by time intervals. This key indicators view is described in further detail in pending U.S. patent application Ser. No. 13/956,338, entitled "Key Indicators View", filed on 31 Jul. 2013, and which is hereby incorporated by reference in its entirety for all purposes.

These visualizations can also include an "incident review dashboard" that enables a user to view and act on "notable events." These notable events can include: (1) a single event of high importance, such as any activity from a known web attacker; or (2) multiple events that collectively warrant review, such as a large number of authentication failures on a host followed by a successful authentication. For example, FIG. 8B illustrates an example incident review dashboard 810 that includes a set of incident attribute fields 811 that, for example, enables a user to specify a time range field 812 for the displayed events. It also includes a timeline 813 that graphically illustrates the number of incidents that occurred in time intervals over the selected time range. It additionally displays an events list 814 that enables a user to view a list of all of the notable events that match the criteria in the incident attributes fields 811. To facilitate identifying patterns among the notable events, each notable event can be associated with an urgency value (e.g., low, medium, high, critical), which is indicated in the incident review dashboard. The urgency value for a detected event can be determined based on the severity of the event and the priority of the system component associated with the event.

2.12. Cloud-Based System Overview

The example data intake and query system 108 described in reference to FIG. 2 comprises several system components, including one or more forwarders, indexers, and search heads. In some environments, a user of a data intake and query system 108 may install and configure, on computing devices owned and operated by the user, one or more software applications that implement some or all of these system components. For example, a user may install a software application on server computers owned by the user and configure each server to operate as one or more of a forwarder, an indexer, a search head, etc. This arrangement generally may be referred to as an "on-premises" solution. That is, the system 108 is installed and operates on computing devices directly controlled by the user of the system. Some users may prefer an on-premises solution because it may provide a greater level of control over the configuration of certain aspects of the system (e.g., security, privacy, standards, controls, etc.). However, other users may instead prefer an arrangement in which the user is not directly responsible for providing and managing the computing devices upon which various components of system 108 operate.

In one embodiment, to provide an alternative to an entirely on-premises environment for system 108, one or more of the components of a data intake and query system instead may be provided as a cloud-based service. In this context, a cloud-based service refers to a service hosted by one more computing resources that are accessible to end users over a network, for example, by using a web browser or other application on a client device to interface with the remote computing resources. For example, a service provider may provide a cloud-based data intake and query system by managing computing resources configured to implement various aspects of the system (e.g., forwarders, indexers, search heads, etc.) and by providing access to the system to end users via a network. Typically, a user may pay a subscription or other fee to use such a service. Each subscribing user of the cloud-based service may be provided with an account that enables the user to configure a customized cloud-based system based on the user's preferences.

Figure 9:
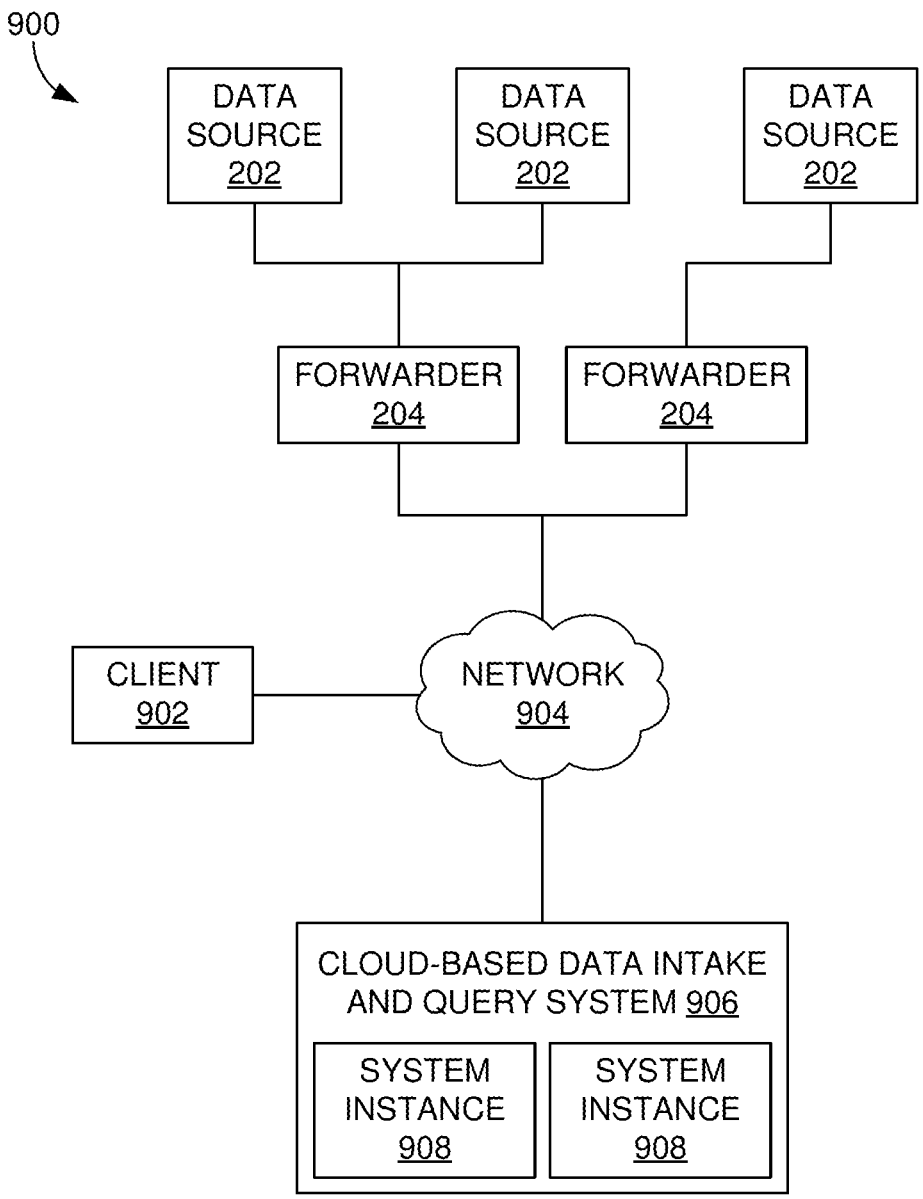
FIG. 9 illustrates a block diagram of an example cloud-based data intake and query system in which an embodiment may be implemented.

FIG. 9 illustrates a block diagram of an example cloud-based data intake and query system. Similar to the system of FIG. 2, the networked computer system 900 includes input data sources 202 and forwarders 204. These input data sources and forwarders may be in a subscriber's private computing environment. Alternatively, they might be directly managed by the service provider as part of the cloud service. In the example system 900, one or more forwarders 204 and client devices 902 are coupled to a cloud-based data intake and query system 906 via one or more networks 904. Network 904 broadly represents one or more LANs, WANs, cellular networks, intranetworks, internetworks, etc., using any of wired, wireless, terrestrial microwave, satellite links, etc., and may include the public Internet, and is used by client devices 902 and forwarders 204 to access the system 906. Similar to the system of 108, each of the forwarders 204 may be configured to receive data from an input source and to forward the data to other components of the system 906 for further processing.

In an embodiment, a cloud-based data intake and query system 906 may comprise a plurality of system instances 908. In general, each system instance 908 may include one or more computing resources managed by a provider of the cloud-based system 906 made available to a particular subscriber. The computing resources comprising a system instance 908 may, for example, include one or more servers or other devices configured to implement one or more forwarders, indexers, search heads, and other components of a data intake and query system, similar to system 108. As indicated above, a subscriber may use a web browser or other application of a client device 902 to access a web portal or other interface that enables the subscriber to configure an instance 908.

Providing a data intake and query system as described in reference to system 108 as a cloud-based service presents a number of challenges. Each of the components of a system 108 (e.g., forwarders, indexers and search heads) may at times refer to various configuration files stored locally at each component. These configuration files typically may involve some level of user configuration to accommodate particular types of data a user desires to analyze and to account for other user preferences. However, in a cloud-based service context, users typically may not have direct access to the underlying computing resources implementing the various system components (e.g., the computing resources comprising each system instance 908) and may desire to make such configurations indirectly, for example, using one or more web-based interfaces. Thus, the techniques and systems described herein for providing user interfaces that enable a user to configure source type definitions are applicable to both on-premises and cloud-based service contexts, or some combination thereof (e.g., a hybrid system where both an on-premises environment such as SPLUNK® ENTERPRISE and a cloud-based environment such as SPLUNK CLOUD™ are centrally visible).

2.13. Searching Externally Archived Data

Figure 10:
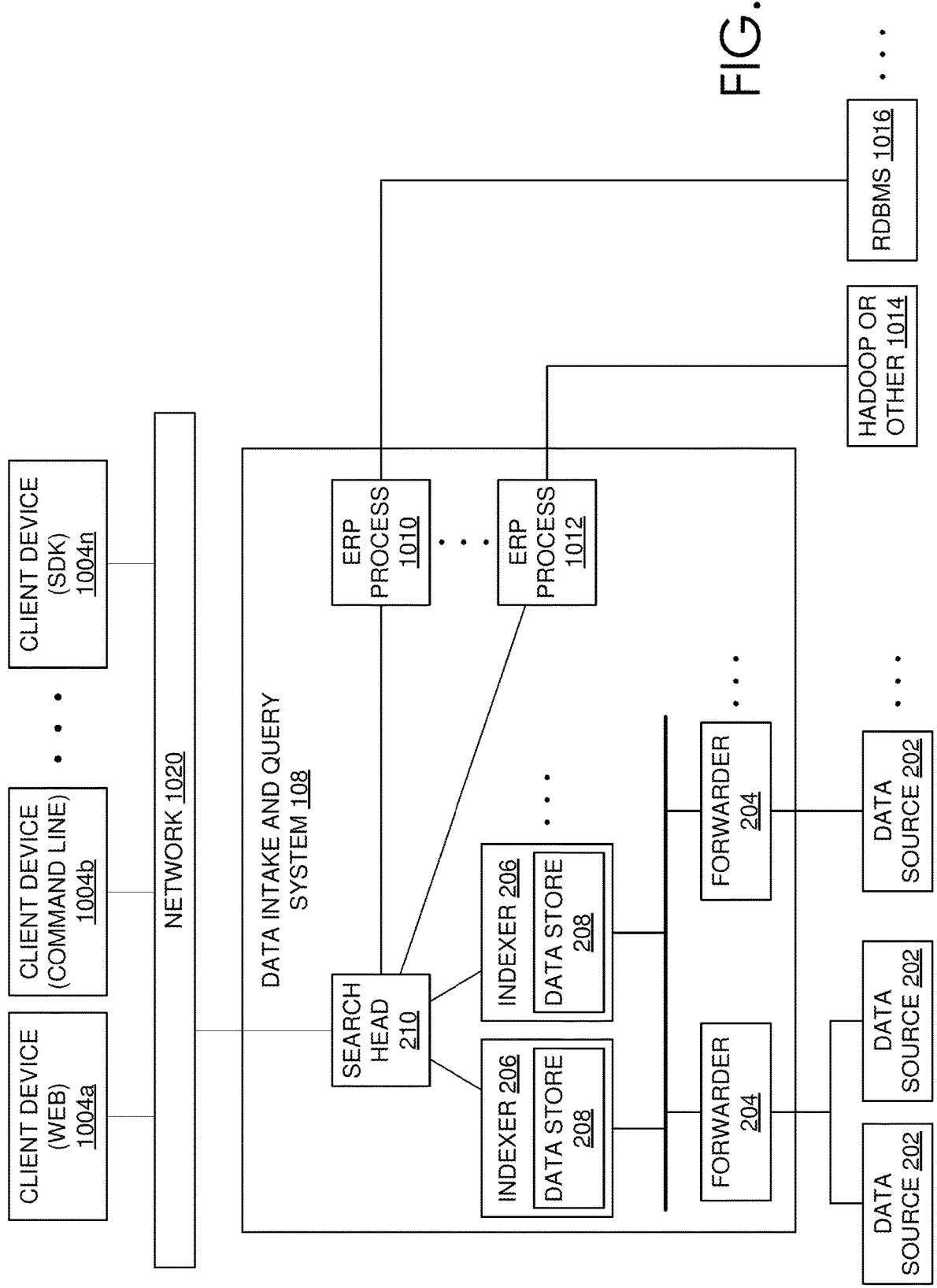
FIG. 10 illustrates a block diagram of an example data intake and query system that performs searches across external data systems in accordance with the disclosed embodiments.

FIG. 10 shows a block diagram of an example of a data intake and query system 108 that provides transparent search facilities for data systems that are external to the data intake and query system. Such facilities are available in the HUNK® system provided by Splunk Inc. of San Francisco, Calif. HUNK® represents an analytics platform that enables business and IT teams to rapidly explore, analyze, and visualize data in Hadoop and NoSQL data stores.

The search head 210 of the data intake and query system receives search requests from one or more client devices 1004 over network connections 1020. As discussed above, the data intake and query system 108 may reside in an enterprise location, in the cloud, etc. FIG. 10 illustrates that multiple client devices 1004*a*, 1004*b*, . . . , 1004*n* may communicate with the data intake and query system 108. The client devices 1004 may communicate with the data intake and query system using a variety of connections. For example, one client device in FIG. 10 is illustrated as communicating over an Internet (Web) protocol, another client device is illustrated as communicating via a command line interface, and another client device is illustrated as communicating via a system developer kit (SDK).

The search head 210 analyzes the received search request to identify request parameters. If a search request received from one of the client devices 1004 references an index maintained by the data intake and query system, then the search head 210 connects to one or more indexers 206 of the data intake and query system for the index referenced in the request parameters. That is, if the request parameters of the search request reference an index, then the search head accesses the data in the index via the indexer. The data intake and query system 108 may include one or more indexers 206, depending on system access resources and requirements. As described further below, the indexers 206 retrieve data from their respective local data stores 208 as specified in the search request. The indexers and their respective data stores can comprise one or more storage devices and typically reside on the same system, though they may be connected via a local network connection.

If the request parameters of the received search request reference an external data collection, which is not accessible to the indexers 206 or under the management of the data intake and query system, then the search head 210 can access the external data collection through an External Result Provider (ERP) process 1010. An external data collection may be referred to as a "virtual index" (plural, "virtual indices"). An ERP process provides an interface through which the search head 210 may access virtual indices.

Thus, a search reference to an index of the system relates to a locally stored and managed data collection. In contrast, a search reference to a virtual index relates to an externally stored and managed data collection, which the search head may access through one or more ERP processes 1010, 1012. FIG. 10 shows two ERP processes 1010, 1012 that connect to respective remote (external) virtual indices, which are indicated as a Hadoop or another system 1014 (e.g., Amazon S3, Amazon EMR, other Hadoop Compatible File Systems (HCFS), etc.) and a relational database management system (RDBMS) 1016. Other virtual indices may include other file organizations and protocols, such as Structured Query Language (SQL) and the like. The ellipses between the ERP processes 1010, 1012 indicate optional additional ERP processes of the data intake and query system 108. An ERP process may be a computer process that is initiated or spawned by the search head 210 and is executed by the search data intake and query system 108. Alternatively or additionally, an ERP process may be a process spawned by the search head 210 on the same or different host system as the search head 210 resides.

The search head 210 may spawn a single ERP process in response to multiple virtual indices referenced in a search request, or the search head may spawn different ERP processes for different virtual indices. Generally, virtual indices that share common data configurations or protocols may share ERP processes. For example, all search query references to a Hadoop file system may be processed by the same ERP process, if the ERP process is suitably configured. Likewise, all search query references to an SQL database may be processed by the same ERP process. In addition, the search head may provide a common ERP process for common external data source types (e.g., a common vendor may utilize a common ERP process, even if the vendor includes different data storage system types, such as Hadoop and SQL). Common indexing schemes also may be handled by common ERP processes, such as flat text files or Weblog files.

The search head 210 determines the number of ERP processes to be initiated via the use of configuration parameters that are included in a search request message. Generally, there is a one-to-many relationship between an external results provider "family" and ERP processes. There is also a one-to-many relationship between an ERP process and corresponding virtual indices that are referred to in a search request. For example, using RDBMS, assume two independent instances of such a system by one vendor, such as one RDBMS for production and another RDBMS used for development. In such a situation, it is likely preferable (but optional) to use two ERP processes to maintain the independent operation as between production and development data. Both of the ERPs, however, will belong to the same family, because the two RDBMS system types are from the same vendor.

The ERP processes 1010, 1012 receive a search request from the search head 210. The search head may optimize the received search request for execution at the respective external virtual index. Alternatively, the ERP process may receive a search request as a result of analysis performed by the search head or by a different system process. The ERP processes 1010, 1012 can communicate with the search head 210 via conventional input/output routines (e.g., standard in/standard out, etc.). In this way, the ERP process receives the search request from a client device such that the search request may be efficiently executed at the corresponding external virtual index.

The ERP processes 1010, 1012 may be implemented as a process of the data intake and query system. Each ERP process may be provided by the data intake and query system, or may be provided by process or application providers who are independent of the data intake and query system. Each respective ERP process may include an interface application installed at a computer of the external result provider that ensures proper communication between the search support system and the external result provider. The ERP processes 1010, 1012 generate appropriate search requests in the protocol and syntax of the respective virtual indices 1014, 1016, each of which corresponds to the search request received by the search head 210. Upon receiving search results from their corresponding virtual indices, the respective ERP process passes the result to the search head 210, which may return or display the results or a processed set of results based on the returned results to the respective client device.

Client devices 1004 may communicate with the data intake and query system 108 through a network interface 1020, e.g., one or more LANs, WANs, cellular networks, intranetworks, and/or internetworks using any of wired, wireless, terrestrial microwave, satellite links, etc., and may include the public Internet.

The analytics platform utilizing the External Result Provider process described in more detail in U.S. Pat. No. 8,738,629, entitled "External Result Provided Process For RetriEving Data Stored Using A Different Configuration Or Protocol", issued on 27 May 2014, U.S. Pat. No. 8,738,587, entitled "PROCESSING A SYSTEM SEARCH REQUEST BY RETRIEVING RESULTS FROM BOTH A NATIVE INDEX AND A VIRTUAL INDEX", issued on 25 Jul. 2013, U.S. patent application Ser. No. 14/266,832, entitled "PROCESSING A SYSTEM SEARCH REQUEST ACROSS DISPARATE DATA COLLECTION SYSTEMS", filed on 1 May 2014, and U.S. patent application Ser. No. 14/449,144, entitled "PROCESSING A SYSTEM SEARCH REQUEST INCLUDING EXTERNAL DATA SOURCES", filed on 31 Jul. 2014, each of which is hereby incorporated by reference in its entirety for all purposes.

2.13.1. ERP Process Features

The ERP processes described above may include two operation modes: a streaming mode and a reporting mode. The ERP processes can operate in streaming mode only, in reporting mode only, or in both modes simultaneously. Operating in both modes simultaneously is referred to as mixed mode operation. In a mixed mode operation, the ERP at some point can stop providing the search head with streaming results and only provide reporting results thereafter, or the search head at some point may start ignoring streaming results it has been using and only use reporting results thereafter.

The streaming mode returns search results in real time, with minimal processing, in response to the search request. The reporting mode provides results of a search request with processing of the search results prior to providing them to the requesting search head, which in turn provides results to the requesting client device. ERP operation with such multiple modes provides greater performance flexibility with regard to report time, search latency, and resource utilization.

In a mixed mode operation, both streaming mode and reporting mode are operating simultaneously. The streaming mode results (e.g., the raw data obtained from the external data source) are provided to the search head, which can then process the results data (e.g., break the raw data into events, timestamp it, filter it, etc.) and integrate the results data with the results data from other external data sources, and/or from data stores of the search head. The search head performs such processing and can immediately start returning interim (streaming mode) results to the user at the requesting client device; simultaneously, the search head is waiting for the ERP process to process the data it is retrieving from the external data source as a result of the concurrently executing reporting mode.

In some instances, the ERP process initially operates in a mixed mode, such that the streaming mode operates to enable the ERP quickly to return interim results (e.g., some of the raw or unprocessed data necessary to respond to a search request) to the search head, enabling the search head to process the interim results and begin providing to the client or search requester interim results that are responsive to the query. Meanwhile, in this mixed mode, the ERP also operates concurrently in reporting mode, processing portions of raw data in a manner responsive to the search query. Upon determining that it has results from the reporting mode available to return to the search head, the ERP may halt processing in the mixed mode at that time (or some later time) by stopping the return of data in streaming mode to the search head and switching to reporting mode only. The ERP at this point starts sending interim results in reporting mode to the search head, which in turn may then present this processed data responsive to the search request to the client or search requester. Typically the search head switches from using results from the ERP's streaming mode of operation to results from the ERP's reporting mode of operation when the higher bandwidth results from the reporting mode outstrip the amount of data processed by the search head in the]streaming mode of ERP operation.

A reporting mode may have a higher bandwidth because the ERP does not have to spend time transferring data to the search head for processing all the raw data. In addition, the ERP may optionally direct another processor to do the processing.

The streaming mode of operation does not need to be stopped to gain the higher bandwidth benefits of a reporting mode; the search head could simply stop using the streaming mode results—and start using the reporting mode results— when the bandwidth of the reporting mode has caught up with or exceeded the amount of bandwidth provided by the streaming mode. Thus, a variety of triggers and ways to accomplish a search head's switch from using streaming mode results to using reporting mode results may be appreciated by one skilled in the art.

The reporting mode can involve the ERP process (or an external system) performing event breaking, time stamping, filtering of events to match the search query request, and calculating statistics on the results. The user can request particular types of data, such as if the search query itself involves types of events, or the search request may ask for statistics on data, such as on events that meet the search request. In either case, the search head understands the query language used in the received query request, which may be a proprietary language. One exemplary query language is Splunk Processing Language (SPL) developed by the assignee of the application, Splunk Inc. The search head typically understands how to use that language to obtain data from the indexers, which store data in a format used by the SPLUNK® Enterprise system.

The ERP processes support the search head, as the search head is not ordinarily configured to understand the format in which data is stored in external data sources such as Hadoop or SQL data systems. Rather, the ERP process performs that translation from the query submitted in the search support system's native format (e.g., SPL if SPLUNK® ENTERPRISE is used as the search support system) to a search query request format that will be accepted by the corresponding external data system. The external data system typically stores data in a different format from that of the search support system's native index format, and it utilizes a different query language (e.g., SQL or MapReduce, rather than SPL or the like).

As noted, the ERP process can operate in the streaming mode alone. After the ERP process has performed the translation of the query request and received raw results from the streaming mode, the search head can integrate the returned data with any data obtained from local data sources (e.g., native to the search support system), other external data sources, and other ERP processes (if such operations were required to satisfy the terms of the search query). An advantage of mixed mode operation is that, in addition to streaming mode, the ERP process is also executing concurrently in reporting mode. Thus, the ERP process (rather than the search head) is processing query results (e.g., performing event breaking, timestamping, filtering, possibly calculating statistics if required to be responsive to the search query request, etc.). It should be apparent to those skilled in the art that additional time is needed for the ERP process to perform the processing in such a configuration. Therefore, the streaming mode will allow the search head to start returning interim results to the user at the client device before the ERP process can complete sufficient processing to start returning any search results. The switchover between streaming and reporting mode happens when the ERP process determines that the switchover is appropriate, such as when the ERP process determines it can begin returning meaningful results from its reporting mode.

The operation described above illustrates the source of operational latency: streaming mode has low latency (immediate results) and usually has relatively low bandwidth (fewer results can be returned per unit of time). In contrast, the concurrently running reporting mode has relatively high latency (it has to perform a lot more processing before returning any results) and usually has relatively high bandwidth (more results can be processed per unit of time). For example, when the ERP process does begin returning report results, it returns more processed results than in the streaming mode, because, e.g., statistics only need to be calculated to be responsive to the search request. That is, the ERP process doesn't have to take time to first return raw data to the search head. As noted, the ERP process could be configured to operate in streaming mode alone and return just the raw data for the search head to process in a way that is responsive to the search request. Alternatively, the ERP process can be configured to operate in the reporting mode only. Also, the ERP process can be configured to operate in streaming mode and reporting mode concurrently, as described, with the ERP process stopping the transmission of streaming results to the search head when the concurrently running reporting mode has caught up and started providing results. The reporting mode does not require the processing of all raw data that is responsive to the search query request before the ERP process starts returning results; rather, the reporting mode usually performs processing of chunks of events and returns the processing results to the search head for each chunk.

For example, an ERP process can be configured to merely return the contents of a search result file verbatim, with little or no processing of results. That way, the search head performs all processing (such as parsing byte streams into events, filtering, etc.). The ERP process can be configured to perform additional intelligence, such as analyzing the search request and handling all the computation that a native search indexer process would otherwise perform. In this way, the configured ERP process provides greater flexibility in features while operating according to desired preferences, such as response latency and resource requirements.

2.14. IT Service Monitoring

As previously mentioned, the SPLUNK® ENTERPRISE platform provides various schemas, dashboards and visualizations that make it easy for developers to create applications to provide additional capabilities. One such application is SPLUNK® IT SERVICE INTELLIGENCE™, which performs monitoring and alerting operations. It also includes analytics to help an analyst diagnose the root cause of performance problems based on large volumes of data stored by the SPLUNK® ENTERPRISE system as correlated to the various services an IT organization provides (a service-centric view). This differs significantly from conventional IT monitoring systems that lack the infrastructure to effectively store and analyze large volumes of service-related event data. Traditional service monitoring systems typically use fixed schemas to extract data from pre-defined fields at data ingestion time, wherein the extracted data is typically stored in a relational database. This data extraction process and associated reduction in data content that occurs at data ingestion time inevitably hampers future investigations, when all of the original data may be needed to determine the root cause of or contributing factors to a service issue.

In contrast, a SPLUNK® IT SERVICE INTELLIGENCE™ system stores large volumes of minimally-processed service-related data at ingestion time for later retrieval and analysis at search time, to perform regular monitoring, or to investigate a service issue. To facilitate this data retrieval process, SPLUNK® IT SERVICE INTELLIGENCE™ enables a user to define an IT operations infrastructure from the perspective of the services it provides. In this service-centric approach, a service such as corporate e-mail may be defined in terms of the entities employed to provide the service, such as host machines and network devices. Each entity is defined to include information for identifying all of the event data that pertains to the entity, whether produced by the entity itself or by another machine, and considering the many various ways the entity may be identified in raw machine data (such as by a URL, an IP address, or machine name). The service and entity definitions can organize event data around a service so that all of the event data pertaining to that service can be easily identified. This capability provides a foundation for the implementation of Key Performance Indicators.

One or more Key Performance Indicators (KPI's) are defined for a service within the SPLUNK® IT SERVICE INTELLIGENCE™ application. Each KPI measures an aspect of service performance at a point in time or over a period of time (aspect KPI's). Each KPI is defined by a search query that derives a KPI value from the machine data of events associated with the entities that provide the service. Information in the entity definitions may be used to identify the appropriate events at the time a KPI is defined or whenever a KPI value is being determined. The KPI values derived over time may be stored to build a valuable repository of current and historical performance information for the service, and the repository, itself, may be subject to search query processing. Aggregate KPIs may be defined to provide a measure of service performance calculated from a set of service aspect KPI values; this aggregate may even be taken across defined timeframes and/or across multiple services. A particular service may have an aggregate KPI derived from substantially all of the aspect KPI's of the service to indicate an overall health score for the service.

SPLUNK® IT SERVICE INTELLIGENCE™ facilitates the production of meaningful aggregate KPI's through a system of KPI thresholds and state values. Different KPI definitions may produce values in different ranges, and so the same value may mean something very different from one KPI definition to another. To address this, SPLUNK® IT SERVICE INTELLIGENCE™ implements a translation of individual KPI values to a common domain of "state" values. For example, a KPI range of values may be 1-100, or 50-275, while values in the state domain may be 'critical,' 'warning,' 'normal,' and 'informational.' Thresholds associated with a particular KPI definition determine ranges of values for that KPI that correspond to the various state values. In one case, KPI values 95-100 may be set to correspond to 'critical' in the state domain. KPI values from disparate KPI's can be processed uniformly once they are translated into the common state values using the thresholds. For example, "normal 80% of the time" can be applied across various KPI's. To provide meaningful aggregate KPI's, a weighting value can be assigned to each KPI so that its influence on the calculated aggregate KPI value is increased or decreased relative to the other KPI's.

One service in an IT environment often impacts, or is impacted by, another service. SPLUNK® IT SERVICE INTELLIGENCE™ can reflect these dependencies. For example, a dependency relationship between a corporate e-mail service and a centralized authentication service can be reflected by recording an association between their respective service definitions. The recorded associations establish a service dependency topology that informs the data or selection options presented in a GUI, for example. (The service dependency topology is like a "map" showing how services are connected based on their dependencies.) The service topology may itself be depicted in a GUI and may be interactive to allow navigation among related services.

Entity definitions in SPLUNK® IT SERVICE INTELLIGENCE™ can include informational fields that can serve as metadata, implied data fields, or attributed data fields for the events identified by other aspects of the entity definition. Entity definitions in SPLUNK® IT SERVICE INTELLIGENCE™ can also be created and updated by an import of tabular data (as represented in a CSV, another delimited file, or a search query result set). The import may be GUI-mediated or processed using import parameters from a GUI-based import definition process. Entity definitions in SPLUNK® IT SERVICE INTELLIGENCE™ can also be associated with a service by means of a service definition rule. Processing the rule results in the matching entity definitions being associated with the service definition. The rule can be processed at creation time, and thereafter on a scheduled or on-demand basis. This allows dynamic, rule-based updates to the service definition.

During operation, SPLUNK® IT SERVICE INTELLIGENCE™ can recognize so-called "notable events" that may indicate a service performance problem or other situation of interest. These notable events can be recognized by a "correlation search" specifying trigger criteria for a notable event: every time KPI values satisfy the criteria, the application indicates a notable event. A severity level for the notable event may also be specified. Furthermore, when trigger criteria are satisfied, the correlation search may additionally or alternatively cause a service ticket to be created in an IT service management (ITSM) system, such as a systems available from ServiceNow, Inc., of Santa Clara, Calif.

SPLUNK® IT SERVICE INTELLIGENCE™ provides various visualizations built on its service-centric organization of event data and the KPI values generated and collected. Visualizations can be particularly useful for monitoring or investigating service performance. SPLUNK® IT SERVICE INTELLIGENCE™ provides a service monitoring interface suitable as the home page for ongoing IT service monitoring. The interface is appropriate for settings such as desktop use or for a wall-mounted display in a network operations center (NOC). The interface may prominently display a services health section with tiles for the aggregate KPI's indicating overall health for defined services and a general KPI section with tiles for KPI's related to individual service aspects. These tiles may display KPI information in a variety of ways, such as by being colored and ordered according to factors like the KPI state value. They also can be interactive and navigate to visualizations of more detailed KPI information.

SPLUNK® IT SERVICE INTELLIGENCE™ provides a service-monitoring dashboard visualization based on a user-defined template. The template can include user-selectable widgets of varying types and styles to display KPI information. The content and the appearance of widgets can respond dynamically to changing KPI information. The KPI widgets can appear in conjunction with a background image, user drawing objects, or other visual elements, that depict the IT operations environment, for example. The KPI widgets or other GUI elements can be interactive so as to provide navigation to visualizations of more detailed KPI information.

SPLUNK® IT SERVICE INTELLIGENCE™ provides a visualization showing detailed time-series information for multiple KPI's in parallel graph lanes. The length of each lane can correspond to a uniform time range, while the width of each lane may be automatically adjusted to fit the displayed KPI data. Data within each lane may be displayed in a user selectable style, such as a line, area, or bar chart. During operation a user may select a position in the time range of the graph lanes to activate lane inspection at that point in time. Lane inspection may display an indicator for the selected time across the graph lanes and display the KPI value associated with that point in time for each of the graph lanes. The visualization may also provide navigation to an interface for defining a correlation search, using information from the visualization to pre-populate the definition.

SPLUNK® IT SERVICE INTELLIGENCE™ provides a visualization for incident review showing detailed information for notable events. The incident review visualization may also show summary information for the notable events over a time frame, such as an indication of the number of notable events at each of a number of severity levels. The severity level display may be presented as a rainbow chart with the warmest color associated with the highest severity classification. The incident review visualization may also show summary information for the notable events over a time frame, such as the number of notable events occurring within segments of the time frame. The incident review visualization may display a list of notable events within the time frame ordered by any number of factors, such as time or severity. The selection of a particular notable event from the list may display detailed information about that notable event, including an identification of the correlation search that generated the notable event.

SPLUNK® IT SERVICE INTELLIGENCE™ provides pre-specified schemas for extracting relevant values from the different types of service-related event data. It also enables a user to define such schemas.

3.0. GRAPHICAL RISK MONITORING SYSTEM

As further described herein, the data intake and query system 108 described in conjunction with FIGS. 1-10 can be used in conjunction with a risk monitoring system, described in conjunction with FIGS. 11-20B, in order to search and analyze computer data based on certain criteria determined to be relevant to a particular risk or condition associated with the computer system.

In this manner, the risk monitoring system may store these criteria as risk definitions, and the risk monitoring system may search the computer data based on these stored risk definitions, thus enabling searching the computer data without requiring a user to repeatedly enter complicated search query commands or algorithms each time a search of the computer data is performed. Further, the risk monitoring system causes representations of these risk definitions, corresponding risk objects which represent searches based on the risk definitions, and logical operators to be displayed via a user interface (UI). Further, these risk definitions, risk objects, and logical operators may be selected and/or manipulated graphically by a user via the UI to cause the risk monitoring system to perform a search of the actual computer data based on a selected stored risk definition, or to operate on and/or combine information associated with the selected searches as represented by the risk objects. In this manner, a user is not required to manually or repeatedly enter combinations of the complicated search query commands or algorithms, and manually combine these commands or algorithms using logical operations, in order to perform a search of the computer data or operate on information associated with the searches. Rather, the risk monitoring system enables a user to perform these tasks more efficiently via the UI, without requiring a technical proficiency with a particular computer programming language syntax that is required by conventional approaches.

The risk monitoring system is now described in further detail herein. In various embodiments, the computer data being searched may be associated with client devices 102, host devices 106, the data intake and query system 108, and/or any other devices and systems communicating over one or more networks 104. The risk monitoring system may receive and analyze data that is part of an event referred to herein as "event data" and stored within the data intake and query system 108. In addition, the risk monitoring system may receive and analyze raw machine data, such as data received or retrieved from one or more system log files, streams of network packet data, sensor data, application program data, error logs, stack traces, system performance data, and so on. In addition, the risk monitoring system may receive and analyze any other technically feasible form of computer data.

In the context of "event data," the data intake and query system 108 and/or the risk monitoring system may process raw data to produce timestamped events. The data intake and query system 108 and/or the risk monitoring system may further store the timestamped events in a data store. In various embodiments, such a data store may be located in either or both of the data intake and query system 108 and/or the risk monitoring system. Although many of the techniques described herein are discussed with reference to a data intake and query system 108, these techniques are also applicable to all other types of data systems.

Figure 11:
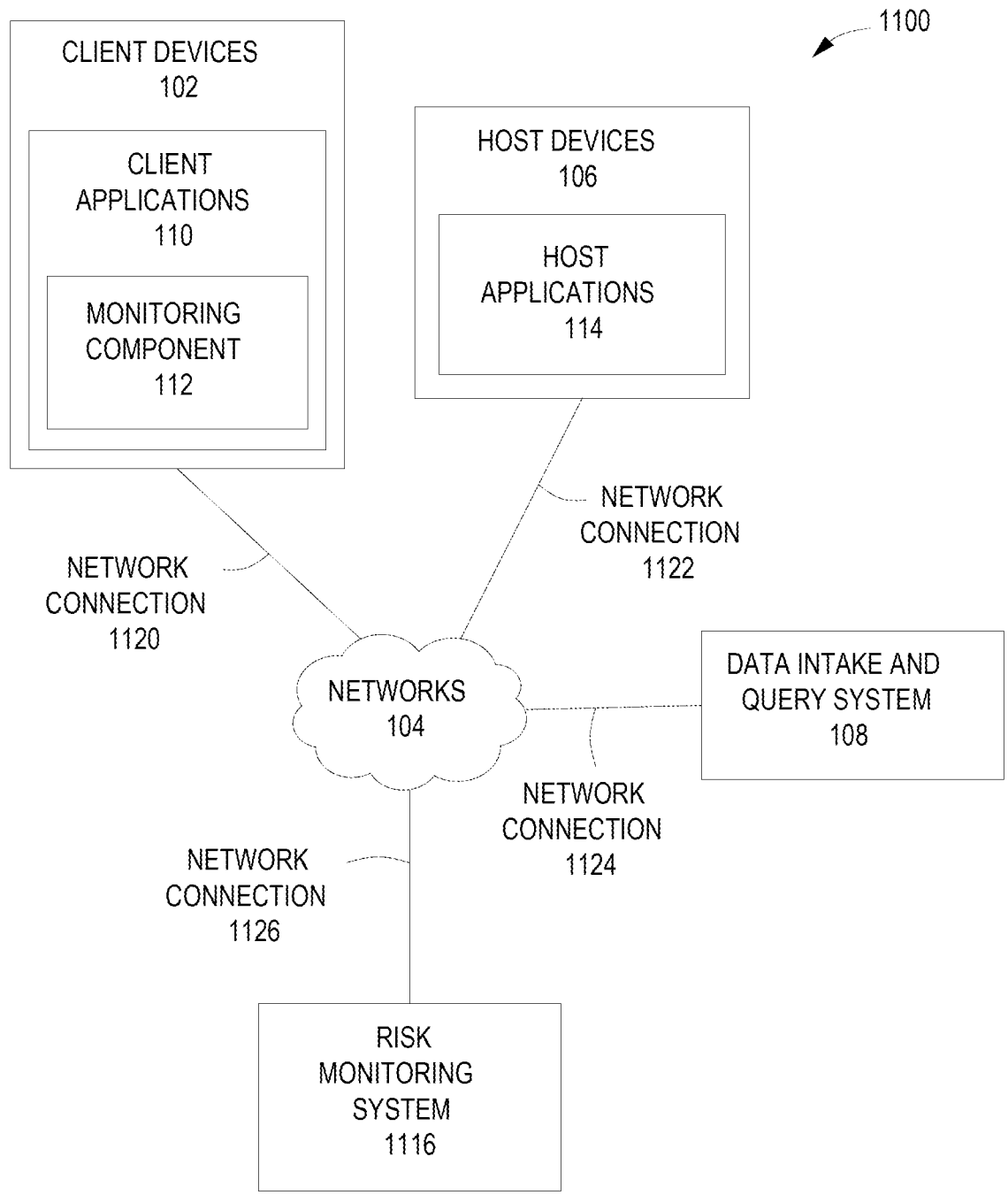
FIG. 11 illustrates another networked computer environment in which an embodiment may be implemented.

FIG. 11 illustrates a networked computer environment 1100 in accordance with the disclosed embodiments. As shown, the networked computer environment 1100 includes, without limitation, client devices 102, host devices 106, a data intake and query system 108, and a risk monitoring system 1116 that communicate with each other over one or more networks 104. The networked computer environment 1100 also includes exemplary network connections 1120, 1122, 1124, and 1126 connecting client devices 102, host devices 106, the data intake and query system 108, and the risk monitoring system 1116, respectively, via the networks 104.

As shown, an exemplary network connection establishes a connection between a first computing device and a second computing device via one or more networks 104 and may include network links, switches, communication ports, or any means of connecting the first computing device with the second computing device via the one or more networks 104. The client devices 102, host devices 106, data intake and query system 108, and networks 104 may function substantially the same as corresponding elements of the networked computer environment 100 of FIG. 1 except as described herein.

As described herein, the risk monitoring system 1116 may receive and analyze any form of computer data, including "event data," raw machine data, network traffic data, network traffic packet data, and any other form of computer data that reflects activity in an information technology (IT) environment. In some embodiments, the risk monitoring system 1116 may cause any of client devices 102, host devices 106, and/or the data intake and query system 108 to receive and analyze the computer data.

The risk monitoring system 1116 is associated with the one or more computer networks 104. Network traffic may be exchanged via the one or more computer networks 104 in accordance with one or more network communications protocols. In some embodiments, network traffic is exchanged via the one or more computer networks 104 by sending and receiving data in the form of packets of data, where a transmission unit for the network traffic is a packet of data. The network traffic data may be in any format, including, without limitation, raw machine data, event data derived from the raw machine data as further described herein, metadata regarding data packets exchanged via the connection, data packets, portions of data packets, such as packet headers, any forms of metadata regarding the network traffic, or any other form of computer data from a data source. The network traffic data may be accessed from log files associated with client devices 102, log files associated with host devices 106, packet capture data derived from message traffic over networks 104, or any other type of real-time or archived data source for data representing network traffic data.

The risk monitoring system 1116 identifies computer data that represents potential risks or conditions related to the computer network or one or more computers included in the computer network, based on certain defined criteria related to the particular risks or conditions. In some embodiments, the specific criteria used to determine whether the computer data is relevant to a particular risk or condition may be defined or selected by a user, may be predetermined, and/or may be determined in any other technically feasible manner.

The criteria for determining whether computer data is relevant to a particular risk or condition may be applicable to any field or type of computer data. For instance, the risk monitoring system 1116 may search for and analyze computer data related to fraud, where the criteria determine which computer data is relevant to incidents or threats of fraudulent behavior or transactions by one or more users or computers interacting with the computer system. Further, the risk monitoring system 1116 may search for and analyze computer data related to security, where the criteria determine which computer data is relevant to breaches or threats to the security associated with one or more users or computers interacting with the computer system. In addition, the risk monitoring system 1116 may search for and analyze computer data related to performance, where the criteria determine which computer data is relevant to the performance or performance issues within the computer system. Moreover, the risk monitoring system 1116 may search for and analyze computer data related to business analytics, where the criteria determine which computer data is relevant to certain characteristics of business transactions within the computer system. In general, the risk monitoring system 1116 may search for and analyze computer data related to any technically feasible type of computer data.

In some embodiments, the risk monitoring system 1116 searches and analyzes computer data based on one or more search query commands, where the search query commands specify the criteria for determining whether the computer data is relevant to a particular risk or condition. These search query commands may be programmed by a user or may be predetermined. Further, these search query commands may include commands in a computer programming language or search processing language (SPL), such as SPLUNK® SPL, where the commands comply with a computer language syntax, or may include any technically feasible computer commands that comply with a computer language syntax.

In some embodiments, the risk monitoring system 1116 searches and analyzes computer data based on one or more algorithms, where the algorithms specify the criteria for determining whether the computer data is relevant to a particular risk or condition. These algorithms, referred to herein as "machine-learning algorithms," may be programmed by a user or may be predetermined, and may utilize any form of computer programming algorithms or any form of machine learning, including, without limitation, neural networks, decision trees, or any other form of machine learning. Further, these machine-learning algorithms may utilize computer commands and/or algorithms programmed in a computer programming language or search processing language (SPL), such as SPLUNK® SPL, where the algorithms may comply with a computer language syntax, or may include any technically feasible computer algorithms.

In various embodiments, the risk monitoring system 1116 may store these criteria in a memory as a "risk definition." In this manner, risk definitions may be stored for future use in order to enable a user to perform future searches of computer data based on accessing the stored risk definitions. In this manner, the risk monitoring system 1116 may perform future searches of computer data based on accessing the stored risk definitions, without requiring the user to repeatedly enter complicated search query commands or machine-learning algorithms each time a search is performed.

The risk monitoring system 1116 may search the computer data based on a risk definition in response to a user action (e.g., a user request), in a predetermined or automated manner (e.g., on a periodic basis or at a specified time), or in any other manner. In some embodiments, the risk definitions may be stored in the risk monitoring system 1116, in the data intake and query system 108, in any of the host devices 106, or in any of the client devices 102 in any manner. In some embodiments, the risk definitions may include the one or more search query commands themselves, information specifying the applicable search query commands, the machine-learning algorithms themselves, information specifying the applicable machine-learning algorithms, or any form of information identifying the criteria for determining whether computer data is relevant to a particular risk or condition.

In various embodiments, the risk monitoring system 1116 may cause representations of one or more risk definitions to be displayed to a user through a UI, such as a graphical user interface (GUI). In some embodiments, the risk monitoring system 1116 may receive a selection via the UI, such as a user selection or an automated selection, to create a new risk definition or modify one or more of the stored risk definitions. For instance, a user may enter search query commands and/or machine-learning algorithms via the UI to create or modify a stored risk definition.

In various embodiments, the risk monitoring system 1116 may cause representations of a "risk object," which corresponds to a stored risk definition, to be displayed to a user via the UI. The risk object is represented to the user to identify the search of the computer data based on the stored risk definition and/or to identify a characteristic associated with the computer data resulting from the search, such as a risk score resulting from the search, as further described herein. In some embodiments, the risk monitoring system 1116 may receive a selection to form a group of two or more risk objects via the UI using a selection mechanism, such as by graphical selection via the UI (e.g., by dragging-and-dropping the selected risk objects onto a canvas located in the UI, or using highlighting or selection box mechanisms), any form of keyboard interaction, and so forth.

Further, the risk monitoring system 1116 may receive a selection via the UI, such as a user selection or an automated selection, to operate on or combine one or more of the displayed risk objects and/or groups of risk objects, in order to generate some form of result. For instance, a user may select two or more of the displayed risk objects to generate a combined result by combining or operating on information, such as risk scores, associated with the selected risk objects. In this manner, a user may define a "threat" as occurring when a particular combination of risk objects and/or groups of risk objects produces a particular result. In some embodiments, the user may select the one or more risk objects and/or groups of risk objects via a selection mechanism, such as by graphical selection via the UI, as described herein.

The risk monitoring system 1116 may cause a representation of one or more logical operators for operating on or combining the selected risk objects and/or groups of risk objects to be displayed via the UI, for selection by a user. In some embodiments, the logical operators may include any form of operators for operating on or combining information representing the selected risk objects in any technically-feasible manner. In various embodiments, the representations of the logical operators displayed in the UI may include one or more fields for a user to input or select the logical operators to be used. For instance, in the selection of the one or more logical operators, a user may input information for the operators, such as via a text input field, or a user may select operators, such as a via a graphical pull-down or drop-down menu, and so forth.

Once the risk monitoring system 1116 receives a selection of the one or more risk objects and/or groups of risk objects and the one or more logical operators, the risk monitoring system 1116 causes a result to be generated based on operating on and/or combining the selected one or more risk objects and/or groups of risk objects using the selected one or more logical operators. The generated result may include some form of metric or indicator identifying a characteristic of the computer data found to be relevant to the selected one or more risk objects and/or groups of risk objects.

In various embodiments, the risk monitoring system 1116 determines whether a "threat" is detected based on the generated result of operating on and/or combining the selected one or more risk objects and/or groups of risk objects. Subsequently, the risk monitoring system 1116 may perform an "action" when a threat is detected. In some embodiments, an action performed by the risk monitoring system 1116 may vary depending on the relevant field or type of computer data associated with the search. For instance, when searching for and analyzing computer data related to fraud, security, performance issues, or business analytics, an action performed by the risk monitoring system 1116 may include, without limitation, issuing a warning regarding detected threats, sending an email to a particular user's address when a threat is detected, generating a ticket to be processed to remedy the threat, running a computer script, mitigating the threat, or suppressing the threat when the threat is determined to be a false alarm.

In this manner, the risk monitoring system 1116 enables a user to select and/or manipulate graphical representations of the risk objects and logical operators via the UI. Accordingly, a user is not required to manually or repeatedly enter combinations of the complicated search query commands or algorithms, and manually combine these commands or algorithms using logical operations, in order to perform a search of the computer data or operate on or combine information associated with the selected risk objects and/or groups of risk objects. Rather, the risk monitoring system 1116 enables a user to perform these tasks more efficiently via the UI, without requiring a technical proficiency with a particular computer programming language syntax that is required by conventional approaches.

The risk monitoring system 1116 in the networked computer environment 1100 is represented as being implemented via a separate system in FIG. 11. Those skilled in the art will understand that FIG. 11 represents one example of a networked computer system, and other embodiments may use different arrangements, including arrangements in which the risk monitoring system 1116 is implemented, completely or in part, within any one of or any combination of client devices 102, host devices 106, and the data intake and query system 108. For example, as shown in FIG. 11, a monitoring component 112 could be included as a client application 110 within one of client devices 102, and this monitoring component 112 could be executed in conjunction with the risk monitoring system 1116, such that the client devices 102 could be implemented as part of the risk monitoring system 1116. Those skilled in the art will understand that such a monitoring component 112 may be implemented in any computing device or system, such as one or more client devices 102, one or more host devices 106, and/or the data intake and query system 108.

Figure 12:
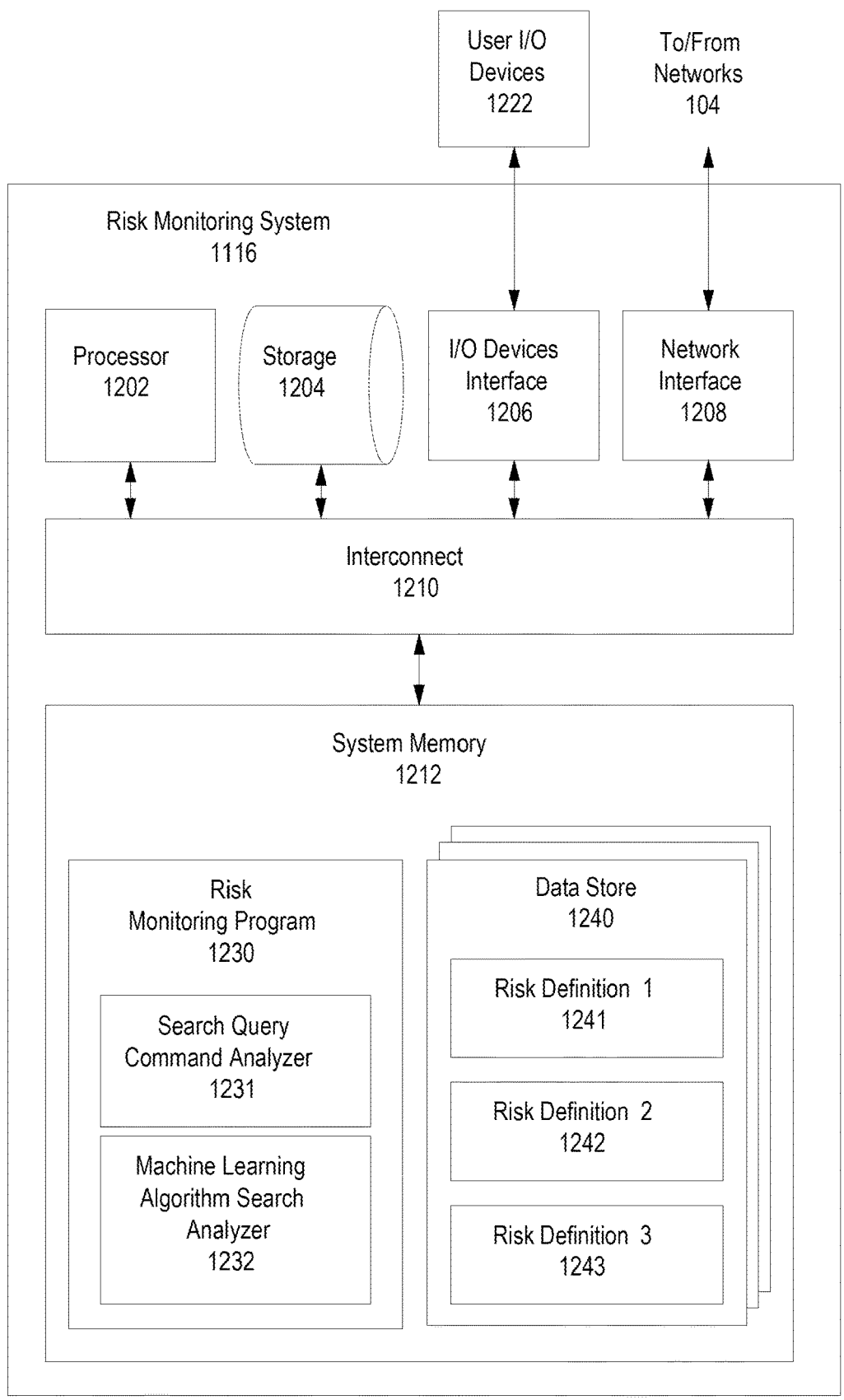
FIG. 12 is a more detailed illustration of the risk monitoring system 1116 of FIG. 11 in accordance with the disclosed embodiments

FIG. 12 is a more detailed illustration of the risk monitoring system 1116 of FIG. 11 in accordance with the disclosed embodiments. As shown, the risk monitoring system 1116 includes, without limitation, a processor 1202, storage 1204, an input/output (I/O) device interface 1206, a network interface 1208, an interconnect 1210, and a system memory 1212. The computer system 100 of FIG. 1 can be configured to implement the risk monitoring system 1116. The processor 1202, storage 1204, I/O device interface 1206, network interface 1208, interconnect 1210, and system memory 1212 function substantially the same as described in conjunction with FIG. 1 except as further described below.

In general, processor 1202 retrieves and executes programming instructions stored in the system memory 1212. Processor 1202 may be any technically feasible form of processing device configured to process data and execute program code. Processor 1202 could be, for example, a central processing unit (CPU), a graphics processing unit (GPU), an application-specific integrated circuit (ASIC), a field-programmable gate array (FPGA), and so forth. Processor 1202 stores and retrieves application data residing in the system memory 1212. Processor 1202 is included to be representative of a single CPU, multiple CPUs, a single CPU having multiple processing cores, and the like. In operation, processor 1202 is the master processor of risk monitoring system 1116, controlling and coordinating operations of other system components. System memory 1212 stores software applications and data for use by processor 1202. Processor 1202 executes software applications stored within system memory 1212 and optionally an operating system. In particular, processor 1202 executes software and then performs one or more of the functions and operations set forth in the present application.

The storage 1204 may be a disk drive storage device. Although shown as a single unit, the storage 1204 may be a combination of fixed and/or removable storage devices, such as fixed disc drives, floppy disc drives, tape drives, removable memory cards, or optical storage, network attached storage (NAS), or a storage area-network (SAN). Processor 1202 communicates to other computing devices and systems via network interface 1208, where network interface 1208 is configured to transmit and receive data via a communications network.

The interconnect 1210 facilitates transmission, such as of programming instructions and application data, between the processor 1202, input/output (I/O) devices interface 1206, storage 1204, network interface 1208, and system memory 1212. The I/O devices interface 1206 is configured to receive input data from user I/O devices 1222. Examples of user I/O devices 1222 may include one or more buttons, a keyboard, and a mouse or other pointing device. The I/O devices interface 1206 may also include an audio output unit configured to generate an electrical audio output signal, and user I/O devices 1222 may further include a speaker configured to generate an acoustic output in response to the electrical audio output signal. Another example of a user I/O device 1222 is a display device that generally represents any technically feasible means for generating an image for display. For example, the display device may be a liquid crystal display (LCD) display, CRT display, or DLP display. The display device may be a TV that includes a broadcast or cable tuner for receiving digital or analog television signals.

The system memory 1212 includes, without limitation, a risk monitoring program 1230 and a data store 1240. The risk monitoring program 1230 includes, without limitation, a search query command analyzer 1231 and a machine-learning algorithm search analyzer 1232. The data store 1240 includes without limitation, storage for storing risk definitions, such as a risk definition 1 1241, a risk definition 2 1242, and a risk definition 3 1243. As explained herein, the risk definitions may be stored in the risk monitoring system 1116, in the data intake and query system 108, in any of the host devices 106, or in any of the client devices 102 in any manner.

The risk monitoring program 1230 may receive and analyze data that is part of an event referred to herein as "event data" and stored within the data intake and query system 108. The risk monitoring program 1230 may receive and analyze machine data (e.g, raw machine data) received via the interconnect 1210, and the interconnect 1210 may receive the machine data from one or more networks 104 via the network interface 1208. In addition, the risk monitoring program 1230 may receive and analyze machine data, such as machine data received or retrieved from one or more system log files, streams of network packet data, sensor data, application program data, error logs, stack traces, system performance data, and so on. The machine data may be in any format, including, without limitation, raw machine data or SPLUNK® events. In some embodiments, the risk monitoring program 1230 may perform an extract, transform, and load (ETL) process on the incoming machine data to generate data in a format that is amenable to further analysis. In so doing, the risk monitoring program 1230 may remove or otherwise filter data that is not relevant to the applicable risk definitions while retaining relevant data. The risk monitoring program 1230, including the search query command analyzer 1231 and the machine-learning algorithm search analyzer 1232, is now described in further detail.

The search query command analyzer 1231 and/or the machine-learning algorithm search analyzer 1232 may receive raw machine data via the interconnect 1210 of the risk monitoring system 1116. The search query command analyzer 1231 and/or the machine-learning algorithm search analyzer 1232 may receive raw machine data from one or more client devices 102, one or more host devices 106, and/or the data intake and query system 108 via one or more networks 104. The raw machine data may be accessible from log files associated with client devices 102 and/or host devices 106, data generated by the data intake and query system 108, packet capture data derived from message traffic over networks 104, or any other technical feasible raw machine data from a data source.

The search query command analyzer 1231 searches and analyzes the machine data based on search query commands, in order to search for machine data that is relevant to criteria specified by the search query commands. As described herein, the one or more search query commands may be configured to search for machine data based on certain criteria that is defined in one or more stored risk definitions. In some embodiments, the search query commands may themselves be included in or specified by the corresponding risk definitions.

The machine-learning algorithm search analyzer 1232 searches and analyzes the machine data based on one or more machine-learning algorithms, in order to search for machine data that is relevant to criteria specified by the machine-learning algorithms. As described herein, the one or more machine-learning algorithms may be configured to search for machine data based on certain criteria that is defined in one or more stored risk definitions. In some embodiments, the machine-learning algorithms may themselves be included in or specified by the corresponding risk definitions.

Those skilled in the art will understand that parts or all of the risk monitoring program 1230 and/or the search query command analyzer 1231 may be executed or implemented in some manner to search and analyze machine data according to search query commands. Thus, when referring to searching and analyzing machine data with respect to search query commands, those skilled in the art will understand that referring to the risk monitoring program 1230 refers to parts or all of the risk monitoring program 1230 and/or parts or all of the search query command analyzer 1231.

Further, those skilled in the art will understand that parts or all of the risk monitoring program 1230 and/or the machine-learning algorithm search analyzer 1232 may be executed or implemented in some manner to search and analyze machine data according to algorithms as described herein. Thus, when referring to searching and analyzing machine data with respect to machine-learning algorithms, those skilled in the art will understand that referring to the risk monitoring program 1230 refers to parts or all of the risk monitoring program 1230 and/or parts or all of the machine-learning algorithm search analyzer 1232.

In various embodiments, parts or all of the risk monitoring program 1230, in conjunction with the search query command analyzer 1231 and/or the machine-learning algorithm search analyzer 1232, may perform the processes performed by the risk monitoring system 1116 relating to searching and analyzing the machine data, and so forth, as described herein.

In various embodiments, the risk monitoring program 1230 may search and analyze the machine data to determine which portions of the machine data are relevant to certain risks or conditions applicable to any field or type of machine data, such as fraud, security, performance, business analytics, or any other field or type of machine data.

Further, in various embodiments, the risk monitoring program 1230 may create one or more risk definitions to identify criteria for determining which portions of machine data are relevant to a particular risk or condition, and to store these risk definitions in a memory for future use in order to enable a user to perform future searches of the machine data. As described herein, the risk definitions may be stored in the data store 1240 in the risk monitoring system 1116, in the data intake and query system 108, in any of the host devices 106, in any of the client devices 102, or in any form of memory in any technically feasible manner.

In various embodiments, the risk monitoring program 1230 may access a stored risk definition and perform a search of the machine data based on one or more of the stored risk definitions. In this manner, the risk monitoring program 1230 may perform future searches of machine data based on accessing the stored risk definitions, without requiring the user to repeatedly enter complicated search query commands or machine-learning algorithms each time a search is performed.

Further, the risk monitoring program 1230 may represent risk objects that correspond to the stored risk definitions in a UI, to identify the search of the machine data based on the stored risk definition and/or to identify a characteristic associated with the machine data resulting from the search, such as a risk score resulting from the search, as described herein. In some embodiments, the risk monitoring program 1230 may receive a selection of one or more of risk objects to form a group of risk objects, and the risk monitoring program 1230 may receive a selection of one or more risk objects and/or groups of risk objects that are to be operated on or combined in some manner.

In some embodiments, the risk monitoring program 1230 may cause a representation of one or more logical operators for operating on and/or combining the one or more selected risk objects and/or groups of risk objects to be displayed via the UI. In addition, the risk monitoring program 1230 may receive a selection of one or more of the displayed logical operators and may receive additional information from a user indicating how the logical operators are to be applied. Once the risk monitoring program 1230 receives a selection of the one or more risk objects and/or groups of risk objects, and the one or more logical operators, the risk monitoring program 1230 may cause a result to be generated based on operating on and/or combining the selected one or more risk objects and/or groups of risk objects using the selected one or more logical operators. In this manner, the risk monitoring program 1230 enables a user to select and/or manipulate graphical representations of the risk objects and logical operators via the UI. Accordingly, a user is not required to manually or repeatedly enter combinations of the complicated search query commands or algorithms, and manually combine these commands or algorithms using logical operations, in order to perform a search of the machine data or operate on or combine information associated with the selected risk objects and/or groups of risk objects. Rather, the risk monitoring program 1230 enables a user to perform these tasks more efficiently via the UI, without requiring a technical proficiency with a particular computer programming language syntax that is required by conventional approaches.

In some embodiments, the data store 1240 may also store the machine data in any format, including, without limitation, as raw machine data, as event data derived from the raw machine data, etc. In some embodiments, the machine data may be received from the data intake and query system 108, one or more client devices 102, and/or one or more host devices 106. The streaming data may include log files associated with client devices, packet capture data derived from message traffic over a computer network, or any other technical feasible data source.

Figure 13:
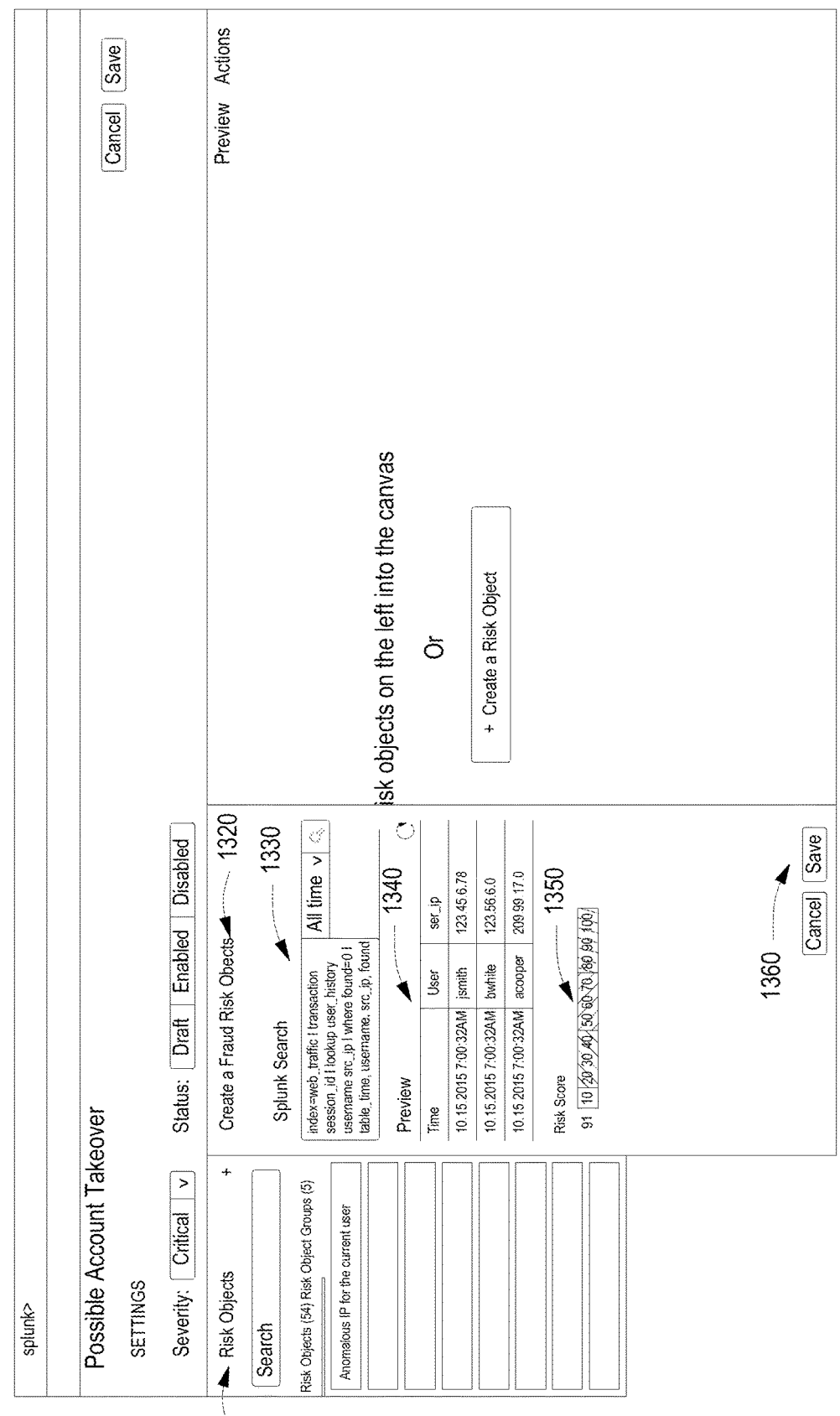
FIG. 13 illustrates a user interface for displaying risk definitions and risk objects in accordance with the disclosed embodiments.

FIG. 13 illustrates a user interface for displaying risk definitions and risk objects in accordance with the disclosed embodiments. As shown, FIG. 13 shows a user interface 1300 being displayed that includes a risk object portion 1310 for displaying a listing of one or more risk objects or groups of risk objects, where each risk object is associated with a stored risk definition. Those skilled in the art will understand that the risk object portion 1310 may include any number of risk objects or groups of risk objects related to any field or type of machine data (e.g., raw machine data), including, without limitation, fraud, security, performance, business analytics, and so forth.

As shown, the user interface 1300 also includes a risk object creation and modification portion 1320 that displays a risk definition that corresponds to one of the risk objects listed in risk object portion 1310. In some embodiments, a user may create or modify a risk definition that corresponds to one of the risk objects listed in the risk object portion 1310. Alternatively, in some embodiments, the risk definitions may be predetermined or determined in an automated fashion. Those skilled in the art will understand that the risk object creation and modification portion 1320 may include risk definitions associated with any number of risk objects related to any field or type of machine data, including, without limitation, fraud, security, performance, business analytics, and so forth.

Further, as shown, the risk object creation and modification portion 1320 includes a search criteria portion 1330, which shows an exemplary search query command to be used as part of the risk definition, to identify which machine data is relevant to a particular risk or condition. Those skilled in the art will understand that the search criteria portion 1330 is shown as including a search query command by way of example only, and the search criteria portion 1330 may include any type of representation of criteria for determining which machine data is relevant for a particular search, including, without limitation, search query commands, machine-learning algorithms, and so forth. As shown, the risk object creation and modification portion 1320 also includes a preview section 1340, which shows a preview of machine data that is relevant to or meets the search query command shown in the search criteria portion 1330.

As shown, the risk object creation and modification portion 1320 also includes a risk score portion 1350, which displays a prospective risk score associated with the risk object as generated in accordance with the risk definition. Further, the risk definition may include a formula for determining the risk score of the corresponding risk object based on the machine data found to be meet the criteria specified in the risk definition. As shown, the risk score portion 1350 displays a prospective risk score via a number and a color code, as indicated by shading. For instance a high risk score may indicate that a particular risk or condition is more serious, more urgent, and/or more likely. Alternatively, the numbering of the risk score may be reversed, where a lower risk score indicates that a particular risk or condition is more serious, more urgent, and/or more likely. Those skilled in the art will understand that the risk score portion 1350 is shown as including a prospective risk score by way of example only, and the risk score portion 1350 may include any type of risk scores or other characteristics associated with the risk object, including, without limitation, a risk score, a risk severity level, a risk probability level, a time order of the risk or condition, and so forth.

As shown, the risk object creation and modification portion 1320 also includes a "save" button 1360 to indicate that the risk definition may be saved in a memory for future use in order to enable a user to perform future searches of the machine data. As described herein, the risk definitions may be stored in the data store 1240 in the risk monitoring system 1116, in the data intake and query system 108, in any of the host devices 106, in any of the client devices 102, or in any form of memory in any technically feasible manner. As described herein, the risk monitoring system 1116 may enable a user to perform future searches of machine data based on accessing the stored risk definitions, without requiring the user to repeatedly enter complicated search query commands or machine-learning algorithms each time a search is performed.

In an exemplary risk definition, a user of the risk monitoring system 1116 may seek all machine data related to transactions involving a user X over a threshold amount of money Y, where transactions involving over the threshold amount of money may indicate suspicious or fraudulent activity. For such a scenario, a user of the risk monitoring system 1116 may create a risk definition to include a search criteria portion 1330 that specifies the criteria that the user must equal X, and the amount of money transacted must be greater than Y. Such a risk definition may include any commands or algorithms used to establish these criteria. Further, this risk definition may be stored in a memory, as described herein. Subsequently, the risk monitoring system 1116 may perform an actual search of the machine data to determine which machine data meets the criteria as defined in the stored risk definition.

In another exemplary risk definition, a user of the risk monitoring system 1116 may seek all machine data related to a change of password on an account, followed by a large financial transfer out of that account, since such transactions occurring in that specific order may represent fraudulent activity. For such a scenario, a user of the risk monitoring system 1116 may create and store a risk definition to include a search criteria portion 1330 that specifies the criteria that the transaction must change a password, followed by a transfer of money. Again, subsequently, the risk monitoring system 1116 may perform an actual search of the machine data to determine which machine data meets the criteria as defined in the stored risk definition. For such a scenario, a risk object may be displayed as including a time order indicator indicating the time order of the particular activities of the risk or condition.

Figure 14A:
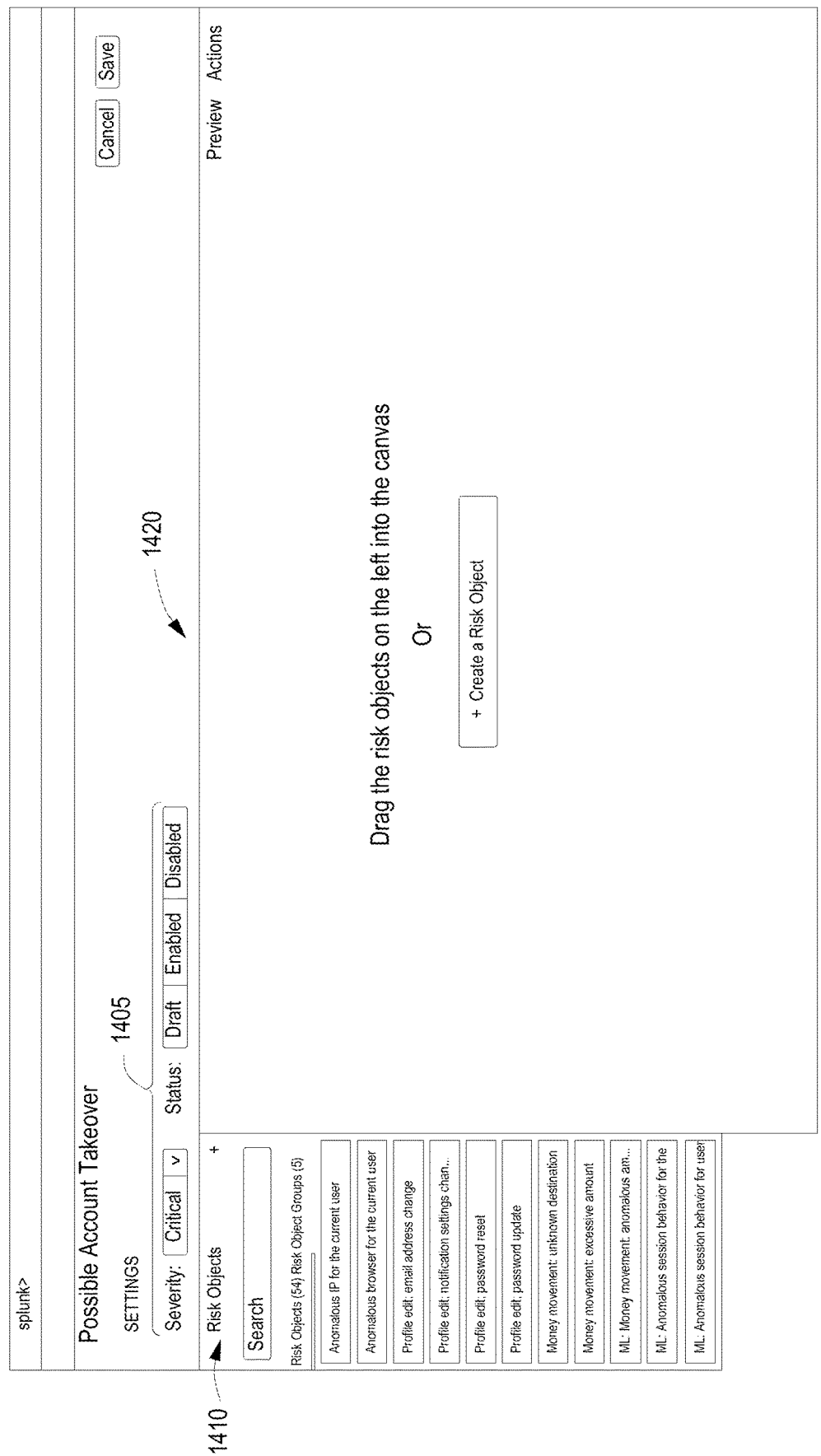
FIGS. 14A-14C illustrate a user interface for displaying and selecting risk objects in accordance with the disclosed embodiments.
Figure 14B:
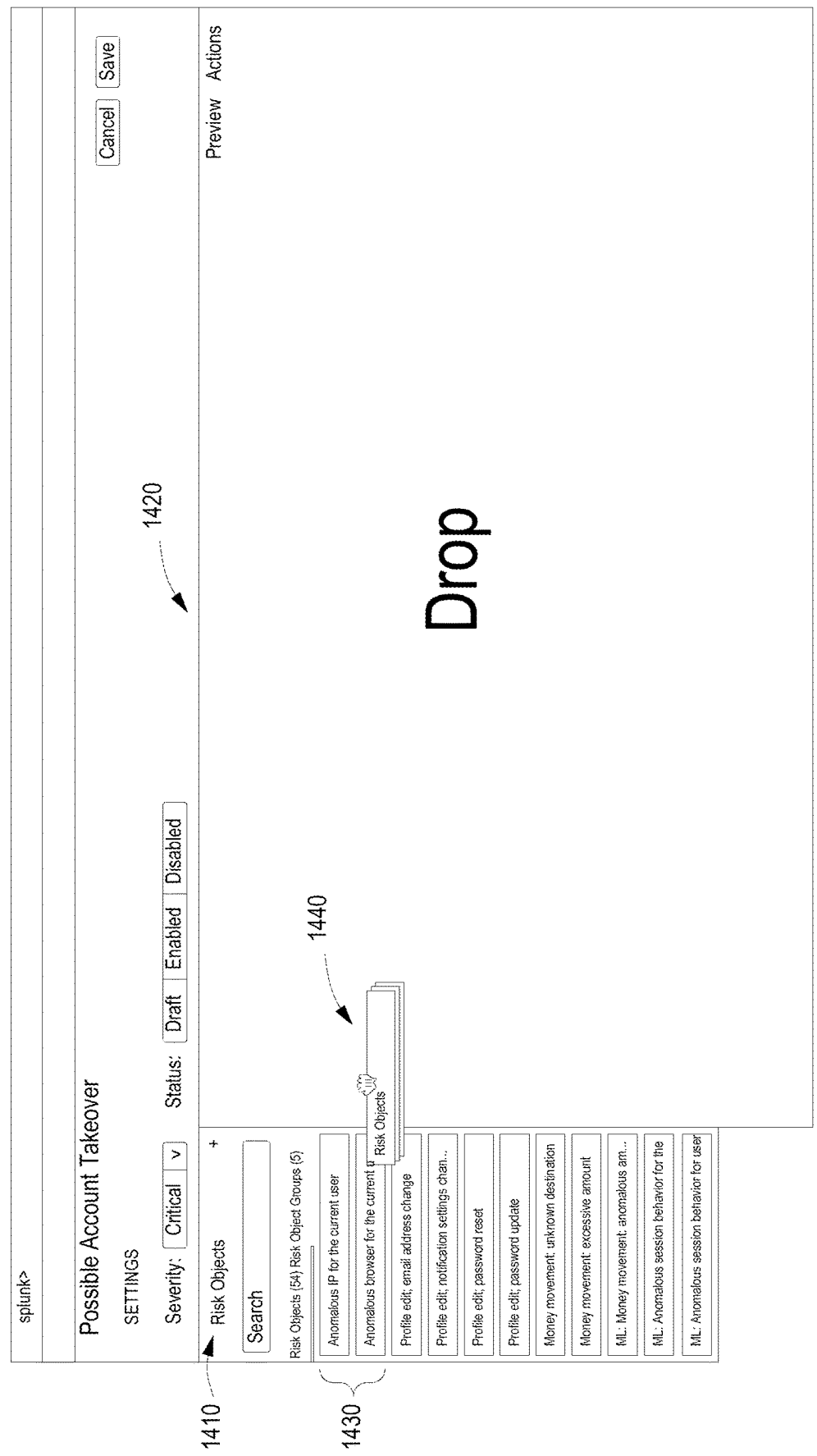
Figure 14C:
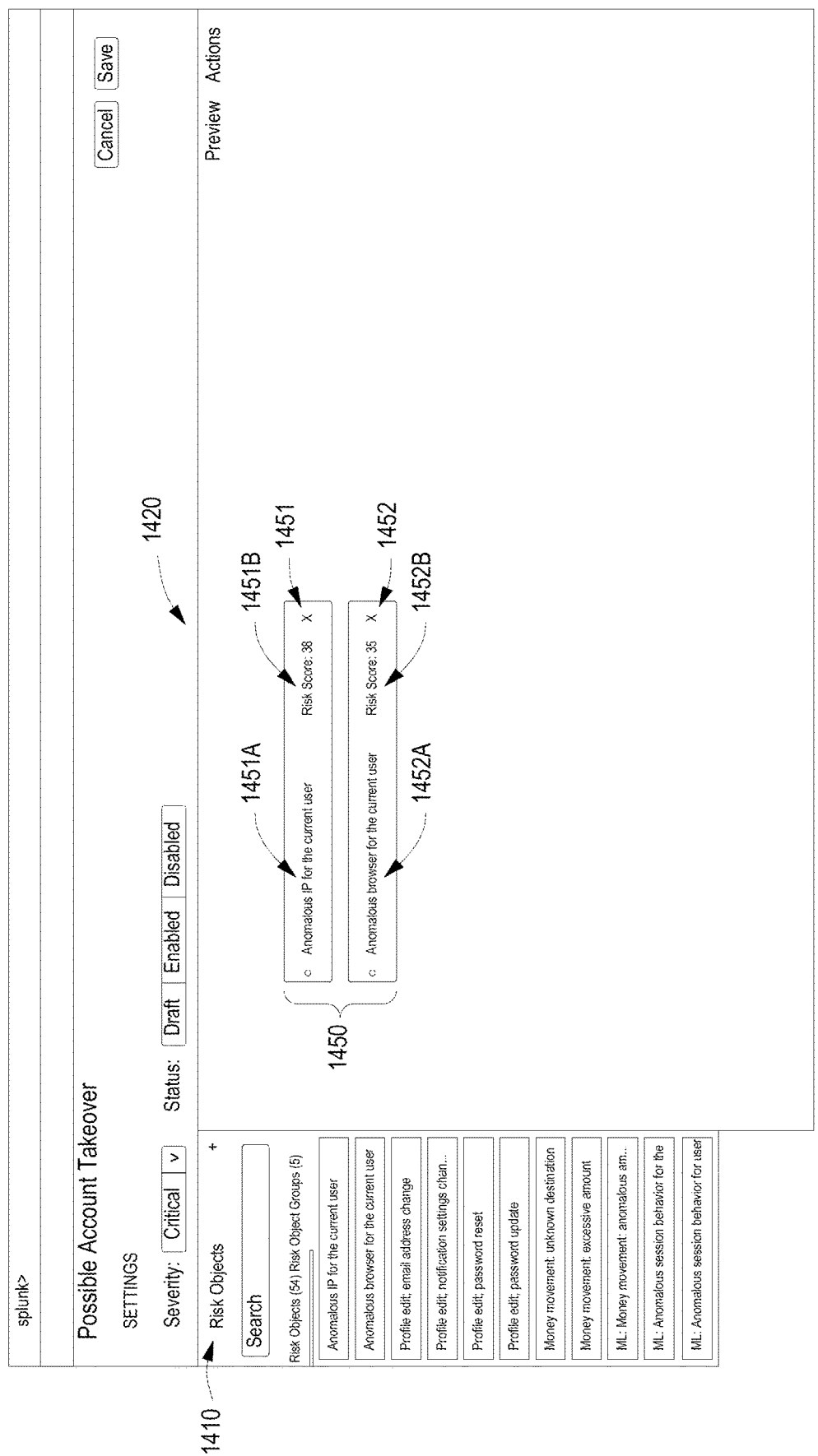

FIGS. 14A through 14C illustrate a user interface for displaying and selecting risk objects in accordance with the disclosed embodiments. As shown, FIGS. 14A through 14C show a user interface 1400 being displayed that includes a risk object portion 1410 for displaying a listing of one or more risk objects or groups of risk objects, where each risk object is associated with a stored risk definition. Those skilled in the art will understand that the risk object portion 1410 may include any number of risk objects or groups of risk objects related to any field or type of machine data, including, without limitation, fraud, security, performance, business analytics, and so forth.

As shown, the user interface 1400 also includes a filter portion 1405, for determining which risk objects and/or groups of risk objects are to be listed in the risk object portion 1410. As shown, the filter portion 1405 may determine that only risk objects or groups of risk objects having a particular severity level, such as "critical," may be listed in risk object portion 1410. In some embodiments, a severity level of a risk object may be predetermined or determined in an automated manner based only on the risk definition. For instance, for risk definitions where the criteria specify that the search seeks machine data related to certain fraudulent transactions, the corresponding risk objects may be assigned a particular high severity level, such as "critical." In some embodiments, a severity level of a risk object may be determined based on the actual machine data found to be relevant to the particular risk or condition. For instance, when the relevant machine data indicates a particular transaction involves over a threshold amount of money, the severity level of the risk object may be actively assigned to be a high severity level, such as "critical," whereas when the machine data represents no money movement or a transfer of a minimal amount of money may be assigned a lower severity level.

Further, as shown, the filter portion 1405 may determine that only risk objects or groups of risk objects having a certain status may be listed in risk object portion 1410, such as when the risk objects have a status of enabled, disabled, or draft.

As shown, the user interface 1400 also includes a canvas portion 1420 for displaying one or more selected risk objects. Specifically, as shown, the canvas portion 1420 enables a selection of one or more risk objects, and the selected risk objects may be "dragged" from the risk object portion 1410 onto the canvas to be displayed on the canvas portion 1420, as further described herein. Alternatively, as shown, the canvas portion 1420 enables a user to create a new risk object, which includes creating a new risk definition. Those skilled in the art will understand that the canvas portion 1420 may enable creating any number of risk objects related to any field or type of machine data, including, without limitation, fraud, security, performance, business analytics, and so forth.

In addition, as shown in FIG. 14B, the user interface 1400 enables a selection of one or more risk objects from the risk object portion 1410. For instance, as shown, a user may select two risk objects 1430 from the risk object portion 1410, and the user may drag and drop these two risk objects 1430 onto the canvas portion 1420, as shown by the dragging and dropping indicator 1440. Those skilled in the art will understand that the risk objects 1430 are shown as being selected by a user by way of example only, and the risk objects 1430 may be selected in any manner, including, without limitation, by a user or in an automated fashion.

In addition, as shown in FIG. 14C, dragging and dropping the two risk objects 1430 onto the canvas portion 1420 causes the user interface 1400 to display these two risk objects on portion 1450 of the canvas portion 1420. Further, as shown, portion 1450 of the canvas portion 1420 displays a first risk object 1451 as represented by a title 1451A that identifies that the risk object is associated with an anomalous IP address for a user, along with a first risk score 1451B showing a risk score equal to 38. In addition, as shown, portion 1450 of the canvas portion 1420 also displays a second generated risk object 1452 as represented by a title 1452A that identifies that the risk object is associated with an anomalous browser used by a user, along with a first risk score 1452B showing a risk score equal to 35. Those skilled in the art will understand that the titles 1451A and 1452A are displayed as particular titles, and risk scores 1451B and 1452B are displayed as particular risk scores by way of example only, and titles 1451A and 1452A may include any kind of descriptions of the risk objects, and the risk scores 1451B and 1452B may include any type of risk scores or other characteristics associated with the risk objects, including, without limitation, a risk score, a risk severity level, a risk probability level, an order or precedence indicator, and so forth.

FIGS. 15A through 15E illustrate an example user interface for selecting risk objects and applying logical operators to selected risk objects in accordance with the disclosed embodiments. As shown, FIGS. 15A through 15E show a user interface 1500 being displayed that includes a risk object portion 1510 for displaying a listing of one or more risk objects and/or groups of risk objects, where each risk object is associated with a stored risk definition. Those skilled in the art will understand that the risk object portion 1510 may include any number of risk objects and/or groups of risk objects related to any field or type of machine data, including, without limitation, fraud, security, performance, business analytics, and so forth.

As shown, the user interface 1500 also includes a canvas portion 1520 for displaying one or more selected risk objects. Specifically, as shown in FIG. 15A, two risk objects 1551 and 1552 are displayed on portion 1550 of the canvas portion 1520. Those skilled in the art will understand that the canvas portion 1520 is shown as displaying two risk objects by way of example only, and that the canvas portion 1520 may display any number of risk objects and/or groups of risk objects.

As shown in FIG. 15A, the two risk objects 1551 and 1552 displayed on portion 1550 of the canvas may be selected for further processing via a user selection. As shown, a user may utilize a user selection box 1560 to begin to select the two risk objects 1551 and 1552 for further processing. Those skilled in the art will understand that the user selection box 1560 being utilized by a user is shown by way of example only, and that any number of risk objects and/or groups of risk objects may be selected in any manner, including, without limitation, via user action or in an automated fashion.

As shown in FIGS. 15B through 15E, a user may utilize the user selection box 1560 to complete a selection of the two risk objects 1551 and 1552 displayed in the canvas portion 1520 for further processing as a group of selected risk objects 1561. As also shown in FIGS. 15B through 15E, information about each of the risk objects included in the group of selected risk objects 1561, may be displayed within the user selection box 1560. As shown, within the user selection box 1560, a first risk object 1551 is represented by a title 1551A that identifies that the risk object is associated with an anomalous IP address for a user, along with a first risk score 1551B showing a risk score equal to 38. In addition, as shown, within the user selection box 1560, a second risk object 1552 is represented by a title 1552A that identifies that the risk object is associated with an anomalous browser used by a user, along with a first risk score 1552B showing a risk score equal to 35. Those skilled in the art will understand that the titles 1551A and 1552A may include any kind of descriptions of the risk objects, and risk scores 1551B and 1552B may include any type of risk scores or other characteristics associated with the risk objects, including, without limitation, a risk score, a risk severity level, a risk probability level, an order or precedence indicator, and so forth.

Further, as shown, a title 1565 for the group of selected risk objects 1561 may be displayed within the user selection box 1560. Specifically, as shown, the group of selected risk objects 1561 is identified as being associated with "Anomalous Login Source/Device," indicating that the selected risk objects are associated with anomalous login activity. Those skilled in the art will understand that the title 1565 of the group of selected risk objects 1561 is displayed as a particular description, and that the title 1565 may include any kind of descriptions of the group of selected risk objects.

In addition, as shown, a representation of a logical operator portion 1570 that identifies one or more logical operators for operating on or combining the two selected risk objects 1551 and 1552 as a group may be displayed within the user selection box 1560. As shown, the logical operator portion 1570 specifies that the two selected risk objects 1551 and 1552 are to be combined by determining a combined risk score by combining the risk score 1551B with the risk score 1552B. Accordingly, the "result" generated by operating on or combining the two selected risk objects 1551 and 1552 is the combined risk score. Further, as shown, a "threat" is detected when a particular triggering condition is met, namely, when the combined risk score is equal to 38. When this triggering condition is met, then a corresponding "threat" is detected. Those skilled in the art will understand that the logical operator portion 1570 is displayed as applying particular logical operators by way of example only, and that the logical operator portion 1570 may be implemented via any one or more types of logical operators for operating or combining risk objects and/or groups of risk objects, as described herein.

Figure 15B:
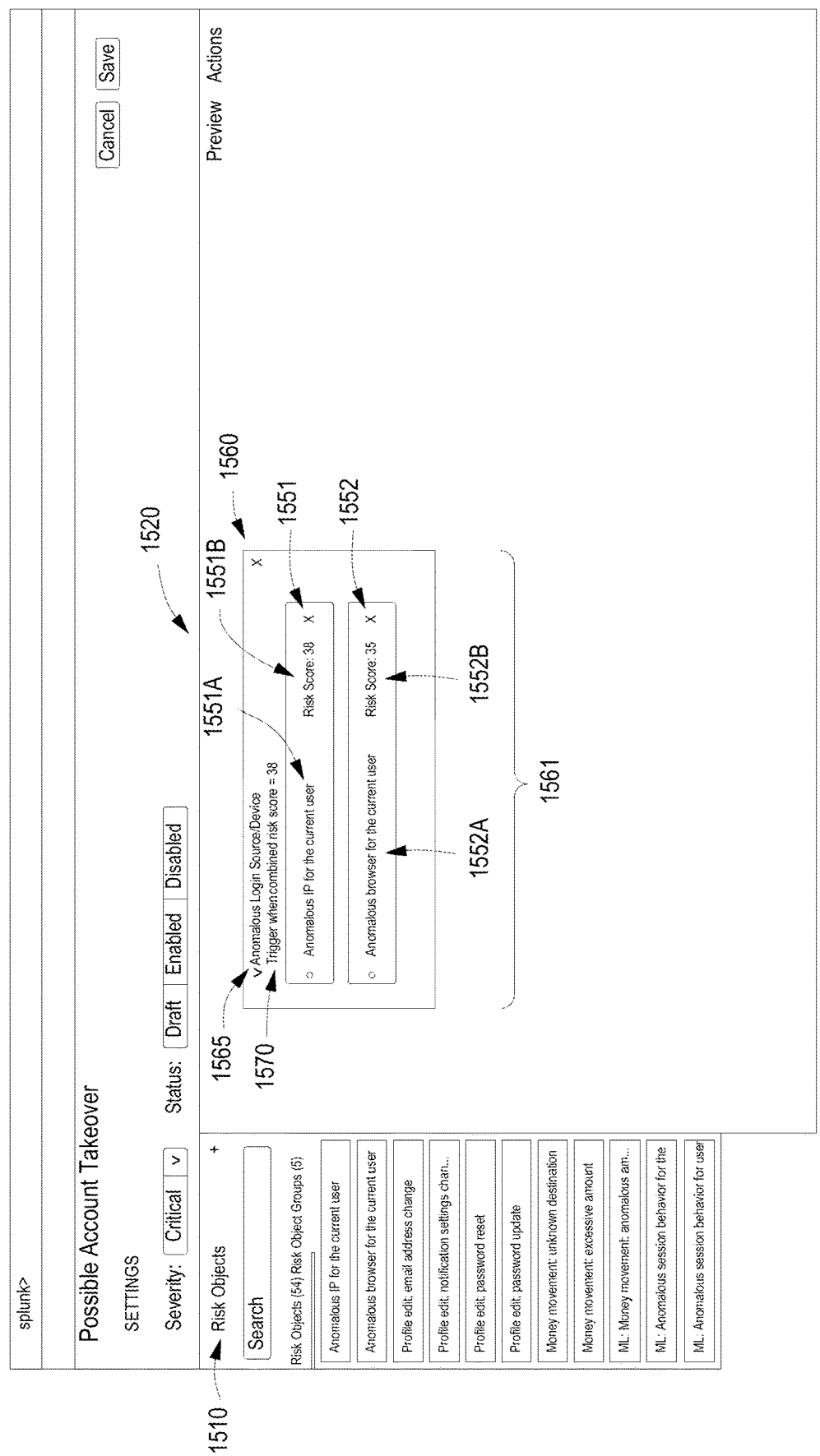
Figure 15C:
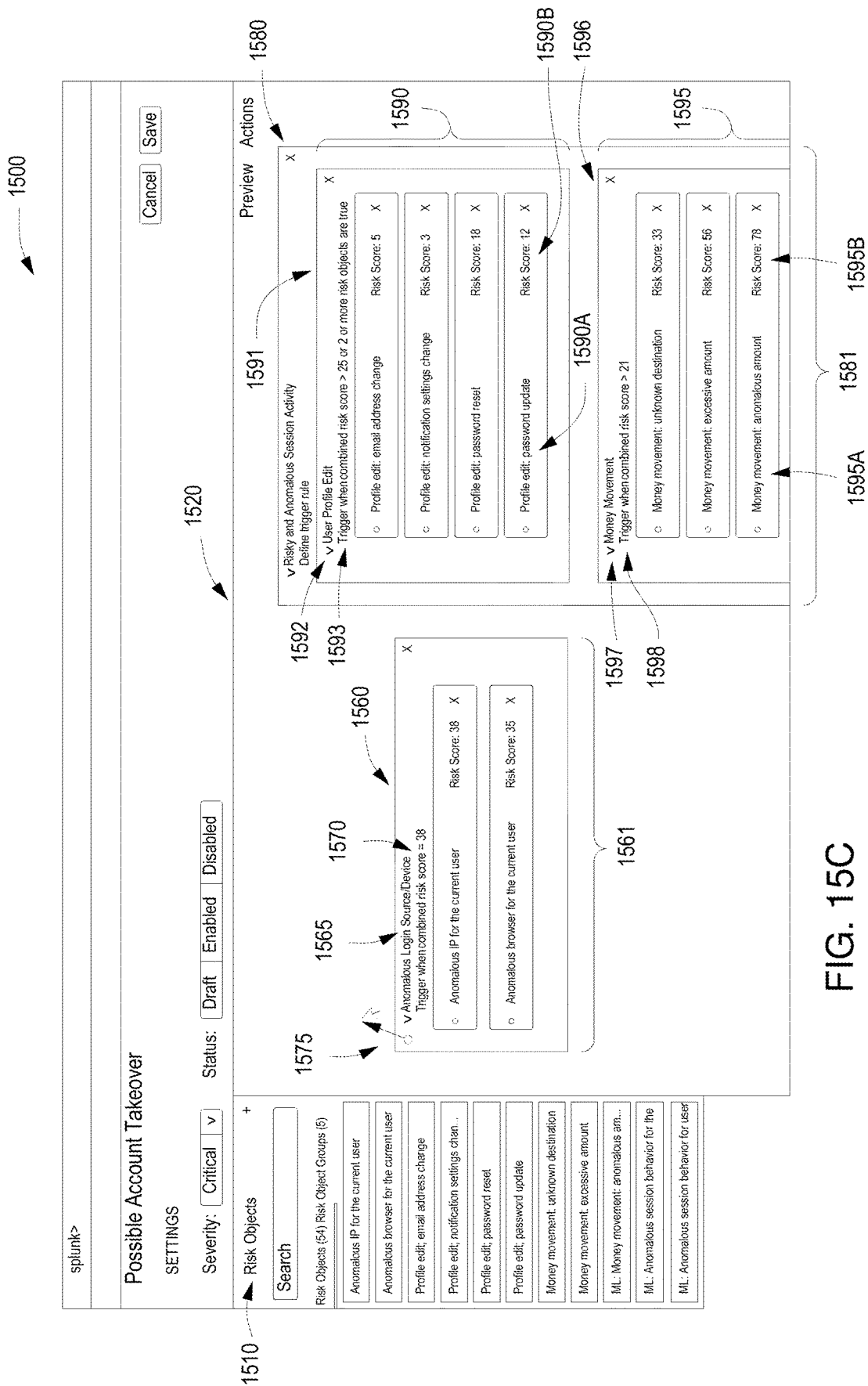
Figure 15D:
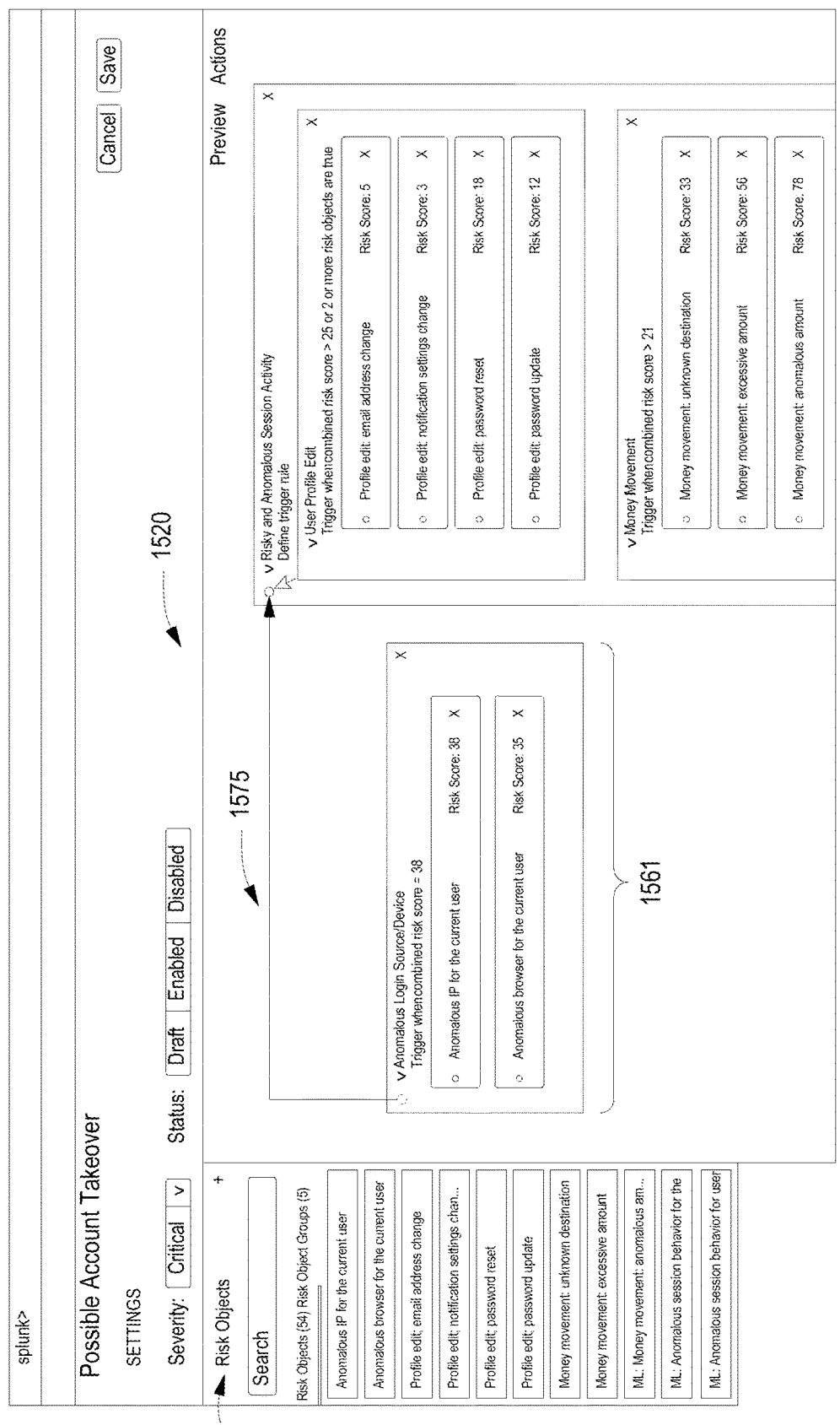
Figure 15E:
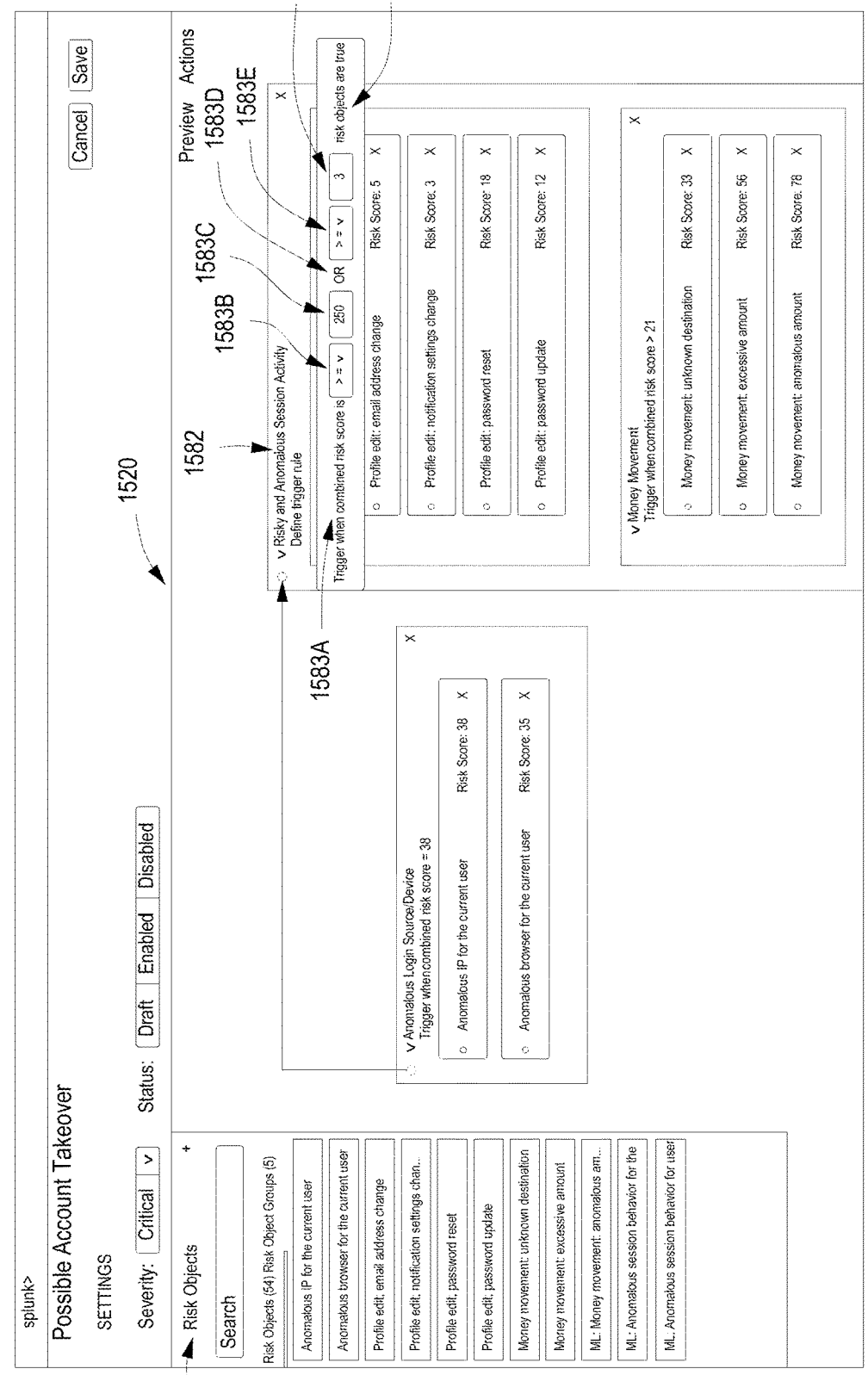

As shown in FIG. 15C through 15E, additional groups of risk objects may be selected and grouped together for further processing. As described herein, a first group of selected risk objects 1561 is displayed, as described herein, within the user selection box 1560. Also as shown, a second group of selected risk objects 1581 is displayed within a user selection box 1580. Within this second group of selected risk objects 1581 shown in user selection box 1580, a first sub-group of selected risk objects 1590 is displayed within a user selection box 1591, and a second sub-group of selected risk objects 1595 are displayed within a user selection box 1596.

As shown, the first sub-group of selected risk objects 1590 is displayed with a title 1592. Specifically, as shown, the title 1592 describes the first sub-group of selected risk objects 1590 as being associated with "User Profile Edit," indicating that the selected risk objects are associated with anomalous editing of user profiles. As further shown, the second sub-group of selected risk objects 1595 is displayed with a title 1597. Specifically, as shown, the title 1597 describes the second sub-group of selected risk objects 1595 as being associated with "Money Movement," indicating that the selected risk objects are associated with anomalous financial transactions that involve moving money between accounts. Those skilled in the art will understand that the titles 1592 and 1597 are displayed as particular descriptions, and that the titles 1592 and 1597 may include any kind of descriptions of the sub-groups of risk objects.

Further, as shown, each risk object included in the first sub-group of selected risk objects 1590 is displayed with a title 1590A that describes each corresponding risk object, and a risk score 1590B that identifies a risk score that is associated with each corresponding risk object. Additionally, each risk object included in the second sub-group of selected risk objects 1595 may be displayed with a title 1595A that describes each corresponding risk object, and a risk score 1590B that identifies a risk score that is associated with each corresponding risk object. Those skilled in the art will understand that the titles 1590A and 1595A are displayed as particular titles by way of example only and may include any kind of descriptions of the risk objects. Further, those skilled in the art will understand that the risk scores 1590B and 1595B are displayed as particular risk scores by way of example only and may include any types of risk scores or other characteristics associated with the risk objects, including, without limitation, a risk score, a risk severity level, a risk probability level, an order or precedence indicator, and so forth.

The first sub-group of selected risk objects 1590 is also displayed with a logical operator portion 1593 that identifies one or more logical operators for operating on and/or combining the risk objects included in the first sub-group of selected risk objects 1590. As shown, the logical operator portion 1593 specifies that the risk objects included in the first sub-group of selected risk objects 1590 are to be operated on and/or combined by determining a combined risk score and by determining a number of risk objects that are evaluated true, such as by determining the number of risk objects that produce any relevant machine data. Accordingly, the "results" generated by operating on and/or combining the risk objects included in the first sub-group of selected risk objects 1590 include the combined risk score and the determined number of risk objects that are true. Further, as shown, a "threat" is detected when a particular triggering condition is met, namely, when the combined score is greater than 25, or when 2 or more of the risk objects are evaluated as true. When either one of these conditions is met, then a corresponding "threat" is detected.

Further, as shown, the second sub-group of selected risk objects 1595 is displayed with a logical operator portion 1598 that identifies one or more logical operators for operating on and/or combining the risk objects included in the second sub-group of selected risk objects 1595. As shown, the logical operator portion 1598 specifies that the risk objects included in the second sub-group of selected risk objects 1595 are to be operated on and/or combined by determining a combined risk score. Accordingly, the "result" generated by operating on and/or combining the risk objects included in the second sub-group of selected risk objects 1595 is the combined risk score. Further, as shown, a "threat" is detected when a particular triggering condition is met, namely, when the combined score is greater than 21. When this conditions is met, then a corresponding "threat" is detected. Those skilled in the art will understand that the logical operator portions 1593 and 1598 are displayed as specifying particular logical operators by way of example only and may be implemented via any one or more types of logical operators for operating and/or combining risk objects, as described herein.

Further, as shown, an arrow 1575 may be displayed to represent a further logical operator to connect between different groups of selected risk objects, such as to connect the first group of selected risk objects 1561 with the second group of selected risk objects 1581. In some embodiments, an arrow may represent a logical operator such as an if-then causation operator, such as, if a first group of selected risk objects is triggered, then evaluate a next group of selected risk objects to determine if that next group is also triggered. In some embodiments, an arrow may represent a logical operator such as an order of precedence or time-order operator, such as, to determine if the next group of selected risk objects is triggered after the first group of selected risk objects is triggered. In some embodiments, an arrow may represent a logical operator such as an OR operator or AND operator, where a combined trigger is met if either of the groups of selected risk objects is triggered (i.e., an OR operator), or a combined trigger is met only if both of the groups of selected risk objects are triggered (e, an AND operator). Further, an arrow may represent any other type of logical operator to operate between groups of selected risk objects.

In addition, as shown in FIG. 15D, the arrow 1575 is completed, connecting the first group of selected risk objects 1561 displayed in the user selection box 1560 with the second group of selected risk objects 1581 displayed in the user selection box 1580. As described herein, the completed arrow may represent any form of logical operator to operate on or combine the first group of selected risk objects 1561 and the second group of selected risk objects 1581, as described herein.

In addition, as shown in FIG. 15E, the second group of selected risk objects 1581 is displayed with a title 1582. Specifically, as shown, the title 1582 describes the second group of selected risk objects 1581 as being associated with "Risky and Anomalous Session Activity." Those skilled in the art will understand that the title 1582 is displayed as a particular title by way of example only and may include any kind of descriptions of the second group of selected risk objects 1581.

As further shown, the second group of selected risk objects 1581 is displayed with a logical operator portion 1583 displaying representations of logical operators to be applied to the second group of selected risk objects 1581. The logical operator portion 1583 includes selectable logical operators and selectable fields for selecting and determining the logical operators to apply to the second group of selected risk objects 1581.

As shown, the logical operator portion 1583 is displayed as including a selectable logical operator field 1583A, which is represented as operating on a combined risk score field of the selected risk objects. Those skilled in the art will understand that the selectable logical operator field 1583A is displayed as operating on a combined risk score by way of example only and may operate on any characteristic associated with the second group of selected risk objects 1581. As shown, the logical operator portion 1583 is displayed as including selectable logical operator fields 1583B and 1583E, which are represented as drop-down or pull-down menus, and which represent the selection of the "greater than or equal to" operator. The logical operator portion 1583 is also displayed as including selectable logical operator fields 1583C and 1583F, which are represented as text input fields, and which represent the selection of the text "250" and "3," respectively. Those skilled in the art will understand that the selectable logical operator fields 1583B, 1583C, 1583E, and 1583F may be selectable and utilize any kind of operators or text input. As shown, the logical operator portion 1583 also is displayed as including a selectable logical operator field 1583D, which is represented as an OR operation. The selectable logical operator field 1583D may be selectable, and selectable logical operator field 1583D is displayed as an OR operation by way of example only and may utilize any type of logical operator.

As shown, the logical operator portion 1583 specifies that the risk objects included in the second group of selected risk objects 1581 are to be operated on and/or combined by determining a combined risk score and by determining a number of risk objects that are evaluated true, such as by determining the number of risk objects that produce any relevant machine data. Accordingly, the "results" generated by operating on and/or combining the risk objects included in the second group of selected risk objects 1581 include the combined risk score and the determined number of risk objects that are true. Further, as shown, a "threat" is detected when a particular triggering condition is met, namely, when the combined score is greater than 250, or when 3 or more of the risk objects are evaluated as true. When either one of these conditions is met, then a corresponding "threat" is detected In various embodiments, the selectable logical operator fields 1583A through 1583F may be represented and selected via the user interface and may use any type of selection method. In some embodiments, a user may select and manipulate visual or graphical representations of the logical operators being displayed, select one or more logical operators via a pull-down or drop-down menu, and/or input text representing the logical operators into a portion of the UI.

Figure 16A:
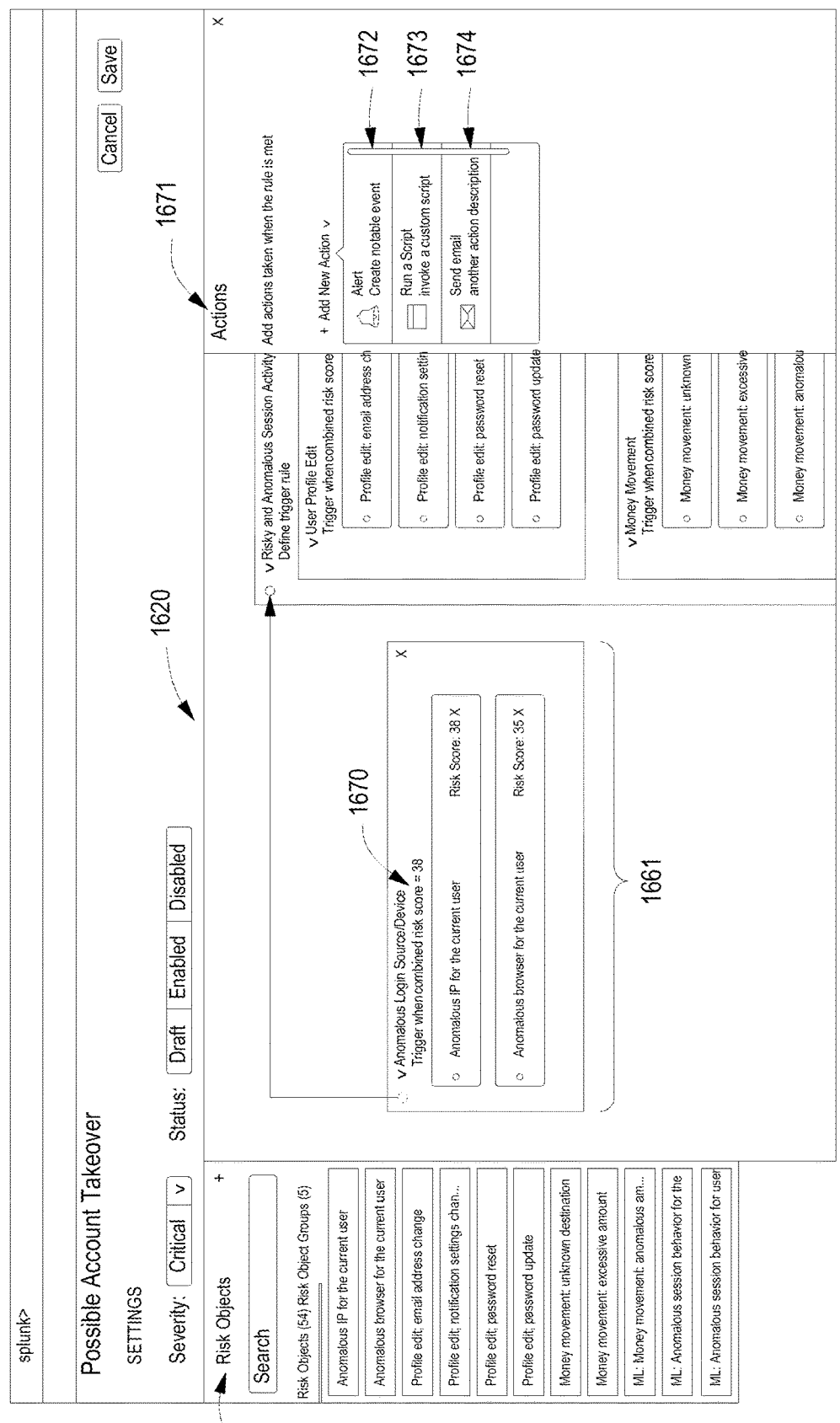
FIGS. 16A through 16B illustrate an example user interface for selecting risk objects and applying logical operators to selected risk objects in accordance with the disclosed embodiments.
Figure 16B:
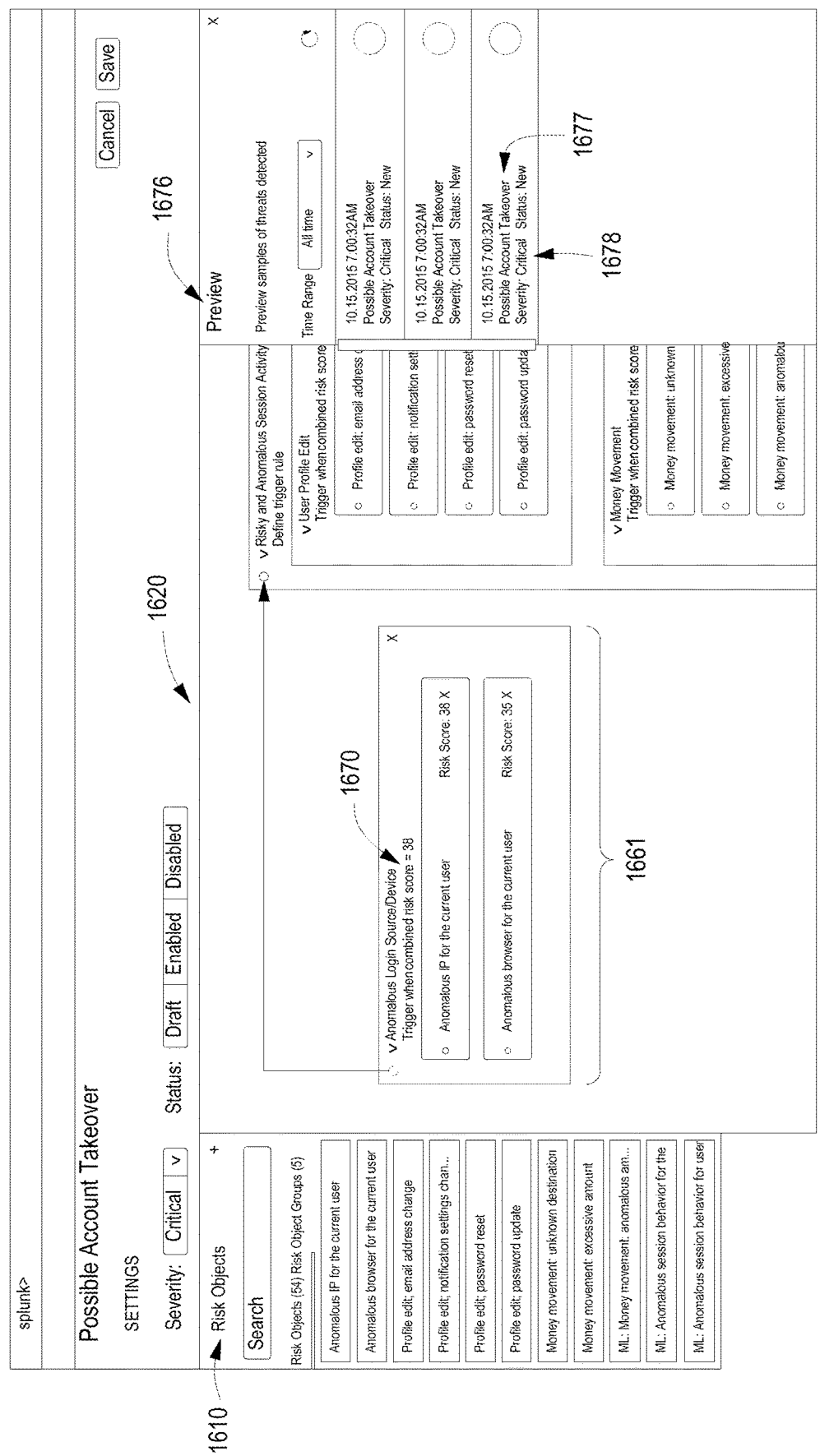

FIGS. 16A through 16B illustrate an example user interface for selecting risk objects and applying logical operators to selected risk objects in accordance with the disclosed embodiments. As shown, user interface 1600 includes a risk object portion 1610 for displaying a listing of one or more risk objects or groups of risk objects, where each risk object is associated with a stored risk definition. In general, the risk object portion 1610 may include any number of risk objects or groups of risk objects related to any field or type of machine data, including, without limitation, fraud, security, performance, business analytics, and so forth.

As shown, the user interface 1600 also includes a canvas portion 1620 for displaying one or more selected risk objects or groups of risk objects. Specifically, the canvas portion 1620 is shown as displaying a first group of selected risk objects 1661. In some embodiments, a representation of a logical operator portion 1670 for operating on the first group of selected risk objects 1661 may be displayed. The logical operator portion 1670 may specify that the risk objects included in the first group of selected risk objects 1661 are to be combined by determining a combined risk score. Accordingly, the "result" generated by operating on or combining the first group of selected risk objects 1661 is the combined risk score. Further, as shown, a "threat" is detected when a particular triggering condition is met, for example, when the combined risk score is equal to 38. When this triggering condition is met, then a corresponding "threat" is detected.

Canvas portion 1620 may display an actions portion 1671 that includes one or more actions that are to be performed when a "threat" is detected. Specifically, when a triggering condition (e.g., a threat) is met, a user may select certain actions that will be performed in response to the triggering condition. As shown in FIG. 16A, the actions portion 1671 includes generating an alert 1672, running a script 1673, and/or sending an email 1674 indicating that the triggering condition has been met. For example, when the combined risk score for the first group of selected risk objects 1661 is equal to 38, the triggering condition specified by logical operator portion 1670 is met, and, in response, a selected action may be performed. Those skilled in the art will understand that the exemplary actions shown in actions portion 1671 are displayed as particular actions by way of example only, and that the exemplary actions to be performed may be any one or more technically feasible actions, as described herein.

As further shown in FIG. 16B, the canvas portion 1620 displays a preview section 1676 for displaying a preview of "threats" that would be detected if the logical operators specified in logical operator portion 1670 were to be applied to the first group of selected risk objects 1661. For example, the preview section 1676 is shown as including a title 1677 indicating that the threat includes a possible account takeover. In addition, the preview section 1676 is shown as including a an severity level 1678 indicating a severity level of the threat, for instance, that the severity level of the potential risk or issues is "critical."

Figure 17:
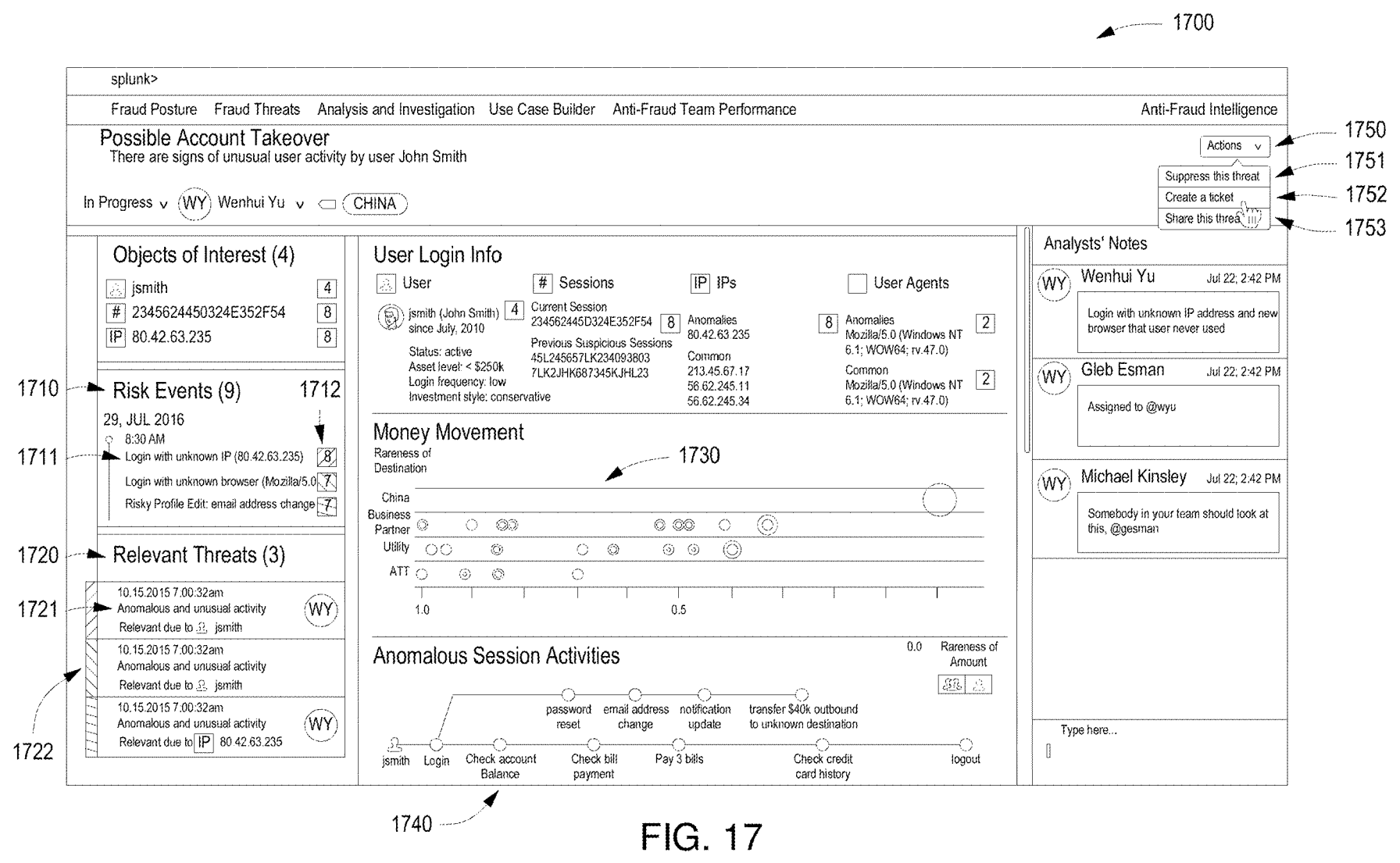

FIG. 17 illustrates an example dashboard screen for displaying status of monitoring machine data related to risk objects in accordance with the disclosed embodiments. As shown, FIG. 17 shows a dashboard screen 1700 being displayed that includes a risk object portion 1710 for displaying a listing of one or more risk objects and/or groups of risk objects, where each risk object is associated with a stored risk definition, as described herein. As shown, the risk object portion 1710 displays a title 1711 describing a risk object, and the risk object portion 1710 displays a risk score 1712 representing a risk score associated with the risk object. For instance, the risk object portion 1710 displays the risk score 1712 in the form of a number and a color code, as indicated by shading.

In addition, the dashboard screen 1700 being displayed includes a summary section 1720 for summarizing the relevant threats found from searching the machine data. As shown, the summary section 1720 includes a title 1721 describing the relevant threats and a threat level 1722 in the form of a color code indicating a score, severity, or urgency level of the relevant threat, as described herein. In addition, in some embodiments, the dashboard screen 1700 includes a chart/diagram portion 1730 for displaying representations of different portions of relevant machine data, such as transactions involving money movement, in a scatter diagram. Those skilled in the art will understand that the chart/diagram portion 1730 may include any technically feasible types of charts or diagrams to represent the machine data found to be relevant to one or more particular searches, and that the relevant characteristics being sought are shown as transactions involving money movement by way of example only.

In addition, in some embodiments, the dashboard screen 1700 being displayed includes a timeline portion 1740 for displaying representations of different portions of relevant data in the form of a timeline. In particular, relevant data may be graphically represented on a timeline in order to more clearly illustrate how the data follows an expected sequence or deviates from that sequence. As shown, the timeline portion 1740 shows a timeline of normal activity and a divergent timeline of suspicious activity, in order to more clearly delineate to a viewer or user the differences between the normal activity and the suspicious activity and to illustrate when the suspicious activity began.

Further, in some embodiments, the dashboard screen 1700 being displayed includes an actions portion 1750 for displaying actions to be performed when a rule or triggering condition is met and a threat is detected. As shown, the actions portion 1750 displays exemplary actions that may be performed, including suppressing a detected threat 1751, creating a ticket 1752 to address a threat, or sharing a threat 1753 (e.g., by issuing an alert).

Figure 18:
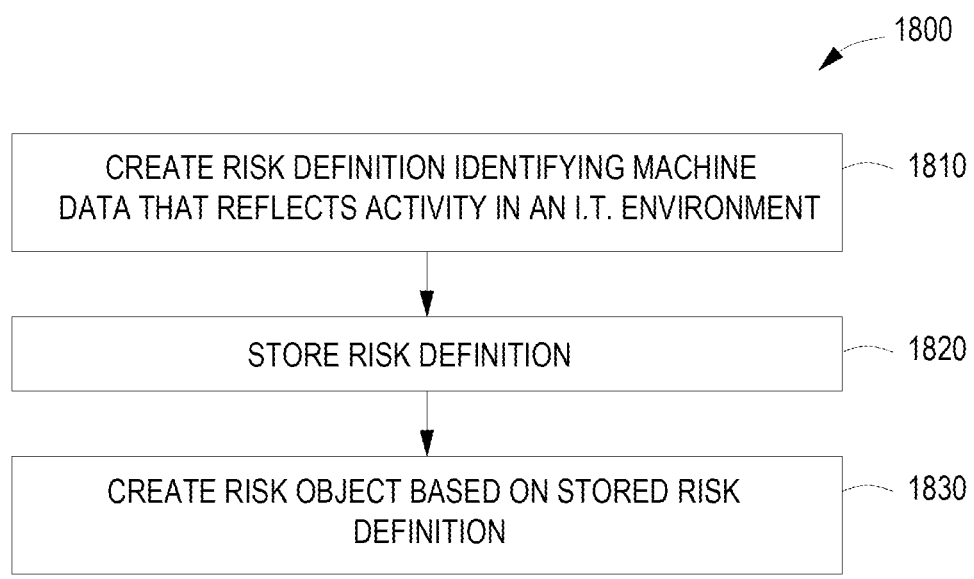
FIG. 18 is a flow diagram of method steps for creating and storing a risk definition, in accordance with the disclosed embodiments.

FIG. 18 is a flow diagram of method steps for creating and storing a risk definition, in accordance with the disclosed embodiments. Although the method steps are described in conjunction with the systems of FIGS. 1-2 and 9-12, those skilled in the art will understand that any system configured to perform the method steps, in any order, is within the scope of the present invention.

As shown, a method 1800 begins at step 1810, where a risk monitoring system 1116 creates a risk definition to define the specific criteria used to determine whether machine data (e.g., raw machine data) is relevant to a particular risk or condition. In some embodiments, the risk definitions may include the one or more search query commands themselves, information specifying the applicable search query commands, the machine-learning algorithms themselves, information specifying the applicable machine-learning algorithms, or any form of information identifying the criteria for determining whether machine data is relevant to a particular risk or condition. In some embodiments, the risk definitions may be defined or updated by a user, may be predetermined, or may be determined in an automated fashion, as described herein.

As step 1820, the risk monitoring system 1116 causes the risk definitions to be stored in a memory for future use for future use in order to enable a user to perform future searches of machine data based on accessing the stored risk definitions. In this manner, the risk monitoring system 1116 may perform future searches of machine data based on accessing the stored risk definitions, without requiring the user to repeatedly enter complicated search query commands or machine-learning algorithms each time a search is performed. In some embodiments, the risk definitions may be stored in the risk monitoring system 1116, in the data intake and query system 108, in any of the host devices 106, or in any of the client devices 102 in any other manner.

At step 1830, the risk monitoring system 1116 may cause representations of a risk object, which corresponds to a stored risk definition, to be displayed to a user via a user interface (UI). The risk object is represented to the user to identify a search of data based on the stored risk definition and/or to identify a characteristic associated with the data resulting from the search, such as a risk score resulting from the search, as further described herein. In some embodiments, the risk object may be represented graphically via the UI. In some embodiments, the risk monitoring system 1116 may search the machine data based on a risk definition in response to a user action (e.g., a user request), in a predetermined or automated manner (e.g., on a periodic basis or at a specified time), or in any other manner.

Figure 19:
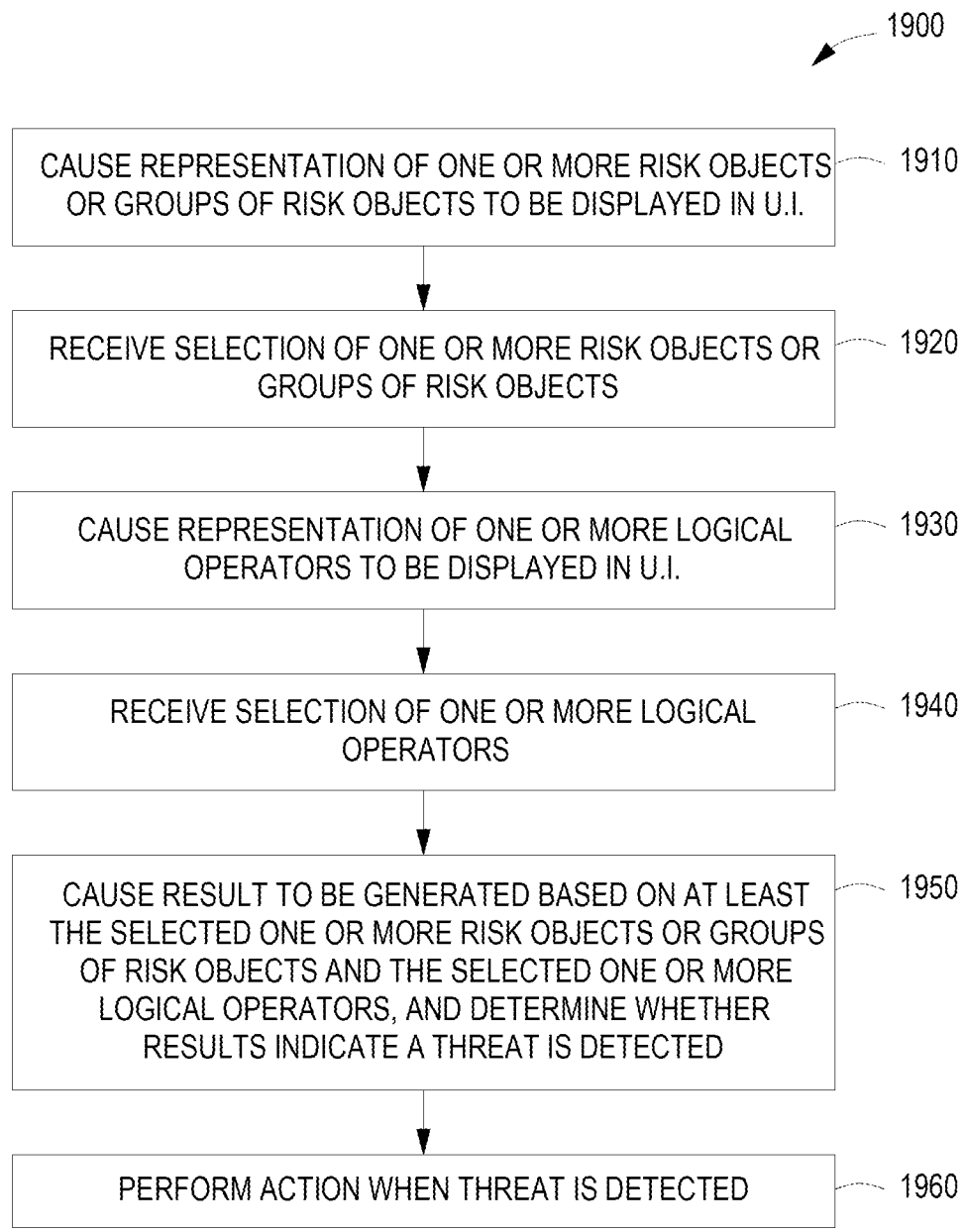
FIG. 19 is a flow diagram of method steps for generating a result based on one or more risk objects and one or more logical operators that are specified via a UI, in accordance with the disclosed embodiments.

FIG. 19 is a flow diagram of method steps for generating a result based on one or more risk objects and one or more logical operators that are specified via a UI, in accordance with the disclosed embodiments. Although the method steps are described in conjunction with the systems of FIGS. 1-2 and 9-12, those skilled in the art will understand that any system configured to perform the method steps, in any order, is within the scope of the present invention.

As shown, a method 1900 begins at step 1910, where the risk monitoring system 1116 searches the machine data for relevant data based on the criteria specified in a stored risk definition, and causes a representation of a risk object to be displayed via the UI to identify the search of the machine data based on the stored risk definition and/or to identify a characteristic associated with the machine data resulting from the search, such as a risk score resulting from the search. As described herein, the risk object may be represented by a UI element that includes any type of risk score or other characteristics associated with the risk object, including, without limitation, a risk score, a risk severity level, a risk probability level, an order of precedence indicator, and so forth In step 1920, the risk monitoring system 1116 may receive a selection of one or more risk objects via any of the selection mechanisms described herein. The risk monitoring system 1116 receives a selection, including, without limitation, a selection by a user or an automated selection, of one or more of the displayed risk objects and/or groups of risk objects in order to generate some form of result based on the selected risk objects and/or groups of risk objects. In some embodiments, the user may select the one or more risk objects and/or groups of risk objects via any form of selection mechanism, such as by a user selection via the UI (e, by dragging-and-dropping the selected risk objects onto a canvas included in the UI and/or using highlighting or selection box mechanisms), any form of keyboard interaction, and so forth.

In step 1930, the risk monitoring system 1116 causes a representation of one or more logical operators for operating on or combining the selected risk objects and/or groups of risk objects to be displayed via the UI. In some embodiments, the logical operators may include any form of operators for operating on or combining information representing the selected risk objects in any technically-feasible manner. In various embodiments, the representations of the logical operators displayed in the UI may include one or more fields for a user to input or select the logical operators to be used. For instance, in the selection of the one or more logical operators, a user may input information for the operators, such as via a text input field, or a user may select operators, such as a via a graphical pull-down or drop-down menu, and so forth.

In step 1940, the risk monitoring system 1116 receives a selection from a user of one or more logical operators being displayed via the UI, in order to generate a result based on the one or more selected risk objects and/or groups of risk objects and the one or more selected logical operators.

In step 1950, once the risk monitoring system 1116 receives a selection of the one or more risk objects and/or groups of risk objects and the one or more logical operators, the risk monitoring system 1116 causes a result to be generated by operating on and/or combining the selected one or more risk objects and/or groups of risk objects using the selected one or more logical operators. For example, as described herein, the risk monitoring system 1116 could perform one or more search queries specified by one or more risk definitions and process the results based on one or more logical operators. The generated result may include some form of metric or indicator identifying a characteristic of the data found to be relevant to the selected one or more risk objects and/or groups of risk objects.

Further, the risk monitoring system 1116 determines whether a "threat" is detected based on the generated result of operating on and/or combining the selected one or more risk objects and/or groups of risk objects. In various embodiments, a user may select one or more logical operators, in a manner as described herein, to determine whether the results generated by operating on and/or combining the selected risk objects meets certain conditions.

In step 1960, the risk monitoring system 1116 performs an "action" when a threat is detected. In some embodiments, an action performed by the risk monitoring system 1116 may vary depending on the relevant field or type of data associated with the search. For instance, when searching for and analyzing machine data related to fraud, security, performance issues, or business analytics, an action performed by the risk monitoring system 1116 may include, without limitation, issuing a warning regarding detected threats, sending an email to a particular user's address when a threat is detected, generating a ticket to be processed to remedy the threat, running a computer script, mitigating the threat, or suppressing the threat when the threat is determined to be a false alarm.

Figure 20A:
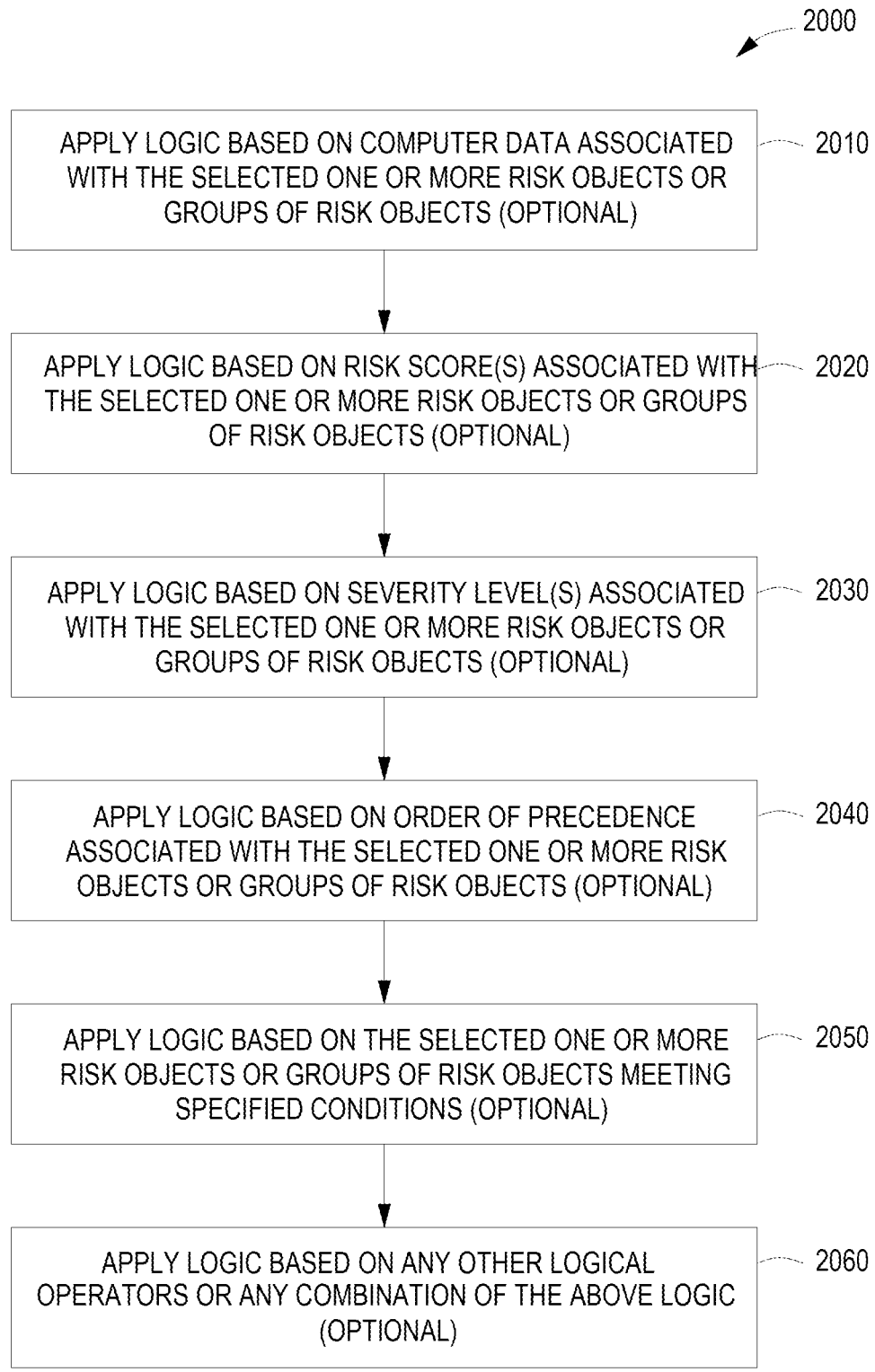
FIGS. 20A and 20B are flow diagrams of method steps for applying various types of logic to generate a result in a risk monitoring system, in accordance with the disclosed embodiments.

FIG. 20A is a flow diagram of method steps for applying various types of logic to generate a result in a risk monitoring system, in accordance with the disclosed embodiments. Although the method steps are described in conjunction with the systems of FIGS. 1-2 and 9-12, those of skill in the art will understand that any system configured to perform the method steps, in any order, is within the scope of the present invention.

In some embodiments, one or more of the steps of method 2000 may be performed at step 1950 in the method 1900 of FIG. 19. As shown, the method 2000 begins at optional step 2010, where the risk monitoring system 1116 applies the one more selected logical operators to operate on or combine the risk objects based on the data determined to be relevant to one or more searches associated with the selected risk objects and/or groups of risk objects. For instance, the risk monitoring system 1116 may determine whether a search produced any relevant machine data, in order to determine whether a risk object can be evaluated as "true," as described herein. Further, the risk monitoring system 1116 may determine whether a "threat" is detected based on the generated results, such as that a threat is detected when at least a certain number of risk objects are evaluated as "true."

At optional step 2020, the risk monitoring system 1116 applies the one more selected logical operators to operate on or combine the risk objects based on the risk scores associated with the selected risk objects and/or groups of risk objects. For instance, the risk monitoring system 1116 may determine a combined risk score associated with the selected risk objects. Further, the risk monitoring system 1116 may determine whether a "threat" is detected based on the generated results, such as that a threat is detected when a combined risk score meets a particular threshold value.

At optional step 2030, the risk monitoring system 1116 applies the one more selected logical operators to operate on or combine the risk objects based on the risk severity levels associated with the selected risk objects and/or groups of risk objects. For instance, the risk monitoring system 1116 may determine a combined or threshold risk severity level associated with the risk objects and/or groups of risk objects. Further, the risk monitoring system 1116 may determine whether a "threat" is detected based on the generated results, such as that a threat is detected when a combined risk severity level meets a particular threshold value.

At optional step 2040, the risk monitoring system 1116 applies the one more selected logical operators to operate on or combine the risk objects based on the order of precedence or time order of the risk objects. For instance, the risk monitoring system 1116 may determine a certain order of precedence or time order based on the selected risk objects and/or groups of risk objects. Further, the risk monitoring system 1116 may determine whether a "threat" is detected based on the generated results, such as that a threat is detected when a particular risk object is associated with earlier activity, followed by another risk object associated with later activity, such as when the machine data indicates that certain actions occur followed by certain specified transactions, such as when an account password is changed, followed by a transfer of money out of the account.

At optional step 2050, the risk monitoring system 1116 applies the one more selected logical operators to operate on or combine the risk objects based on the risk objects and/or groups of risk objects meeting certain specified conditions. Further, the risk monitoring system 1116 may determine whether a "threat" is detected based on the generated results, such as that a threat is detected when the selected risk objects and/or machine data associated with the selected risk objects meet any other defined conditions.

At optional step 2060, the risk monitoring system 1116 applies the one more selected logical operators to operate on or combine the risk objects based on any other form of logical operator associated with the selected risk objects and/or groups of risk objects, or any combination of the above logical operators.

Figure 20B:
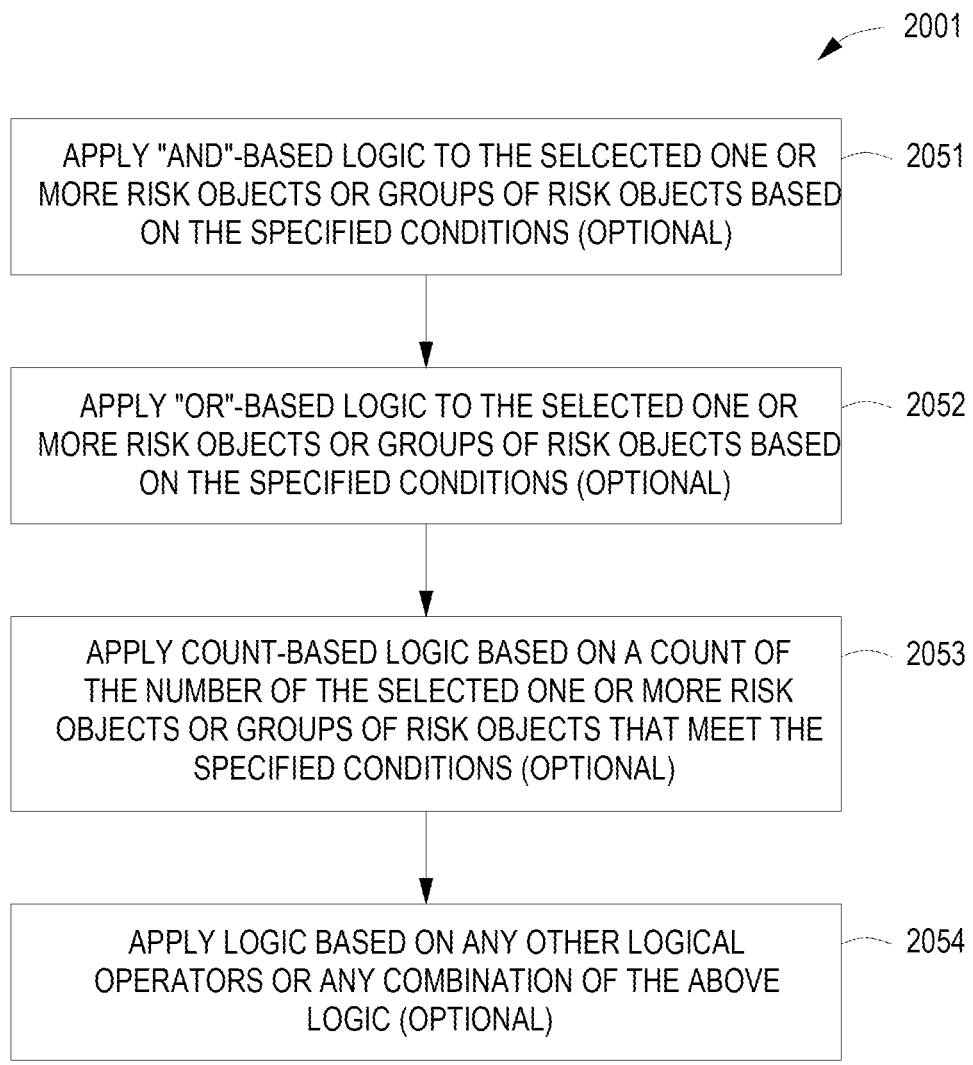

FIG. 20B is a flow diagram of method steps for applying various types of logic to generate a result in a risk monitoring system, in accordance with the disclosed embodiments. Although the method steps are described in conjunction with the systems of FIGS. 1-2 and 9-12, those of skill in the art will understand that any system configured to perform the method steps, in any order, is within the scope of the present invention.

In some embodiments, one or more of the steps of method 2000 may be performed at step 2050 in the method 2000 of FIG. 20A. As shown, the method 2001 begins at optional step 2051, where the risk monitoring system 1116 applies one or more AND-based logical operators to operate on or combine the selected one or more risk objects and/or groups of risk objects based on the risk objects and/or the machine data associated with the risk objects meeting certain specified conditions. For instance, the risk monitoring system 1116 may determine that, in order for a triggering condition to be met and thus for a "threat" to be detected, certain conditions must be met by the risk objects, and other conditions must be met as well.

At optional step 2052, the risk monitoring system 1116 applies one or more OR-based logical operators to operate on or combine the selected one or more risk objects and/or groups of risk objects based on the risk objects and/or the machine data associated with the risk objects meeting certain specified conditions. For instance, the risk monitoring system 1116 may determine that, in order for a triggering condition to be met and thus for a "threat" to be detected, either certain conditions must be met, or other conditions must be met.

At optional step 2053, the risk monitoring system 1116 applies one or more count-based logical operators to operate on or combine the risk objects and/or groups of risk objects based on the how many of the risk objects meet certain specified conditions. For instance, the risk monitoring system 1116 may determine that, in order for a triggering condition to be met and thus for a "threat" to be detected, a certain number of risk objects must meet certain conditions, and/or a risk object must meet a certain number of conditions. For instance, one exemplary triggering condition could require that three out of four risk objects must be evaluated as "true," or a risk score for three out of four risk objects must exceed a particular threshold.

At optional step 2054, the risk monitoring system 1116 applies any other type of logical operators, or any combination of the above logical operators, to operate on or combine the risk objects and/or groups of risk objects based on the risk objects and/or the machine data associated with the risk objects that meet certain specified conditions.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. In one example, and without limitation, the techniques described herein are implemented in conjunction with the system architecture described in conjunction in FIGS. 1-20B. However, the described techniques could be implemented in conjunction with any technically feasible system architecture that generates the requisite data upon which the disclosed techniques are based. In particular, the risk event monitoring system 1116 could be implemented to receive and analyze raw machine data and/or any other form of data in any technically feasible format. Further, the risk event monitoring system 1116 could analyze data received from the data intake and query system 108 described in conjunction with FIGS. 1-10, from any alternative computer system capable of generating such data, or any technically feasible combination thereof.

In sum, a risk event monitoring system causes a representation of the one or more risk objects to be displayed via a user interface (UI). The risk monitoring system receives a selection of one or more risk objects and/or groups of risk objects displayed in the UI and causes a representation of one or more logical operators to be displayed via the UI. The risk monitoring system then receives a selection of one or more of the logical operators displayed in the UI. Further, the risk monitoring system causes a result to be generated based on the selected risk objects and based on the selected logical operator(s). Finally, the risk monitoring system determines whether a threat is detected based on the generated results and optionally performs one or more actions in response to detecting the threat.

At least one advantage of the disclosed techniques is that, by storing the risk definitions and searching and analyzing the machine data based on the stored risk definitions, the risk monitoring system enables machine data to be searched without requiring a user to re-enter complicated search query commands and/or machine-learning algorithms each time a search is performed. A further advantage of the disclosed techniques is that, by representing the risk objects and logical operators graphically, a user without specific proficiency or technical knowledge related to a computer language syntax is able to perform and manipulate searches efficiently.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described herein with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method, comprising:
   identifying a first risk definition and a second risk definition, wherein the first risk definition defines a first set of operations on first machine data reflecting activity in an information technology (IT) environment and the second risk definition defines a second set of operations on second machine data reflecting activity in the IT environment;
   determining a relationship between the first risk definition and the second risk definition;
   processing the first machine data and the second machine data based on the relationship between the first risk definition and the second risk definition and one or more characteristics associated with the first risk definition or the second risk definition; and
   performing one or more risk analysis operations based on a result of processing the first machine data and the second machine data.

2. The computer-implemented method of claim 1, wherein the relationship between the first risk definition and the second risk definition includes a first threshold condition associated with the first risk definition, and wherein processing the first machine data comprises determining whether the first machine data satisfies the first threshold condition.

3. The computer-implemented method of claim 1, wherein the relationship between the first risk definition and the second risk definition includes a logical relationship between a first threshold condition associated with the first risk definition and a second threshold condition associated with the second risk definition, and wherein processing the first machine data and the second machine data comprises evaluating the first threshold condition and the second threshold condition based on the logical relationship.

4. The computer-implemented method of claim 1, wherein the one or more characteristics includes a first user-defined order associated with the first risk definition, and wherein processing first machine data comprises:
   identifying a first subset of the first machine data that reflects activity in the IT environment associated with a first period of time,
   identifying a second subset of the first machine data that reflects activity in the IT environment associated with a second period of time, and
   processing the first subset and the second subset according to the first user-defined order.

5. The computer-implemented method of claim 1, wherein the one or more characteristics includes a second user-defined order associated with the relationship between the first risk definition and the second risk definition, and wherein processing the first machine data and the second machine data is performed according to the second user-defined order.

6. The computer-implemented method of claim 1, wherein the one or more characteristics includes one or more of a first risk score associated with the first risk definition, a second risk score associated with the second risk definition, a first risk severity level associated with the first risk definition, a second risk severity level associated with the second risk definition, a first risk probability level associated with the first risk definition, or a second risk probability level associated with the second risk definition.

7. The computer-implemented method of claim 1, wherein the one or more characteristics include a first risk score associated with the first risk definition and a second risk score associated with the second risk definition, and wherein processing the first machine data and the second machine data comprises determining a third risk score associated with the relationship based on a combination of the first machine data and the second machine data.

8. The computer-implemented method of claim 1, wherein the one or more characteristics include a first risk severity level associated with the first risk definition and a second risk severity level associated with the second risk definition, and wherein processing the first machine data and the second machine data comprises determining a third risk severity level associated with the relationship based on a combination of the first machine data and the second machine data.

9. The computer-implemented method of claim 1, wherein the one or more characteristics include a first risk probability level associated with the first risk definition and a second risk probability level associated with the second risk definition, and wherein processing the first machine data and the second machine data comprises determining a third risk probability level associated with the relationship based on a combination of the first machine data and the second machine data.

10. The computer-implemented method of claim 1, wherein processing the first machine data and the second machine data comprises determining whether the one or more characteristics meet one or more threshold conditions.

11. One or more non-transitory computer readable storage media storing instructions that, when executed by one or more processors, cause the one or more processors to perform the steps of:
identifying a first risk definition and a second risk definition, wherein the first risk definition defines a first set of operations on first machine data reflecting activity in an information technology (IT) environment and the second risk definition defines a second set of operations on second machine data reflecting activity in the IT environment;
determining a relationship between the first risk definition and the second risk definition;
processing the first machine data and the second machine data based on the relationship between the first risk definition and the second risk definition and one or more characteristics associated with the first risk definition or the second risk definition; and
performing one or more risk analysis operations based on a result of processing the first machine data and the second machine data.

12. The one or more non-transitory computer readable storage media of claim 11, wherein the relationship between the first risk definition and the second risk definition includes a first threshold condition associated with the first risk definition, and wherein processing the first machine data comprises determining whether the first machine data satisfies the first threshold condition.

13. The one or more non-transitory computer readable storage media of claim 11, wherein the relationship between the first risk definition and the second risk definition includes a logical relationship between a first threshold condition associated with the first risk definition and a second threshold condition associated with the second risk definition, and wherein processing the first machine data and the second machine data comprises evaluating the first threshold condition and the second threshold condition based on the logical relationship.

14. The one or more non-transitory computer readable storage media of claim 11, wherein the one or more characteristics includes a first user-defined order associated with the first risk definition, and wherein processing first machine data comprises:
identifying a first subset of the first machine data that reflects activity in the IT environment associated with a first period of time,
identifying a second subset of the first machine data that reflects activity in the IT environment associated with a second period of time, and
processing the first subset and the second subset according to the first user-defined order.

15. The one or more non-transitory computer readable storage media of claim 11, wherein the one or more characteristics includes a second user-defined order associated with the relationship between the first risk definition and the second risk definition, and wherein processing the first machine data and the second machine data is performed according to the second user-defined order.

16. The one or more non-transitory computer readable storage media of claim 11, wherein the one or more characteristics includes one or more of a first risk score associated with the first risk definition, a second risk score associated with the second risk definition, a first risk severity level associated with the first risk definition, a second risk severity level associated with the second risk definition, a first risk probability level associated with the first risk definition, or a second risk probability level associated with the second risk definition.

17. The one or more non-transitory computer readable storage media of claim 11, wherein the one or more characteristics include a first risk score associated with the first risk definition and a second risk score associated with the second risk definition, and wherein processing the first machine data and the second machine data comprises determining a third risk score associated with the relationship based on a combination of the first machine data and the second machine data.

18. The one or more non-transitory computer readable storage media of claim 11, wherein the one or more characteristics include a first risk severity level associated with the first risk definition and a second risk severity level associated with the second risk definition, and wherein processing the first machine data and the second machine data comprises determining a third risk severity level associated with the relationship based on a combination of the first machine data and the second machine data.

19. The one or more non-transitory computer readable storage media of claim 11, wherein the one or more characteristics include a first risk probability level associated with the first risk definition and a second risk probability level associated with the second risk definition, and wherein processing the first machine data and the second machine data comprises determining a third risk probability level associated with the relationship between the first risk definition and the second risk definition based on a combination of the first machine data and the second machine data.

20. A computer system, comprising:
one or more memory sub-systems storing instructions; and
one or more processors for executing the instructions to:
identify a first risk definition and a second risk definition, wherein the first risk definition defines a first set of operations on first machine data reflecting activity in an information technology (IT) environment and the second risk definition defines a second set of operations on second machine data reflecting activity in the IT environment;
determine a relationship between the first risk definition and the second risk definition;
process the first machine data and the second machine data based on the relationship between the first risk definition and the second risk definition and one or more characteristics associated with the first risk definition or the second risk definition; and
perform one or more risk analysis operations based on a result of processing the first machine data and the second machine data.

* * * * *